(12) United States Patent
Watanabe et al.

(10) Patent No.: US 8,098,953 B2
(45) Date of Patent: Jan. 17, 2012

(54) IMAGE PROCESSING APPARATUS AND IMAGE PROCESSING METHOD FOR ADAPTIVELY PROCESSING AN IMAGE USING AN ENHANCED IMAGE AND EDGE DATA

(75) Inventors: Tatsumi Watanabe, Moriguchi (JP); Akio Kojima, Neyagawa (JP); Yasuhiro Kuwahara, Neyagawa (JP); Yusuke Monobe, Soraku-gun (JP); Toshiharu Kurosawa, Osaka (JP); Hirotaka Oku, Katano (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 12/827,264

(22) Filed: Jun. 30, 2010

(65) Prior Publication Data

US 2010/0260436 A1 Oct. 14, 2010

Related U.S. Application Data

(60) Division of application No. 12/117,343, filed on May 8, 2008, now Pat. No. 7,773,826, which is a continuation of application No. 10/500,597, filed as application No. PCT/JP03/01450 on Feb. 12, 2003, now Pat. No. 7,386,185.

(30) Foreign Application Priority Data

| Feb. 12, 2002 | (JP) | 2002-033658 |
| Jul. 8, 2002 | (JP) | 2002-198394 |
| Aug. 20, 2002 | (JP) | 2002-239134 |

(51) Int. Cl.
| G06K 9/40 | (2006.01) |
| G06K 9/00 | (2006.01) |
| H04N 1/40 | (2006.01) |
| G03F 3/08 | (2006.01) |
| G09G 1/14 | (2006.01) |
| G09G 3/28 | (2006.01) |
| G09G 3/30 | (2006.01) |
| G09G 5/00 | (2006.01) |
| G09G 5/02 | (2006.01) |
| G09G 5/10 | (2006.01) |

(52) U.S. Cl. ........ 382/274; 382/167; 358/518; 358/461; 345/20; 345/63; 345/77; 345/581; 345/596; 345/690

(58) Field of Classification Search ................ None
See application file for complete search history.

(56) References Cited

U.S. PATENT DOCUMENTS 5,079,698 A 1/1992 Grenier et al.
(Continued)

FOREIGN PATENT DOCUMENTS

EP 1 137 267 9/2001
(Continued)

OTHER PUBLICATIONS

U.S. Office Action issued Aug. 22, 2007 issued in U.S. Appl. No. 10/500,597.
(Continued)

*Primary Examiner* — Randolph I Chu
(74) *Attorney, Agent, or Firm* — Wenderoth, Lind & Ponack, L.L.P.

(57) ABSTRACT

An image processing apparatus for automatically improving the contrast of an input image that is obtained from a digital camera or the like, and obtaining a sharper and clearing image. A contrast improvement unit performs a contrast improvement process on the input image by comparing an object pixel in the input image with pixels in the surrounding area. An image combination unit combines the enhanced image obtained by the contrast improvement process with the input image. The combined image is then output to a desired device such as a printer by an image output unit.

7 Claims, 68 Drawing Sheets

U.S. PATENT DOCUMENTS

| | | | |
|---|---|---|---|
| 5,245,432 A * | 9/1993 | Jaffray et al. | 348/578 |
| 5,585,841 A | 12/1996 | Hardin | |
| 5,696,840 A | 12/1997 | Usami | |
| 5,790,714 A | 8/1998 | McNeil et al. | |
| 5,818,973 A | 10/1998 | Hsu | |
| 6,239,772 B1 | 5/2001 | Hentschel et al. | |
| 6,603,886 B1 | 8/2003 | Matama | |
| 6,642,968 B1 | 11/2003 | Ford et al. | |
| 6,664,973 B1 | 12/2003 | Iwamoto et al. | |
| 6,788,822 B1 | 9/2004 | Zhang et al. | |
| 6,836,570 B2 * | 12/2004 | Young et al. | 382/274 |
| 6,856,704 B1 * | 2/2005 | Gallagher et al. | 382/263 |
| 7,386,185 B2 | 6/2008 | Watanabe et al. | |
| 2002/0031246 A1 * | 3/2002 | Kawano | 382/132 |
| 2002/0141640 A1 | 10/2002 | Kraft | |
| 2003/0118226 A1 * | 6/2003 | Winsor et al. | 382/132 |
| 2003/0142750 A1 * | 7/2003 | Oguz et al. | 375/240.18 |
| 2005/0117811 A1 | 6/2005 | Hoshino | |

FOREIGN PATENT DOCUMENTS

| | | |
|---|---|---|
| EP | 1 139 284 | 10/2001 |
| JP | 4-507314 | 12/1992 |
| JP | 6-141229 | 5/1994 |
| JP | 9-35056 | 2/1997 |
| JP | 10-150566 | 6/1998 |
| JP | 11-127361 | 5/1999 |
| JP | 2000-50042 | 2/2000 |
| JP | 2000-285230 | 10/2000 |
| JP | 2001-14456 | 1/2001 |
| JP | 2001-076122 | 3/2001 |
| WO | 91/02425 | 2/1991 |
| WO | 97/45809 | 12/1997 |

OTHER PUBLICATIONS

Japanese Office Action issued Jan. 31, 2007 in Application No. 2002-198394 (English Translation).

Japanese Office Action issued Feb. 27, 2007 in Application No. 2002-239134 (English Translation).

Edwin H. Land, "An alternative technique for the computation of the designator in the retinex theory of color vision," National Academy of Science, vol. 84, pp. 3078-3080, 1986.

Edwin H. Land & John J. McCann, "Lightness and Retinex Theory," Journal of the Optical Society of America, vol. 61, No. 1, pp. 1-11, 1971.

International Search Report mailed May 20, 2003 for International Application No. PCT/JP03/01450.

Supplementary European Search Report issued Jan. 12, 2010 in the corresponding European Application No. 03 70 3336.

Japanese Office Action issued Mar. 17, 2010 in Japanese Application No. 2007-090803.

\* cited by examiner

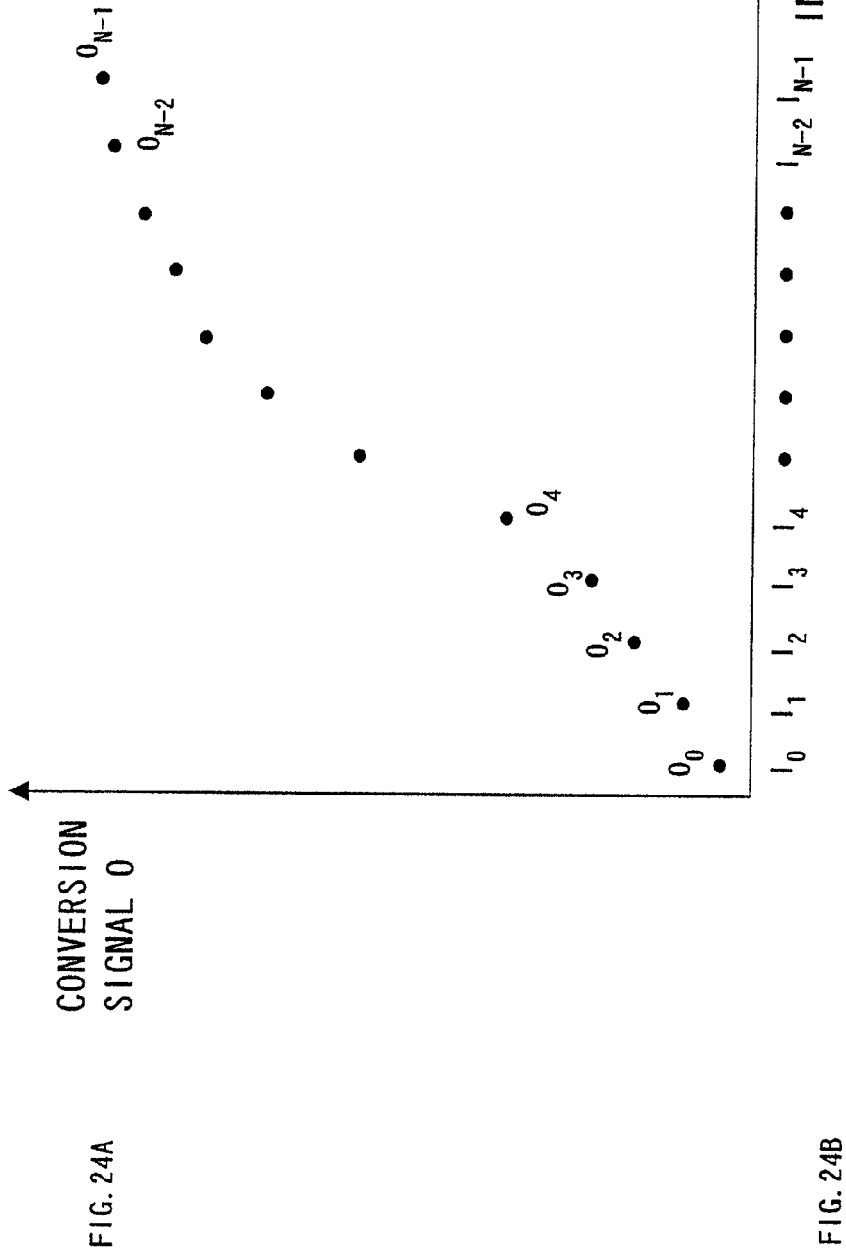

FIG. 32

| -1.0 | -1.0 | 0.0 | 1.0 | 1.0 |
|---|---|---|---|---|
| -1.0 | -1.0 | 0.0 | 1.0 | 1.0 |
| -1.0 | -1.0 | 0.0 | 1.0 | 1.0 |
| -1.0 | -1.0 | 0.0 | 1.0 | 1.0 |
| -1.0 | -1.0 | 0.0 | 1.0 | 1.0 |

Y DIRECTION

| -1.0 | -1.0 | 0.0 | 1.0 | 1.0 |
|---|---|---|---|---|
| -1.0 | -1.0 | 0.0 | 1.0 | 1.0 |
| -1.0 | -1.0 | 0.0 | 1.0 | 1.0 |
| -1.0 | -1.0 | 0.0 | 1.0 | 1.0 |
| -1.0 | -1.0 | 0.0 | 1.0 | 1.0 |

X DIRECTION

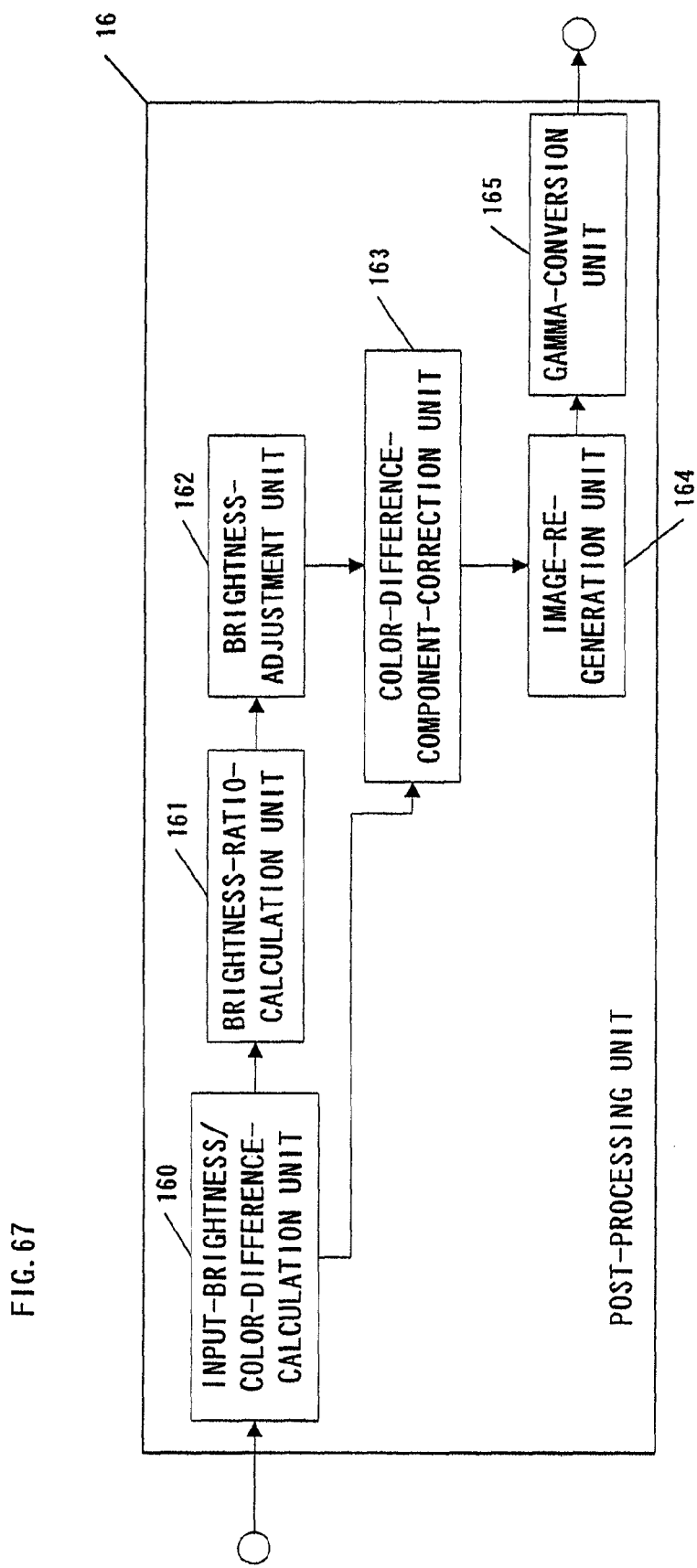

IMAGE PROCESSING APPARATUS AND IMAGE PROCESSING METHOD FOR ADAPTIVELY PROCESSING AN IMAGE USING AN ENHANCED IMAGE AND EDGE DATA

This application is a Divisional Application of Ser. No. 12/117,343 filed May 8, 2008, now U.S. Pat. No. 7,773,826 which is a Continuation Application of Ser. No. 10/500,597, filed Jul. 1, 2004, Now Pat. No. 7,386,185 of which is the National Stage of International Application No. PCT/JP03/01450, filed Feb. 12, 2003.

TECHNICAL FIELD

This invention relates to an image processing apparatus and image processing method for automatically improving the contrast of an image obtained using a digital camera or the like.

BACKGROUND ART

The dynamic range of a Digital Still Camera (DSC) is greatly limited by SN levels which indicate the noise ratio of analog values obtained from the CCD image sensor and by the precision of converting analog values to digital values. Therefore, detail in dark area tends to be lost in the image taken by the DSC. Particularly, this tendency is large in samples where there are both light areas and dark areas.

As a method of improving the quality of the image, first there is a method of enhancing the contrast such that the brightness range of the digital image extends from the region of high brightness to the region of low brightness.

As a conventional method of enhancing the contrast there is the method of histogram equalization. This method is a method that creates a histogram showing the distribution of brightness of all of the pixels on the original image, and uses the accumulated curves of that histogram as the brightness conversion curve to convert the brightness values of the pixels of the original image to new values.

In this method, in order to use the same brightness conversion curve to convert the brightness value of every pixel in the whole of the original image to a new brightness value, there may be a partial decrease in contrast.

In order to avoid this, a contrast enhancement process that is suitable for a part can be performed. Many procedures to do this have been proposed such as a localized histogram equalization method that divides the image into a plurality of rectangular areas and performs histogram equalization for each of the areas.

For example, as disclosed in Japanese unexamined patent publication No. 2000-285230 and as shown in FIG. 1, a contrast correction unit comprises an image division unit 2001, histogram creation unit 2002 and contrast stretching unit 2003.

The image division unit 2001 divides the input image into rectangles. The histogram creation unit 2002 creates histograms for each of the rectangles. The contrast stretching unit 2003 performs contrast stretching for each of the rectangles.

In the method of this disclosure as well, problems occur in that there are rectangular areas for which the contrast is enhanced too much, and the contrast is not continuous at the boundary between adjacent rectangular areas.

A technique has also been proposed that solves these problems in which a histogram is not used. For example, as disclosed in Japanese unexamined patent publication No. H6-141229, the shutter time and lens stops of the digital camera are changed for each field, to photograph the light areas and dark areas separately. By combining both of the obtained images into one image, halftone densities are presented. This makes it possible to obtain an image having a large dynamic range.

FIG. 2 is a block diagram showing the construction of the image processing apparatus disclosed in Japanese unexamined patent publication No. H6-141229. In this image processing apparatus, the image sensor 2101 performs photoelectric conversion of the light image of the photographed object. An image combination unit 2102 weights and combines two or more images having different electric charge storage periods in the image sensor according to the signal levels of the images. In order to accomplish this, the image combination unit 2102 comprises: a memory 2103, a multiplication unit 2104, level weighting units 2105 and 2106, and an adding unit 2107. The memory 2103 stores image signals. The multiplication unit 2104 multiplies a constant to a signal level. The level weighting units 2105 and 2106 modify the image signals by weights, and the adding unit 2107 adds the image signals.

Also, a speed conversion unit 2108 converts the speed of the image signal, and a level compression unit 219 compresses the level of the image signal. Moreover, a timing control unit 2110 controls the timing of each block. This apparatus is for a television imaging system that compresses a television signal to a standard level, so in order to convert the obtained combined image output to speed of a standard television signal, there is a speed conversion unit and a level compression unit. In the case of applying this kind of technique to a digital camera, the speed conversion unit and level compression unit are not necessary.

In the case of the method of combining images obtained for a plurality of electric charge storage periods as described above, it is unlikely that a discontinuity of contrast occurs in the combined image. However, since this method is required to take at least two images in sequence, this is impossible to take the same images in principal. Therefore, when the images are combined, there is a possibility that an image will be created in which the detailed parts of the combined image will be blurred or shifted, although depending on the shutter speed. Also, when it is not possible to cover the entire density range of the image with the density range obtained when photographing the light area and the density range obtained when photographing the dark area, there is a danger that discontinuity will occur in the middle density range.

Also, a method for improving the image quality of a digital image by using the Retinex theory has been disclosed in International Publication No. WO97/45809 or Published Japanese translation of PCT international application No. 2000-511315. When a person observes an object, the problems mentioned above do not occur for detailed areas and colors in dark areas. People are capable of visually perceiving the large density dynamics and colors of the original images. Taking notice of this human visual perception, the concept of center/surround Retinex was introduced by Edwin Land in the publication 'An Alternative Technique for the Computation of the Designator in the Retinex Theory of Color Vision', National Academy of Science, Vol. 84, pp. 3078 to 3080 (1986).

This document explains the concept of the Retinex theory and states that in human visual perception, the center view can be represented by an inverse square function having a diameter of two to four basic units, and that the surround view can be represented by an inverse square function having a diameter of approximately 200 to 250 times that of the center view. Also, the spatial average of the signal intensity in the field of view of both the center view and surround view is defined as being related to the perceived intensity. The method described in the pamphlet or publication is one method of improving the expression of color and lightness in dark areas according to this kind of theory.

FIG. 3 is a block diagram that explains the image processing apparatus described in the pamphlet or publication. Here, the image processing apparatus is explained for a grayscale image as an example, however, that explanation can be expanded to include color images as well.

The processor 2202 and filter 2203 perform adjustment and a filtering process on the values I (i, j) of the pixels (i, j) of the image obtained from the digital image pickup apparatus 2201.

The processor 2202 calculates the adjusted values I'(i, j) given by the following equation 1 for each pixel.

$$I'(i,j) = \log I(i,j) - \log [I(i,j) * F(i,j)] \quad \text{(Eq. 1)}$$

Here, F(x, y) is the surround view function that expresses the surround view, and "*" denotes the convolution operation. By setting the normalization coefficient K such that the condition of Equation 2 below is satisfied, the second term of Equation 1 is the weighted average value of the pixel values of the area corresponding to the surround view.

$$K \iint F(i,j) di\, dj = 1 \quad \text{(Eq. 2)}$$

In other words, Equation 1 is an equation that corresponds to the logarithmic conversion of the ratio of each pixel to the average value in a large area. The surround view function F(i, j) is designed from the correspondence to the model of human visual perception such that the contributing ratio becomes higher closer to the object pixel, and a Gaussian function such as that of Equation 3 below is applied.

$$F(i,j) = \exp(-r^2/c^2)$$

$$r = (i^2 + j^2)^{1/2} \quad \text{(Eq. 3)}$$

Here, c is a constant for controlling the adjusted values I'(i, j) for each of the pixel values I(i, j).

When the ratio of the object to with the average pixel value of the area corresponding to the surround view is calculated as the adjusted value I'(i, j), the filter 2203 performs a filtering process on this value, and generates Retinex output R(i, j). This filtering process is a process of converting the adjusted value I'(i, j) in the logarithmic domain to the value R(i, j) in the domain used by the display 2204, and to simplify this process, a process that uses the same offset and gain conversion function for all of the pixels is adopted.

One problem with this method is that the effect by the constant c that controls the surround function is large. For example, when this constant c is a large value and the area corresponding to the surround view that contributes to improvement becomes large, then it is only possible to compensate for colors in large shadows. On the other hand, when this constant c is a small value and only the pixel values near the object pixel affects improvement, then the improvement is limited to a corresponding small area. Therefore, it is necessary to consider a constant c that is suitable to the image being processed. In order to ease this dependence, the document proposes a method in which areas suitable for a plurality of sizes of surround views are prepared. However, it is not clear how many area sizes should be prepared. By preparing many large areas and small areas in order to increase the improvement precision, the processing time becomes very long.

Also, there is a problem in that knowledge from experience is necessary in order to set a suitable offset and gain conversion function.

Furthermore, when there is very small change in the pixel value in the largest area of the areas set by the plurality of constants c, the adjusted value I'(i, j) comes close to 1.0 regardless of the value I(i, j) even when a plurality of areas are prepared. An adjusted value I'(i, j) for an object pixel in the area with little change is often located near the average value of the adjusted values I'(i, j) for the entire input image. Regardless of the offset and gain conversion function, the adjusted values I'(i, j) gather near the center of the histogram. Therefore, particularly in a large area uniformly having highlight brightness, it becomes easy for the brightness to be adjusted in a direction that lowers the brightness and thus worsens the visual appearance. Also, in a large area where the brightness is low, for example in a night scene, color noise and compression noise that occur when taking the photo appear due to excessive enhancement.

SUMMARY OF THE INVENTION

Taking the problems with the prior art into consideration, the object of this invention is to provide an image processing apparatus that can easily improve the contrast with high quality.

In order to accomplish this objective, with the image processing apparatus of this invention, a contrast improvement unit performs a contrast improvement process on an input image by comparing an object pixel of the input image with pixels that belong to areas surrounding the object pixel. An image combination unit combines the enhanced image obtained from the contrast improvement unit with the input image. The image after being combined is then output to a device such as a printer by the image output unit.

In this way it is possible to easily improve the contrast and improve the image quality of the output image.

In the contrast improvement unit of this image processing apparatus, a correction data calculation unit may find the amount to improve the contrast for the pixels in the input image. An extraction unit extracts an effective range from distribution of the amount of contrast improvement. A pixel value conversion unit converts the amount of contrast improvement of the object pixel to the value of the corresponding pixel in the enhanced image according to extracted range.

This correction data calculation unit can also find the amount of contrast improvement by comparing the object pixel with pixels that belong to each of surrounding areas of different sizes. In this case, it is possible to reduce the effect due to the setting of constants indicating the effect of the input image and the size of the surrounding areas.

Also, in the pixel value conversion unit, an average brightness calculation unit calculates the average brightness of the pixels in the input image. A conversion method selection unit selects the method for converting the contrast improvement amount to the pixel value in the enhanced image based on the average brightness. A pixel estimation unit converts the contrast improvement amount to the pixel value of the enhanced image by the selected conversion method.

In this way it is possible to easily and accurately perform contrast improvement.

The pixel value conversion unit may comprise a standard intensity calculation unit, conversion curve estimation unit and pixel value estimation unit. The standard intensity calculation calculates the standard intensity value that indicates the intensity of the contrast of the input image. The conversion curve estimation unit estimates a conversion curve for converting the contrast improvement amount to the value of the enhanced image based on the standard intensity value. The pixel value estimation unit uses the conversion curve to convert the contrast improvement amount to the value of the enhanced image.

In this case, it is possible to easily improve the contrast by using automatically estimated conversion curves.

In this conversion curve estimation unit, an initial candidate setting unit may set an initial population of search vectors that express the conversion curves. A pixel value conversion candidate calculation unit uses the candidates for the conversion curve that correspond to each search vector to find a conversion value in the candidate for the enhanced image from the contrast improvement amount. An evaluation value calculation unit uses the standard intensity value and conversion value to calculate an evaluation value for evaluating the candidates of each conversion curve. A fitness calculation unit calculates the fitness of the candidates of the conversion curve based on the evaluation value. A recombination operation unit performs recombination operation on the selected search vector based on the fitness for the candidates of each conversion curve and generates a next generation population. An estimation end judgment unit determines whether or not to end the estimation of conversion curves with the generation.

By performing estimation using a genetic algorithm in this way, it is possible to automatically obtain an optimized conversion curve and to easily perform contrast improvement with high quality.

It is also possible to find the amount of contrast improvement for signals such the lightness or brightness signal. In that case, in the contrast improvement unit, a signal conversion unit converts the pixel values of the input image to a plurality of signals that include the signals that are the object of contrast improvement. An object correction data calculation unit finds the amount of contrast improvement of the object pixel for the object signal obtained from the signal conversion unit. The extraction unit extracts an effective range from the distribution of the contrast improvement amount for the object signal. An object signal conversion unit converts the contrast improvement amount for the object signal to the value of the object signal in the enhanced image according to the extracted range. The object signal conversion unit finds the value of the pixels on the enhanced image based on the object signal of the enhanced image and signals other than the object signal obtained by the signal conversion unit.

This correction data calculation unit can also find the amount of contrast improvement by comparing the value of the object signal of the object pixel with the values of the object signals of pixels that belong to each of surrounding areas having different sizes. In this way it is possible to perform high quality contrast improvement.

The object signal conversion unit may comprise an average object signal calculation unit, and average object signal calculation unit and object signal estimation unit. The average object signal calculation unit calculates the average value of the object signal of the input image. The average object signal calculation unit selects a conversion method for converting the contrast improvement amount of the object signal to the value of the object signal of the enhanced image based on the average value. The object signal estimation unit converts the contrast improvement amount of the object signal to a value of the object signal of the enhanced image using the selected conversion method.

In this way it is possible to easily and accurately improve the contrast.

Furthermore, the object signal conversion unit may comprise a standard intensity calculation unit, an object signal conversion curve estimation unit and object signal estimation unit. The standard intensity calculation unit calculates the standard intensity value that indicates the intensity of the contrast of the input image for the object signal obtained by the signal conversion unit. The object signal conversion curve estimation unit estimates a conversion curve for converting the contrast improvement amount of the object signal to the value of the enhanced image based on the standard intensity value. The object signal estimation unit uses the estimated conversion curve to convert the contrast improvement amount to the value for the enhance image.

Even when performing processing for the object signal in this way, a generic algorithm may be used for estimating the conversion curves. In that case, in the object signal conversion curve estimation unit, the initial candidate setting unit sets an initial population of search vectors that express the conversion curves. The object signal conversion candidate calculation unit uses the candidates of the conversion curve that corresponds to each of the search vectors to find a conversion value for the object signal in the candidate of the enhanced image from the contrast improvement amount for the object signal. The evaluation value calculation unit uses the standard intensity and conversion value to calculate an evaluation value for evaluating the candidates of each conversion curve. The fitness calculation unit calculates the fitness for the candidates of each conversion curve based on that evaluation value. The recombination operation unit performs recombination operation on the selected search vectors based on the fitness for the candidates of each conversion curve and generates the next generation population. The estimation end judgment unit determines whether or not to end the estimation of conversion curves with the generation.

Also, in the image combination unit of this image processing apparatus, a selection standard value judgment unit may determine whether to give priority to the input image or enhanced image. A combination coefficient calculation unit sets combination coefficients for the input image and enhanced image based on the result of the selection standard value judgment unit. A weighted average combination unit uses the combination coefficients set for respective images to generate a weighted average image for the input image and enhanced image.

By controlling the combination coefficients, it becomes possible to perform high quality improvement.

Also, in another image processing apparatus, the contrast improvement unit performs a contrast improvement process on the input image by comparing the object pixel of the input image with the pixels in the area surrounding the object pixel. An edge data detection unit extracts edge data of the input image. An image combination unit combines the enhanced image obtained from the contrast improvement unit with the enhanced image based on the edge data obtained by the edge data detection unit. The image after combination is output by an image output unit.

In this way it is possible to improve the contrast while suppressing decreases in the density level of uniform highlighted areas and sudden increases in the density level of shadow areas. Furthermore, it is possible to decrease color cast.

In the contrast improvement unit of this image processing apparatus, the correction data calculation unit may find the amount to improve the contrast for the pixels in the input image. The extraction unit extracts an effective range from the distribution of the contrast improvement amount. The pixel value conversion unit converts the contrast improvement amount of the object pixel to the value of the corresponding pixel in the enhanced image according to the extracted range.

This correction data calculation unit can also find the amount to improve the contrast by comparing the object pixel with pixels in each of surrounding areas of different sizes. In this case, it is possible to automatically improve the contrast of the input image without being affected by the dynamic range of the pixel value of the input image or the size of dark areas such as shadows.

Also, in the image combination unit, the combination coefficient calculation unit calculates the combination coefficients for the input image and the enhanced image based on the edge data obtained from the input image. The weighted average combination unit generates a weighted average image for the input image and the enhanced image based on the combination coefficients calculated for the respective images.

By controlling the combination coefficients based on the edge data, it is possible to improve the contrast while suppressing decreases in the density level of uniform highlighted areas and sudden increases in the density level of shadow areas. Furthermore, it is possible to decrease color cast.

Also, in yet another image processing apparatus, the contrast improvement unit performs a contrast improvement process on the input image by comparing an object pixel of the input image with pixels that belong to an area surrounding the object pixel. A density correction unit corrects the density distribution of the enhanced image obtained from the contrast improvement unit according to the density distribution of the input image. The image combination unit combines the corrected image obtained from the density correction unit with the input image. The image after combination is output by the image output unit.

In this apparatus, by correcting the density of areas where there are large changes, such as decreases in density that occur in highlighted areas or sudden increases in density in shadow areas of the enhanced image, it is possible to match the density in the output image somewhat with the input image.

In this case, in the image combination unit, the weighted average combination unit generates a weighted average image for the input image and corrected image, and the output value setting unit sets the pixel values in the output image based on the image obtained by the weighted average combination unit and the input image.

Since the density is corrected, it is possible to suppress decreases in density in highlighted areas and sudden increases in density in shadow areas in the image obtained from the weighted average combination unit as well.

Also, in yet another image processing apparatus, an edge data detection unit detects edge data of the input image. The contrast improvement unit performs a contrast improvement process on the input image by determining the area where the object pixel belongs based on the edge data of the object pixel obtained from the edge data detection unit and the brightness of the object pixel, and by comparing the object pixel with the pixels that belongs to the area surrounding the object pixel. The image combination unit combines the enhanced image obtained by the contrast improvement unit with the input image. The image after combination is output by the image output unit.

By determining the area of the object pixel based on the edge data, it is possible to sharpen the edges, and it is possible to improve the contrast while suppressing the enhancement of noise in uniform shadow areas and decreases in density in highlighted areas.

In the image combination unit of this image processing apparatus as well, the weighted average combination unit generates a weighted average image for the input image and corrected image, and the output value setting unit sets the pixel values in the output image based on the images obtained by the weighted average combination unit and the input image.

Also, in yet another image processing apparatus, the edge data detection unit detects edge data of the input image. The contrast improvement unit performs a contrast improvement process on the input image by determining the area of the object pixel based on the edge data of the object pixel obtained from the edge data detection unit and the brightness of the object pixel, and by comparing the object pixel with the pixels that belongs to the area surrounding the object pixel. The image combination unit combines the enhanced image obtained by the contrast improvement unit and the input image. The image after combination is output by the image output unit.

By using the edge data in this way, it is possible to sharpen the edges and it is possible to improve the contrast while suppressing the enhancement of noise in uniform shadow areas and decreases in density in highlighted areas. Furthermore, by performing adaptive combination based on the edge data, it is possible decrease color cast.

In the contrast improvement unit of this image processing apparatus, an area judgment unit may determine the area to which the object pixel belongs based on the edge data. A comparison range setting unit selects a pixel comparison range based on the area obtained by the area judgment unit. The correction data calculation unit finds the amount to improve the contrast of the object pixel based on the pixel comparison range selected by the comparison range setting unit. An adjustment coefficient calculation unit calculates an adjustment coefficient for the amount of contrast improvement based on the area obtained by the area judgment unit. An adjustment unit corrects the amount of contrast improvement using the adjustment coefficient obtained by the adjustment coefficient calculation unit. The extraction unit extracts an effective range from the distribution of the corrected contrast improvement amount. The pixel value conversion unit converts the contrast improvement amount of the object pixel to a value of the corresponding pixel in the enhanced image.

This correction data calculation unit can also find the amount to improve the contrast by comparing the object pixel with the pixels that belongs to each of surrounding areas of different sizes. In this way it is possible to suppress the bad influence caused by misjudgment on the size of the area. Furthermore it is possible to decrease color cast on the edges.

Also, in yet another image processing apparatus, the contrast improvement unit has a correction data calculated density binding unit that binds the density of the pixels that belongs to the area surrounding the object pixel of the input image. In the bound state, the contrast improvement unit performs a contrast improvement process on the input image by comparing the object pixel of the input image with the pixels in the surrounding area. The image output unit outputs the enhanced image obtained by the contrast improvement unit.

In this way it is possible to improve the contrast while suppressing decreases in the density of uniformly highlighted areas and sudden increases in the density of large uniform shadow areas. Furthermore, since the enhanced image is output, it is possible to decrease color cast.

This image processing apparatus may further comprise the image combination unit. This makes it to suppress decreases in density of large uniformly highlighted areas and sudden increases in density of large uniform shadow areas.

In the contrast improvement unit of this image processing apparatus, the correction data calculation unit may find the amount to improve the contrast of the object pixel. The extraction unit extracts an effective range from the contrast distribution. The pixel value conversion unit converts the contrast improvement amount of the object pixel to the value of the corresponding pixel in the enhanced image according to the extracted range.

This correction data calculation unit can also find the amount to improve the contrast by comparing the object pixel with pixels that belongs to each of surrounding areas of different sizes. In this case, it is possible to automatically improve the contrast of the input image without being affected by the dynamic range of the pixel values or the size of the dark areas of the input image.

Also, in yet another image processing apparatus, a pre-processing unit performs pre-processing on the input image. The contrast improvement unit performs a contrast improvement process on the pre-processed image by comparing the object pixel of the pre-processed image with the pixels in the surrounding area of the object pixel. The image combination unit combines the enhanced image obtained by the contrast improvement unit with the input image. A post-processing unit performs post-processing on the combined image. The post-processed image is output by the image output unit.

In this way, it is possible to properly improve the contrast while suppressing decreases in the density of uniformly highlighted areas and sudden increases in the density of shadow areas, even for an input image for which gamma conversion has been performed beforehand by a digital camera or the like.

In the contrast improvement unit of this image processing apparatus, the comparison pixel setting unit may set comparison pixels to be used for comparison from among the pixels in the surrounding area of the object pixel. The correction data calculation unit finds the amount to improve the contrast of the object pixel. A conversion standard value calculation unit finds a conversion standard value for converting the contrast improvement amount to the value of the pixel in the enhanced image. The pixel value conversion unit converts the contrast improvement amount to the value of the pixel in the enhanced image based on that conversion standard value.

By finding the value of the pixel in the enhanced image based on the conversion standard value, it is possible to easily improve the contrast while suppressing flatness of the image that occurs in the combined image of the input image and enhanced image, and decreases in the density differences along the contour areas.

In this image processing apparatus, for example, the correction data calculation unit comprises a surrounding average unit that finds the weighted average of the density of the comparison pixels, and an improvement amount calculation unit that finds the amount to improve the contrast from the average density obtained by the surrounding average unit and the density of the object pixel.

The correction data calculation unit may comprise a surrounding average unit, edge data detection unit, correction coefficient calculation unit, comparison amount correction unit and improvement amount calculation unit. The surrounding average unit finds the weighted average of the density of the comparison pixels. The edge data detection unit detects the edge data of the object pixel. The correction coefficient calculation unit calculates the correction coefficient for the edge data obtained by the edge data detection unit. The comparison amount correction unit corrects the average density obtained by the surrounding average unit using the correction coefficient. The improvement amount calculation unit finds the amount to improve the contrast from the corrected average density and the density of the object pixel.

By controlling the average density in this way, it is possible to enhance the difference between the density of the object pixel and the average density, and it is possible to improve the flatness of the image that occurs in the combined image of the input image and enhanced image, and the decrease in the density difference in the contour areas.

Also, the correction data calculation unit may comprise a surrounding average unit, an improvement amount calculation unit, an enhanced component calculation unit and improvement amount correction unit. The surrounding average unit finds the weighted average of the density of the comparison pixels. The improvement amount calculation unit finds the amount to improve the contrast from the average density obtained by the surrounding average unit and the density of the object pixel. The enhanced component calculation unit calculates the enhanced component from the density difference of the comparison pixels and the object pixel. The improvement correction unit adds the enhanced component to the contrast improvement amount.

By doing this, as well, it is possible to improve the flatness of the image that occurs in the combined image of the input image and enhanced image, and the decrease in the density difference in the contour areas.

Also, in this image processing apparatus, processing can be simplified by using part of the pixels in the area surrounding the object pixel for comparison with the object pixel. In that case, in the contrast improvement unit, the comparison pixel setting unit sets the position in the vertical direction of the pixel to be used in the comparison from among the pixels in the area surrounding the object pixel. A vertical direction addition unit adds a weight in the vertical direction to the density of the comparison pixel obtained from the setting. A simplified surrounding average unit calculates the comparison density for the object pixel from the value at each horizontal pixel position in the surrounding area obtained by the vertical direction addition unit. The improvement amount calculation unit finds the amount to improve the contrast from the comparison density and the density and the density of the object pixel. The conversion standard value calculation unit finds a conversion standard value for converting that contrast improvement amount to the value of the pixel in the enhanced image. The pixel value conversion unit converts the contrast improvement amount to the value of the pixel in the enhanced image based on the conversion standard value.

By cutting down the number of pixels in the vertical direction of the surrounding area as well as in the horizontal direction, it is possible to further simplify the process. In that case, in the contrast improvement unit, the comparison pixel setting unit sets the positions in the vertical direction and the positions in the horizontal direction of the pixel to be used in the comparison from among the pixels in the area surrounding the object pixel. The selected vertical direction addition unit adds a weighting to the vertical direction of the density of the comparison pixels obtained from the setting. The simplified surrounding average unit calculates the comparison density for the object pixel from the addition value obtained by the selected vertical direction addition calculation unit. The improvement amount calculation unit finds the amount to improve the contrast from that comparison density and the density of the object pixel. The conversion standard value calculation unit finds the conversion standard value for converting that contrast improvement value to the value of the pixel in the enhanced image. The pixel value conversion unit converts that contrast improvement value to the value of pixel in the enhanced image based on the conversion standard value.

Also, in this image processing apparatus, the pre-processing unit performs inverse conversion of the gamma conversion that is preset in the input image, for example, and the post-processing unit performs the gamma conversion.

Furthermore, by using a value that is proportional to the color component of the input image, it is possible to suppress color distortion in the combined image, and thus it is possible to finally output an image with high image quality. In that case, in the post-processing unit an input brightness/color calculation unit calculates the brightness value and color difference components of the input image. A brightness adjustment unit compares the brightness component of the input image obtained by the input brightness/color calculation unit with the brightness component of the combined image, and adjusts the brightness component of the combined image. A color component correction unit corrects the color components of the input image obtained by the input brightness/color calculation unit based on the brightness component of the combined image obtained by the brightness adjustment unit. An image regeneration unit regenerates the combined image using the brightness component of the combined image obtained by the brightness adjustment unit and the corrected color components obtained by the color component correction unit. A gamma conversion unit performs gamma conversion on the combined image obtained by the image regeneration unit.

Also, from another aspect, this invention provides an image processing method and image processing program that corresponds to this kind of image processing apparatus. That image processing program may be provided over a telecommunication network such as the Internet, or may be provided in a recorded state on a computer readable recording medium such as a CD-ROM.

The image processing apparatus and image processing method will be explained in detail with reference to the drawings as follows.

BRIEF DESCRIPTION OF DRAWINGS

FIGS. 24A and 24B are schematic diagrams that graphically show the marker chromosome structure used in the genetic algorithm.

FIG. 32 is a diagram showing an example of the filter coefficient.

FIG. 67 is a diagram showing the construction of the post-processing unit in this eighteenth embodiment. And, FIG. 68 is a flowchart explaining the post-processing in this eighteenth embodiment

DETAILED DESCRIPTION OF THE INVENTION

First Embodiment

Figure 1:
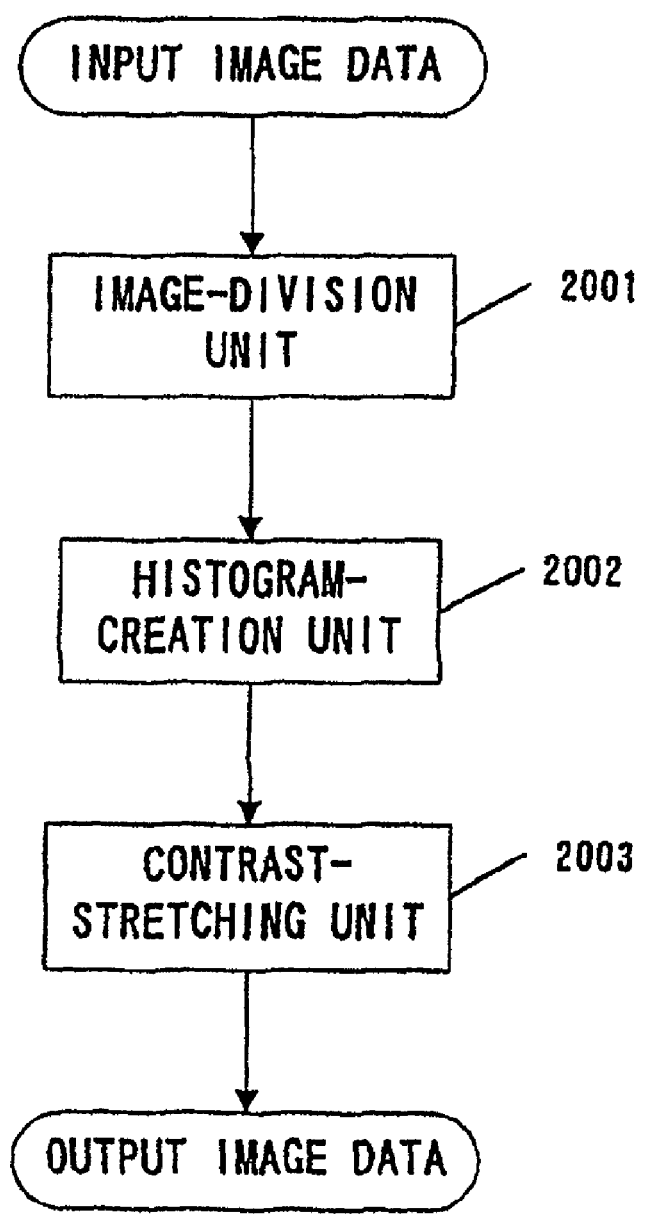
FIG. 1 is a block diagram showing a prior image processing apparatus using a method of localized equalization.
Figure 2:
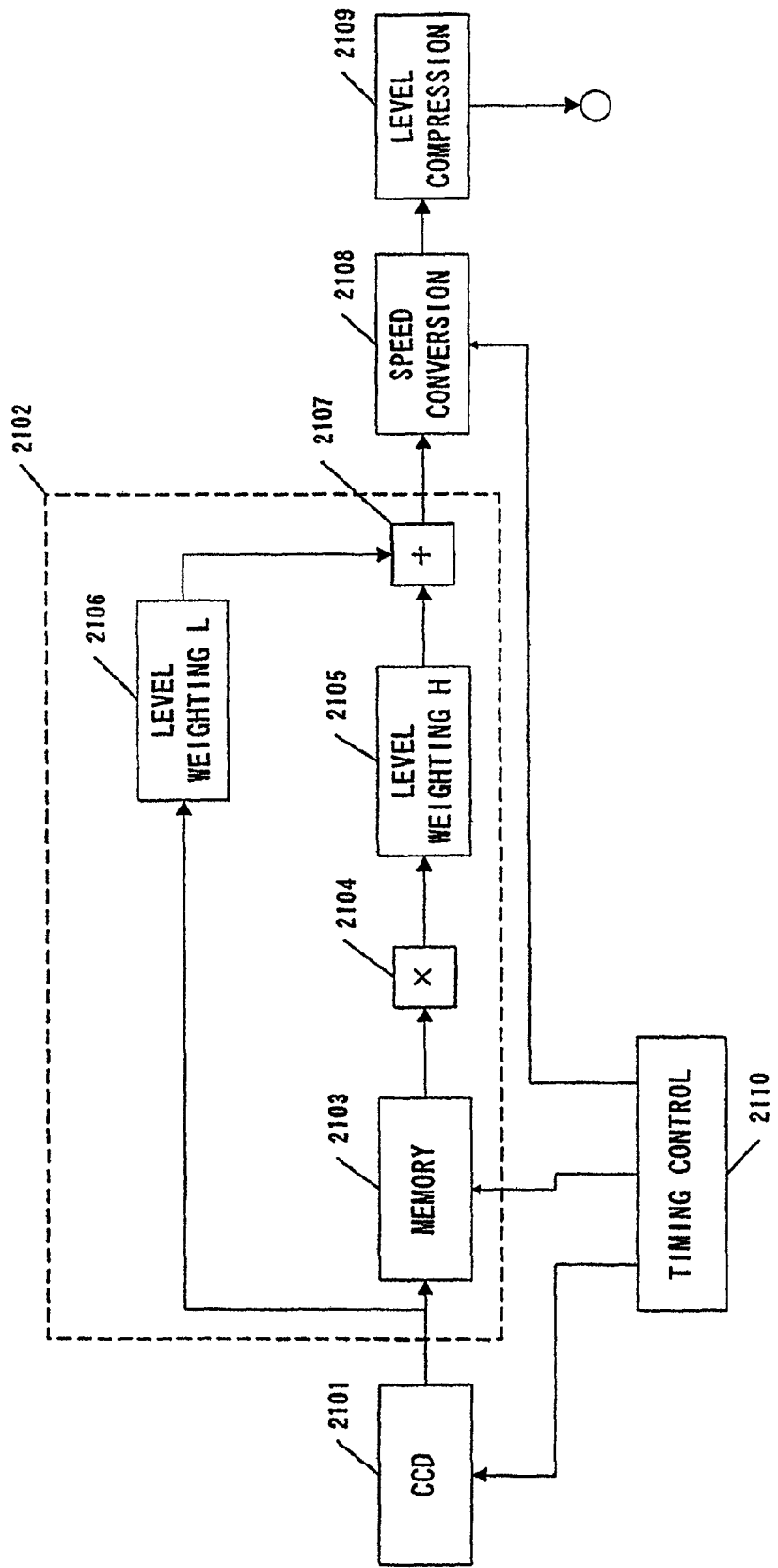
FIG. 2 is a block diagram showing a prior image processing apparatus using a method for combining the image obtained in a plurality of charge storage periods.
Figure 3:
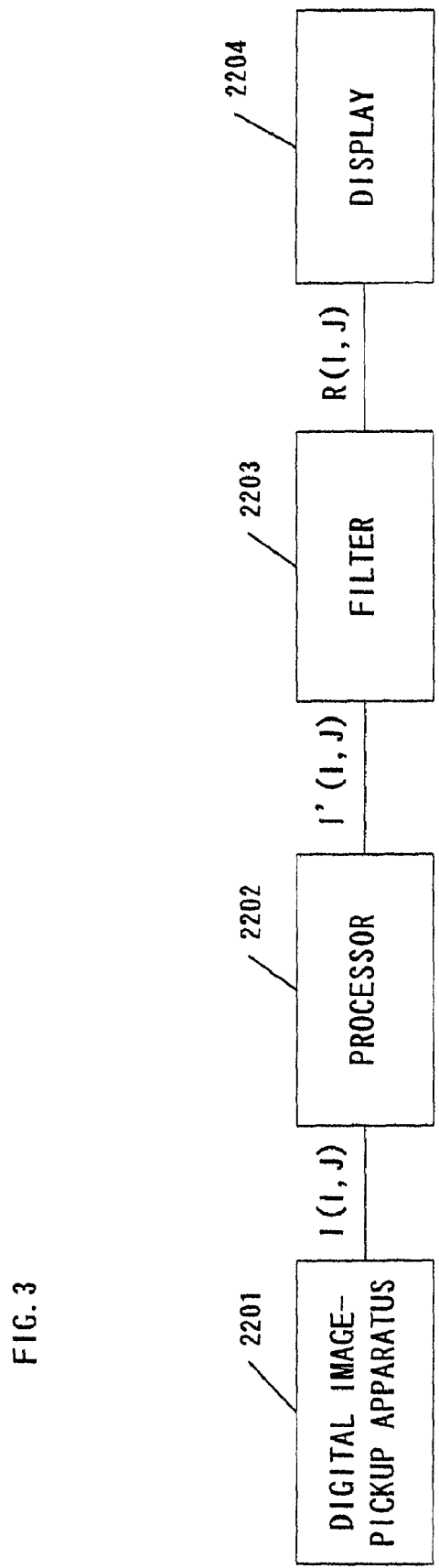
FIG. 3 is a block diagram that explains a prior image processing apparatus using the Retinex theory.
Figure 4:
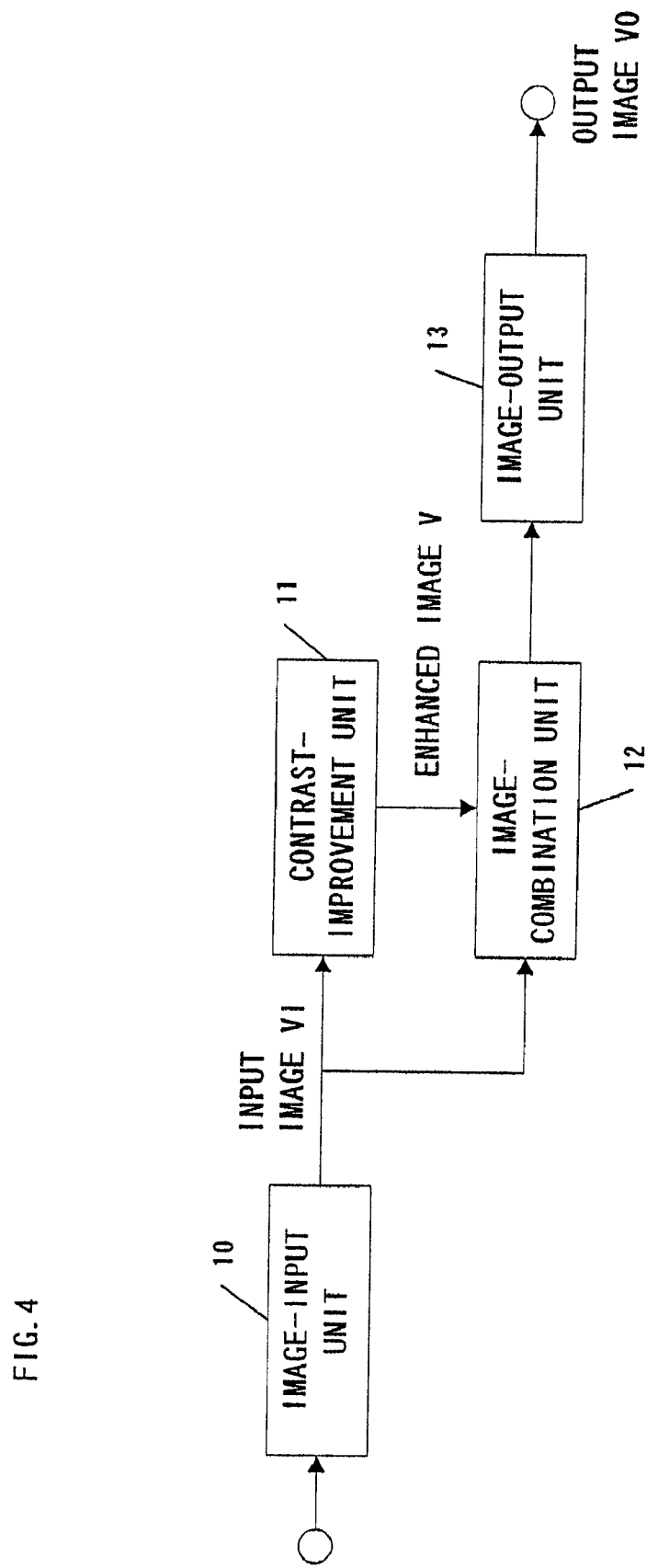
FIG. 4 is a block diagram showing the basic construction of the image processing apparatus of a first embodiment of the invention.

FIG. 4 is a block diagram showing an overview of the construction of the image processing apparatus in the first embodiment of the invention.

In this image processing apparatus, after obtaining an analog image signal from the image pickup device, such as a CCD, the image input unit 10 converts it to a digital image. The contrast improvement unit 11 performs the contrast improvement process on the input image vi that was input from the image input unit 10. The image combination unit 12 combines the enhanced image v obtained from the contrast improvement unit 11 and the input image vi from the image input unit 10. The image output unit 13 outputs the combined image obtained from the image combination unit 12 to a desired device such as a printer or display as the final output image (analog image signal) vo.

Figure 5:
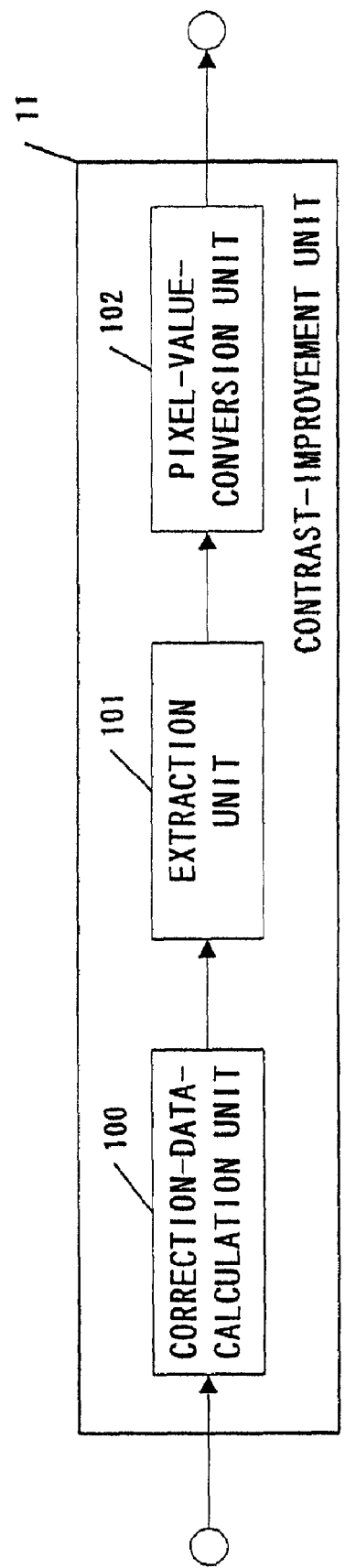
FIG. 5 is a block diagram showing the contrast improvement unit of the first embodiment.

FIG. 5 is a block diagram showing an overview of the construction of the contrast improvement unit.

In this contrast improvement unit 11, a correction data calculation unit 100 calculates the amount of contrast improvement VRPij (Rr(i, j), Rg(i, j), Rb(i, j)) by comparing the three color components VPij (r(i, j), g(i, j), b(i, j)) at the object pixel Pij(i, j) with the pixels surrounding the object pixel. The extraction unit 101 extracts an effective range for that value from the distribution of the contrast improvement amount VRPij obtained from the correction data calculation unit 100. The pixel value conversion unit 102 converts that contrast improvement amount VRPij to the value on the enhanced image v according to the range extracted by the extraction unit 101.

Figure 6:
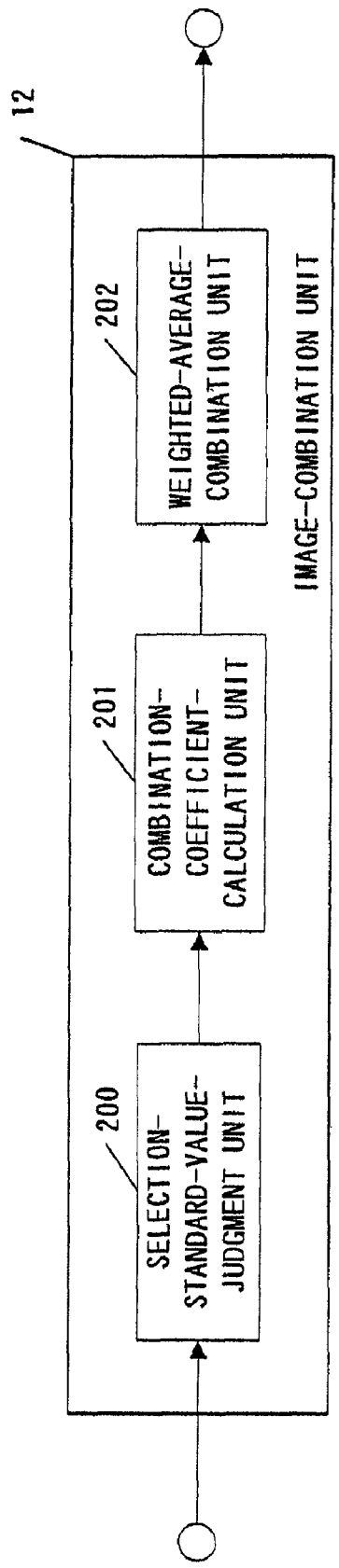
FIG. 6 is a block diagram showing the image combination unit of the first embodiment.

FIG. 6 is a block diagram showing an overview of the construction of the image combination unit.

In the image combination unit 12, the selection standard value judgment unit 200 determines whether to give the input image vi or the enhanced image v obtained from the contrast improvement unit 11 priority based on the brightness of the input image vi. The combination coefficient calculation unit 201 sets a combination coefficient w0 for the input image vi and a combination coefficient w1 for the enhanced image v obtained from the contrast improvement unit 11 based on the judgment results of the selection standard value judgment unit 200. The weighted average combination unit 202 uses the combination coefficients w0 and w1 obtained from the combination coefficient calculation unit 122 to generate a weighted average image of the input image vi and the enhanced image v obtained from the contrast improvement unit 11.

This image processing apparatus will be explained in further detail. In this example, color image data is input to the contrast improvement unit 11 from the image input unit 10.

Here, the image input unit 10 does not input the digitized components, red r, green g, and blue b, of the color image as they are to the contrast improvement unit 11, but normalizes the data first before inputting it. When performing 8 bit digitization, the data of each component is given a value between 0 and 255, and the image input unit 10 converts that value to a value between 0.0 and 1.0.

Figure 7:
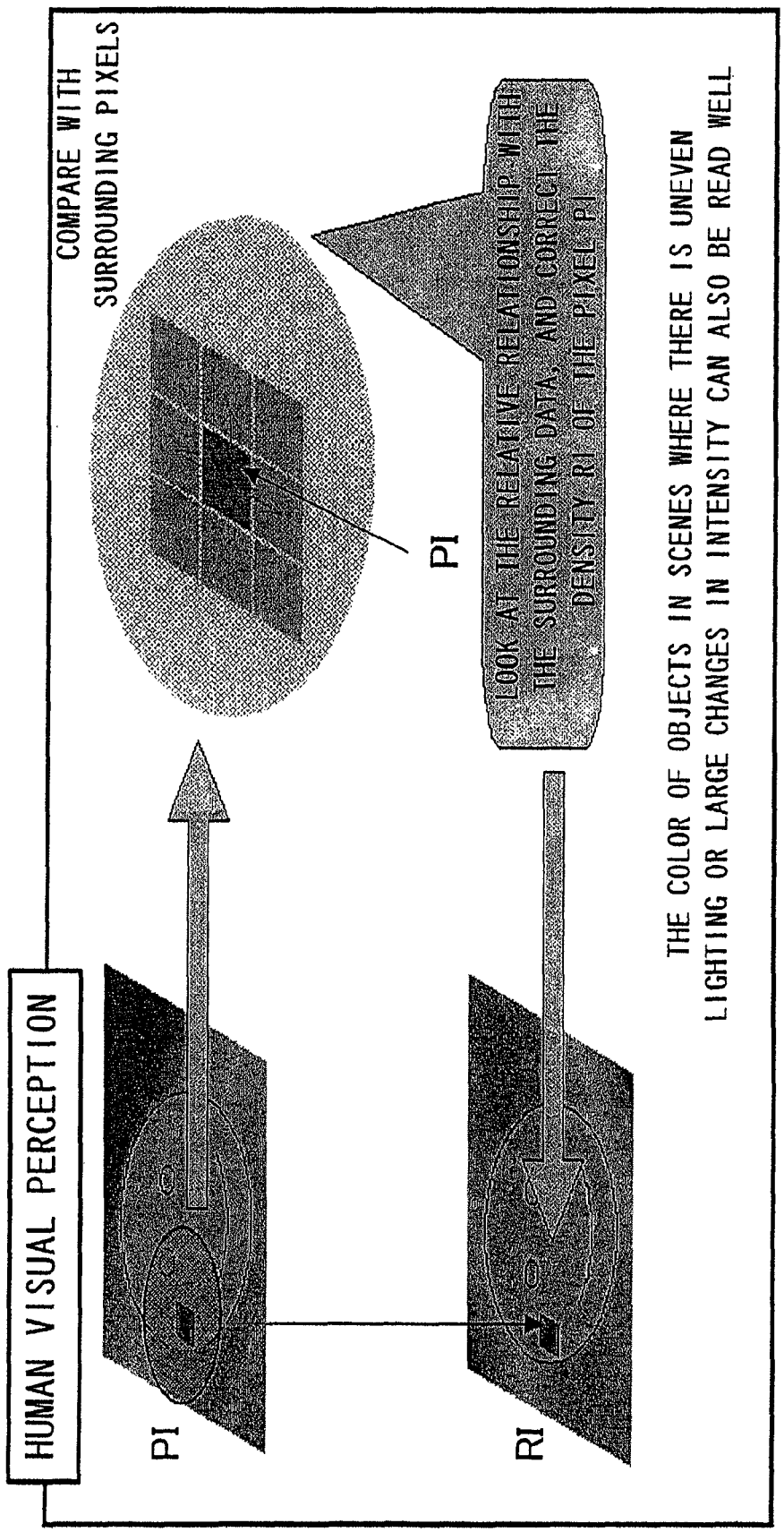
FIG. 7 is a diagram graphically showing human visual perception.

The contrast improvement unit 11 performs the contrast improvement process for that image data in order to improve the contrast in the dark areas of the input image. FIG. 7 is a concept diagram showing the model of human visual perception that is used in this contrast improvement process.

As graphically shown in FIG. 7, humans do not visually perceive image data such as color or contrast by just the pixel value of the object pixel Pij, but adjust the pixel value of the object pixel by the relative relationship between the data of the object pixel Pij and the data of the surrounding pixels and visually perceive that image data. Humans, which have this kind of visual perception, can accurately recognize the colors of an object even in scenes where there is uneven lighting such as when part has different lighting, or scenes where there are large changes in intensity. In this embodiment, by using this kind of Retinex theory, colors and detail data in dark areas such as shadows are clearly expressed.

Figure 8:
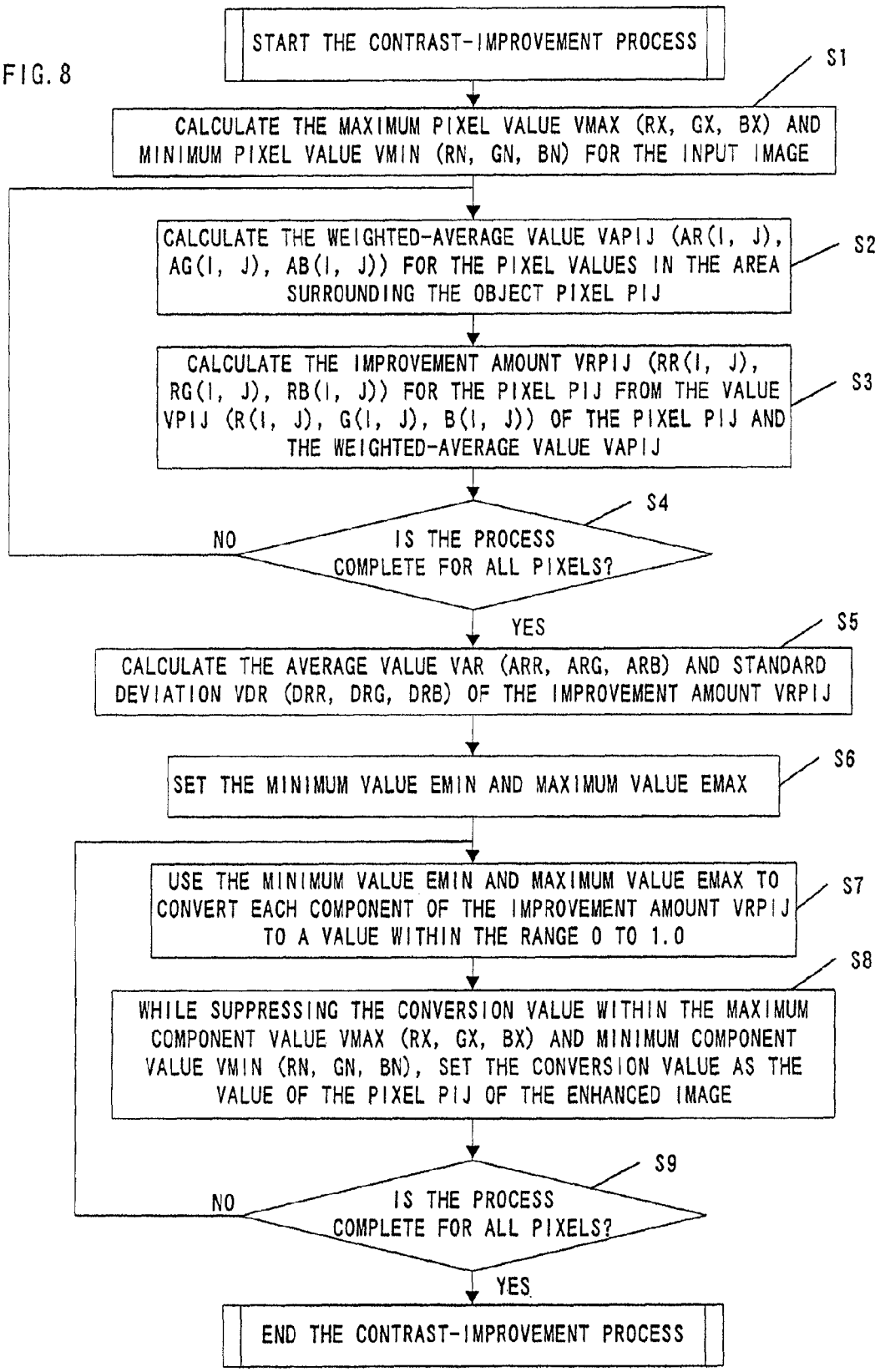
FIG. 8 is a flowchart explaining the contrast improvement process of the first embodiment.

FIG. 8 is a flowchart explaining the contrast improvement process.

When image data is input from the image input unit 10 to the contrast improvement unit 11, the correction data calculation unit 111 calculates the maximum value Vmax (rx, gx, bx) and minimum value Vmin (rn, gn, bn) for each component from each of the pixel values in the input image vi (S1). When there is a large difference in these values for the input image vi and output image vo, there is a possibility that there will be a large sense of incongruity between both images. When trying to suppress this sense of incongruity as much as possible, a process to match the minimum pixel values and maximum pixel values of both images should be performed, and these values should be found in advance using this procedure.

The object pixel Pij is handled as the center view of human sight, and rectangular areas surrounding the object pixel Pij and having the size of c pixels is handled as the surround view. The correction data calculation unit 100 finds the weighted average value VAPij (Ar(i, j), Ag(i, j), Ab(i, j)) for the pixel values in the area corresponding to the surrounding area (S2). Furthermore, the correction data calculation unit 100 calculates the contrast improvement amount VRPij (Rr(i, j), Rg(i, j), Rb(i, j)) connected to the relative relationship between the weighted average value VAPij and the pixel value VPij (S3).

This weighted average value VAPij corresponds to the value of the second item in Equation 1. Similar to the conventional example, it is possible to define that value by the convolution integral of the pixel value VPij (r(i, j), g(i, j), b(i, j)) corresponding to the surround view and the surround view function F(x, y). However, in this embodiment, in order to simplify and quicken the process, the value is defined by Equations 4 below.

$$Ar(i, j) = \sum_i \sum_j r(i, j)/c^2$$

$$Ag(i, j) = \sum_i \sum_j g(i, j)/c^2$$

$$Ab(i, j) = \sum_i \sum_j b(i, j)/c^2$$

(Eqs. 4)

From Equations 4, the value VAPij is given as the average of the pixel values of the rectangular areas corresponding to the surround view and having the size of c pixels.

At this time, the contrast improvement amount VRPij (Rr (i, j), Rg(i, j), Rb(i, j) is given by Equations 5 below.

$$Rr(i, j) = r(i, j)/Ar(i, j)$$

$$Rg(i, j) = g(i, j)/Ag(i, j)$$

$$Rb(i, j) = b(i, j)/Ab(i, j)$$

(Eqs. 5)

The differences of the logarithmic transformation values are not used as in Equation 1. From Equations 5, the contrast improvement amount VRPij is given by the ratio of each of the components to the weighted average value VAPij of the value VPij of the object pixel Pij.

The correction data calculation unit 100 finds the contrast improvement amount VRPij described above for all of the pixels of the input image vi (S4).

The extraction unit 101 finds the average value VaR (aRr, aRg, aRb) of the contrast improvement amount VRPij and the standard deviation value VdR (dRr, dRg, dRb) for each component (S5). The extraction unit 101 uses these values to calculate the minimum value emin and maximum value emax from the distribution of the contrast improvement amount VRPij (S6).

Here, aRr+$\alpha$*dRr, aRg+$\alpha$*dRg, aRb+$\alpha$*dRb are found as candidates for the maximum value emax, and the maximum value of these three values is taken to be emax. Also, aRr−$\beta$*dRr, aRg−$\beta$*dRg, aRb−$\beta$*dRb are found as candidates for the minimum value emin, and the minimum value of these three values is taken to be emin. It is also possible to find the maximum value emax and the minimum value emin by another method, however by using this method, it is possible to extract the necessary range without disturbing the balance among the components of the contrast improvement amount VRPij.

Next, the pixel value conversion unit 102 uses the maximum value emax and the minimum value emin to convert the values of each components of the contrast improvement amount VRPij (Rr(i, j), Rg(i, j), Rb(i, j)) to values within the range 0.0 to 1.0 (S7). Furthermore, the pixel value conversion unit 102 finds the pixel value on the enhanced image v from that conversion value. As described above, when the maximum value Vmax (rx, gx, bx) and the minimum. value Vmin (rn, gn, bn) are found in advance, they are used to keep the pixel value of the enhanced image v within the range of the maximum value Vmax (rx, gx, bx) and minimum value Vmin (rn, gn, bn) (S8).

After values, for which the contrast has been improved like this, are obtained for each object pixel Pij, the contrast improvement process ends according to the end judgment by the pixel value conversion unit (S9).

Through this series of processes, just the portion near the center is obtained from the distribution of the ratio between the value of the object pixel and the weighted average value of the pixels in the area corresponding to the surround view, and the amount of change from the center is enhanced. Moreover, the contrast improvement amount VRPij of pixels having the value of the ratio separated far from the area near the center becomes 1.0 or 0.0. Therefore, even in area where there is a little difference between the object pixel corresponding to the center view and the pixels in the area corresponding to the surround view, it becomes easy to enhance that difference. In other words, the contrast is enhanced, and it becomes possible to clearly express details in shadows or color data that is buried due to the insufficient range of the input apparatus.

As explained above, calculation of the amount of contrast improvement for each pixel is performed more easily than the method using the conventional Retinex theory. Moreover, in the method of the conventional Retinex theory, there was a problem in that knowledge from experience was needed in order to set the filter process (offset, gain conversion function) when converting from the contrast improvement amount for each pixel to the actual value on the image, however, in this embodiment it is not necessary.

However, when extracting just the portion near the center in the distribution of the ratio between the value of the object pixel and the weighted average value of the values of the pixels in the area corresponding to the surround view, and saturating the values in the two portions straddling the center portion to 0.0 or 1.0, there is a possibility that there will be a problem in that the brightness level of the output image vo will all be concentrated near the center. Therefore, in this embodiment, in order to solve this problem and also further the problem explained above in the conventional technology of a decrease in the brightness level in very large highlighted areas having a uniform color, the input image vi and the enhanced image v are adaptively combined. By doing this, it is possible to suppress a decrease or increase in the original brightness level of the input image vi.

Figure 9:
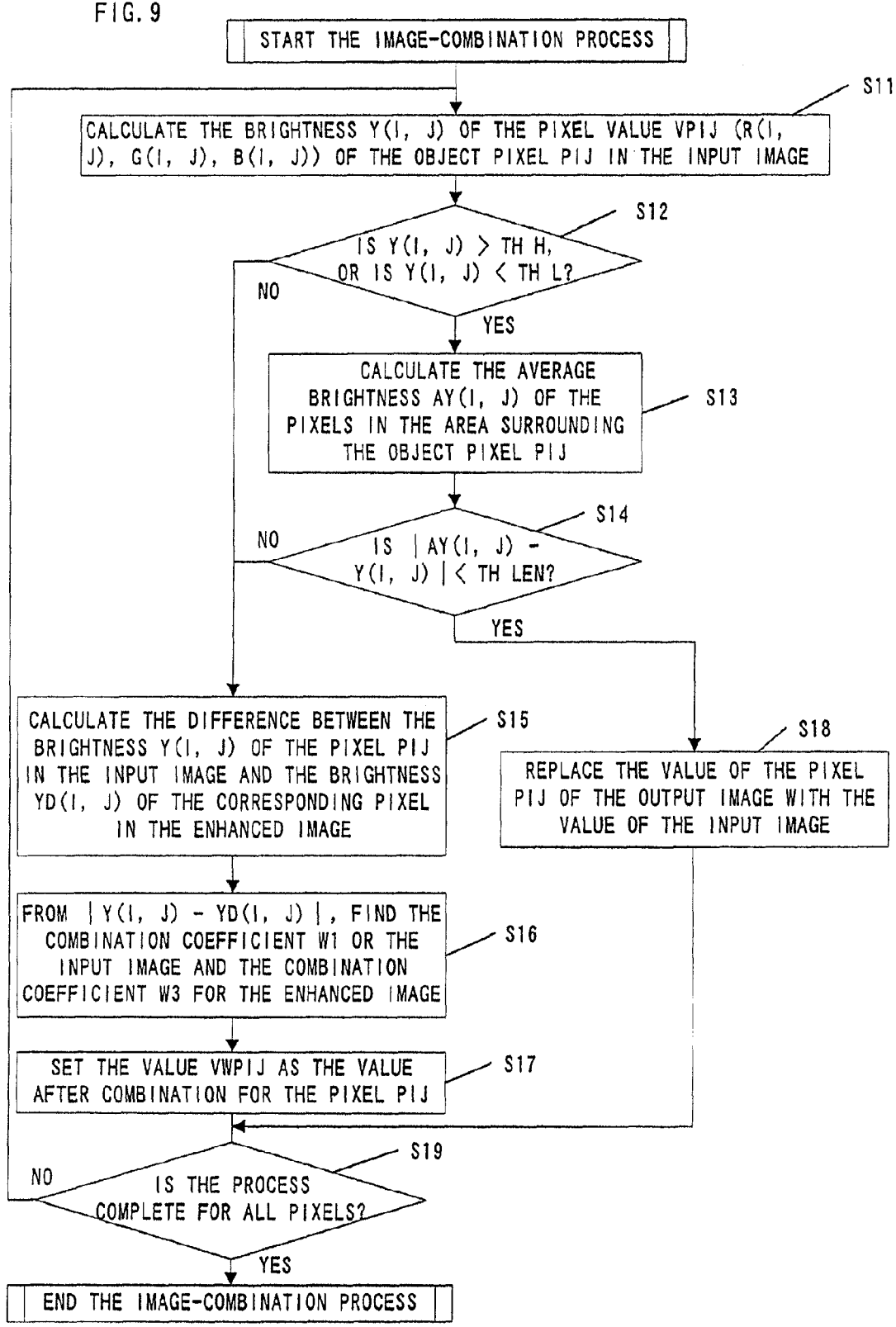
FIG. 9 is a flowchart explaining the image combination process of the first embodiment.

After receiving the enhanced image v obtained from the contrast improvement process and the input image vi, the image combination unit 12 performs the process of combining both images and generating the output image vo according to the procedure shown in FIG. 9.

In the image combination unit 12, the selection standard value judgment unit 200 calculates the brightness y(i, j) at the object pixel Pij in the input image (S11). Also, it compares the brightness y(i, j) at the object pixel Pij with the preset threshold values Th_h and Th_1 (S12).

In the case when Th_1>y (i, j) or y(i, j)>Th_h, the selection standard judgment unit 200 further finds the average brightness Ay(i, j) of the pixels in the area corresponding to the surround view of the object pixel Pij (S13).

The selection standard value judgment unit 200 determines whether the brightness y(i, j) satisfies the condition |Ay(i, j)−y(i, j)|<Th_len or not (S14).

When the brightness y(i, j) does not satisfy the condition in step S14, or when the comparison result in step S12 shows that the brightness y(i, j) is between the thresholds Th_1 and Th_h, the combination coefficient calculation unit 201 calculates the difference between brightness y(i, j) at the object pixel Pij in the input image vi and the brightness yd(i, j) at the pixel corresponding to the enhanced image v (S15). By substituting the absolute value of the difference between the two, len=|Y(i, j)−yd (i, j)|, into the prepared coefficient setting function, the combination coefficient w1 for the enhanced image v is set (S16). Here, for the purpose of simplification, the threshold value functions g(X) as shown in Equations 6 will be used for the setting function.

$$g(x)=0.0 (x>0.5)$$

$$g(x)=0.5 (x \leq 0.5) \quad \text{(Eqs. 6)}$$

The combination coefficient w0 for the input image is set by w0=1.0−w1.

After the combination coefficients w0 and w1 are set, the weighted average combination unit 202 uses these coefficients to find the weighted average value VWPij (WRr(i, j), WRg(i, j), WTb(i, j)) of the pixel value VPij in the input image vi and the pixel value VRPij of the enhanced image v (S16) for the object pixel Pij. The weighted average combination unit 123 sets the value found as a value at the corresponding pixel in the output image vo (S17).

Also, when the brightness y(i, j) satisfies the condition in step S14, a process is performed to replace the value VWPij (WRr(i, j), WRg(i, j), WRb(i, j)) at the pixel Pij in the output image vo with the value VPij (r(i, j), g(i, j), b(i, j)) at the object pixel Pij in the input image vi (S18). This process takes into consideration that when the change in an area that is larger than the rectangular area corresponding to the surround view and having size c is very small, it is easy for the contrast improvement amount for the pixel Pij to concentrate near 1.0. This process removes large uniform highlighted areas (white) or black areas in the input image as being outside the process object. As a result, it is possible to suppress large changes in the brightness level that can occur easily in areas such as mentioned above in the contrast improved image.

By repeating this series of procedures for all pixels (S19), an output image vo with improved contrast is generated easily and high precisely.

The image processing described above, can similarly be realized by a software process using the central processing unit (CPU) and digital signal processor (DSP) used in a computer or the like, by following the image processing method of this embodiment.

The contrast improvement amount VRPij (Rr(i, j), Rg(i, j), Rb(i, j)) can also be given by Equations 7 below instead of Equations 5.

$$Rr(i,j)=r(i,j)+\gamma \times [r(i,j)/Ar(i,j)-1.0]$$

$$Rg(i,j)=g(i,j)+\gamma \times [g(i,j)/Ag(i,j)-1.0]$$

$$Rb(i,j)=b(i,j)+\gamma \times [b(i,j)/Ab(i,j)-1.0] \quad \text{(Eqs. 7)}$$

In this case, the contrast improvement amount VRPij (Rr(i, j), Rg(i, j), Rb(i, j)) is found by adding the value, obtained by subtracting 1.0 from the ratio of the value VPij of the object pixel Pij and the weighted average value VAPij and multiplying it by a preset positive constant γ, to the value VPij (r(i, j), g(i, j), b(i, j)).

By doing this, although the dependence on the set constant γ occurs, when the change in the value of the pixels in the area corresponding to the surround view is very small, it is possible to prevent each of the components of the contrast improvement amount VRPij (Rr(i, j), Rg(i, j), Rb(i, j)) from becoming a value near 1.0 regardless of the value VPij (r (i, j), g(i, j), b(i, j)).

Second Embodiment

Figure 10:
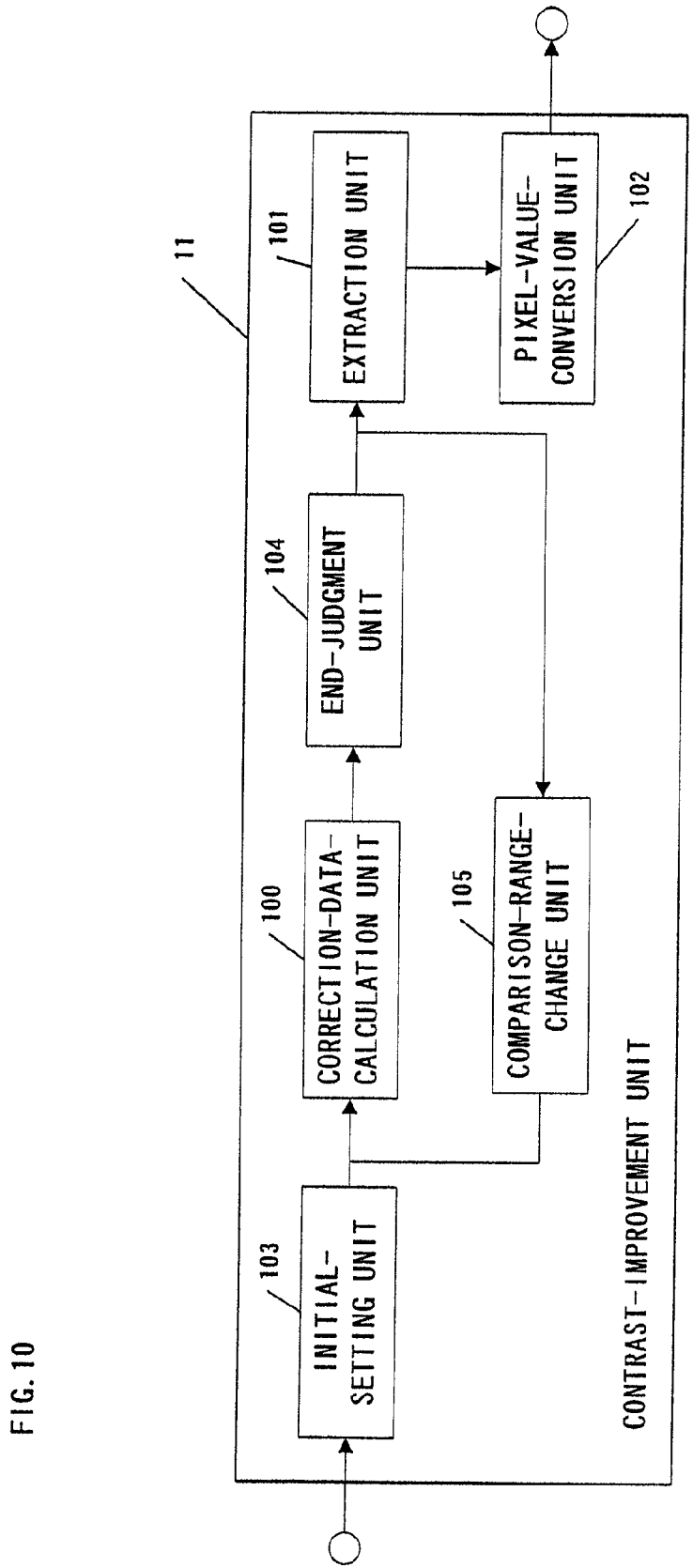
FIG. 10 is a block diagram showing the contrast improvement unit of a second embodiment of the invention.

The image processing apparatus of the second embodiment, has construction that is similar to that of the image processing apparatus of the first embodiment, however, as shown in FIG. 10, the contrast improvement unit 11 further comprises: an initial setting unit 103, an end judgment unit 104 and comparison range change unit 105.

The initial setting unit 103 performs the process of setting the size of the rectangular areas corresponding to the surround view. The end judgment unit 104 determines whether or not a contrast improvement amount has been calculated for all of the preset rectangular areas corresponding to the surround view. The comparison range change unit 105 changes the size c of the current area to the next candidate when it was determined by the end judgment unit 104 that the process has not ended.

Figure 11:
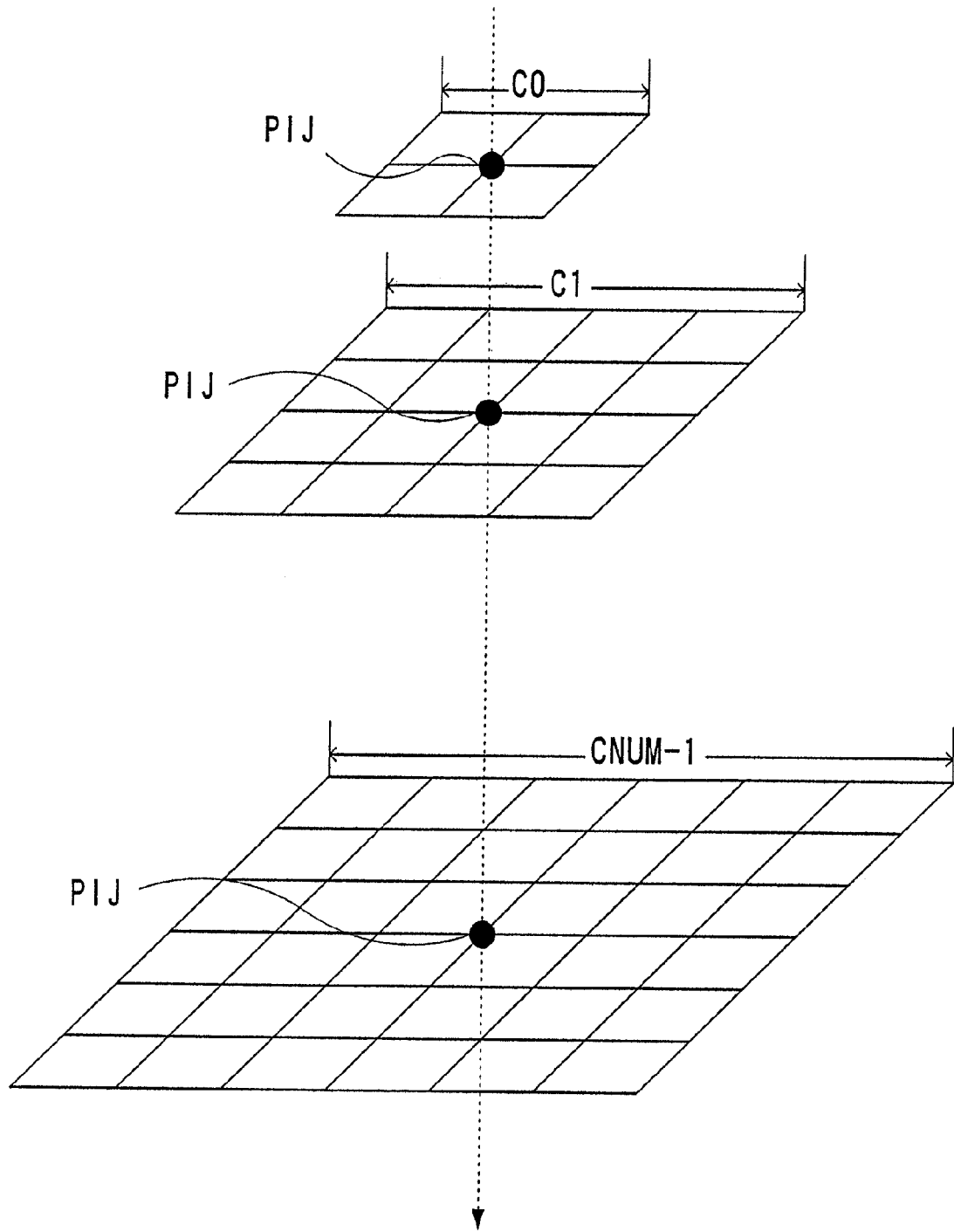
FIG. 11 is a diagram graphically showing the surround view area.

As shown graphically in FIG. 11, by performing contrast improvement on the object pixel Pij corresponding to the center view according to the result obtained by changing size c of the area corresponding to the surround view, c0, c1, ... ck, the bad influence caused by the size of the dark areas (shadows) in the image is decreased.

Figure 12:
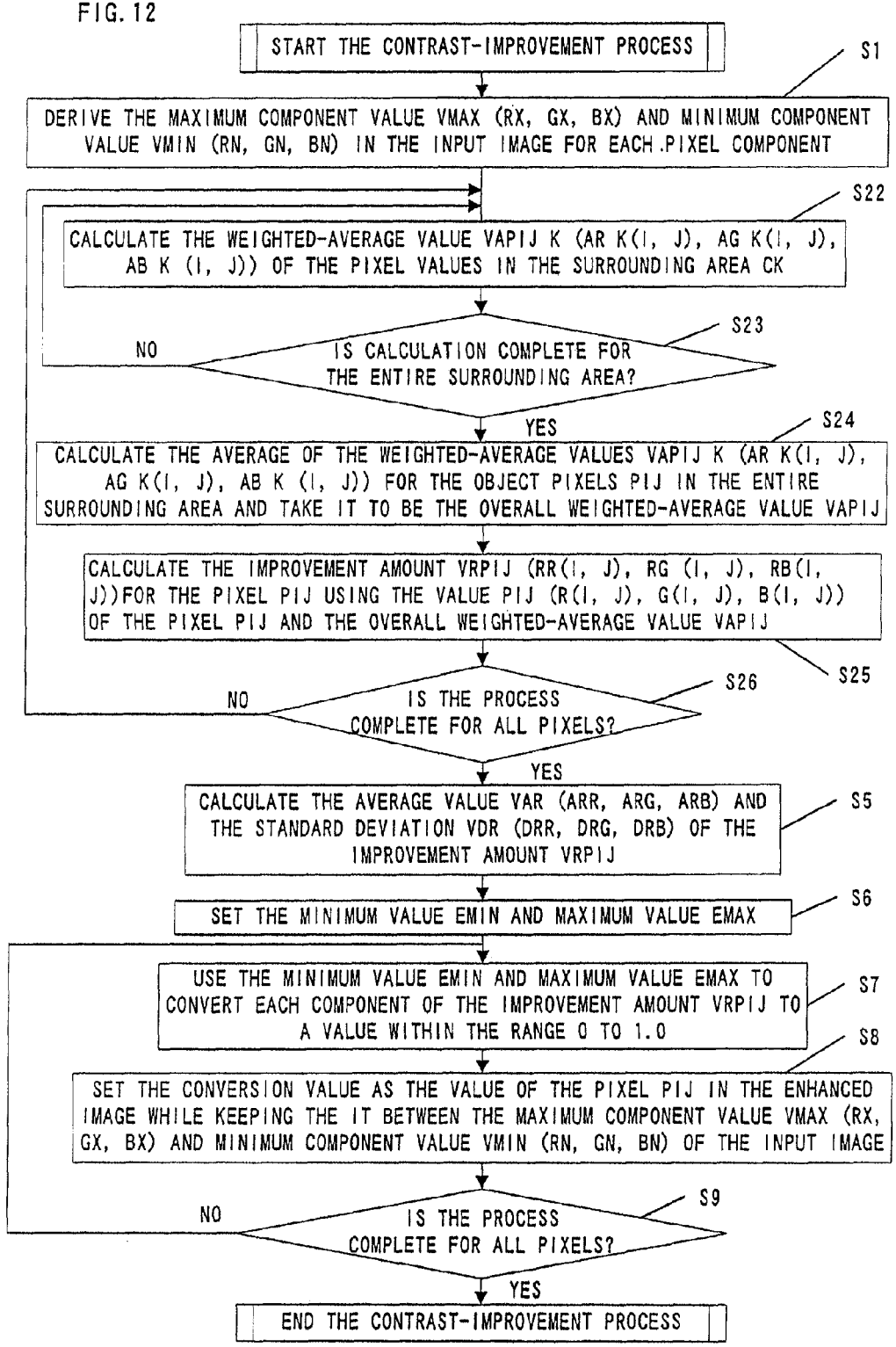
FIG. 12 is a flowchart explaining the contrast improvement process of the second embodiment.

As shown in FIG. 12, after step S1 is performed, the initial setting unit 103 of the contrast improvement unit 11 sets the size c of the area corresponding to the surround view, by selecting a size from a plurality of preset sizes ck (k=0, 1, ... , Cnum−1). The size of the area corresponding to the surround view can be selected in ascending order from the smallest size, or can be selected in descending order from the largest size, however, it is preferred that the direction of size change be the same. Here, the size is selected in descending order from the largest size, so the area corresponding to the surround view is sequentially decreased.

The correction data calculation unit 100 calculates the weighted average value VAPij_k(Ar_k(i, j), Ag_k(i, j), Ab_k (i, j)) of the values of the pixels in the current area ck (S22).

The end judgment unit 104 determines whether calculation of the weighted average value has been calculated for all sizes (S23).

When it is determined that calculation has not been completed, the comparison range change unit 105 changes the currently set area to the next candidate. After changing the size of the area, the correction data calculation unit 100 calculates the weighted average value for the area with that changed size.

After calculation of the weighted average values is repeated like this and the end is determined, the correction data calculation unit 100 finds the weighted average value of the weighted average values VAPij_k(Ar_k(i, j), Ag_k(i, j), Ab_k(i, j)) for each size of area ck. Also, that value is set as the overall weighted average value VAPij(Ar(i, j), Ag(i, j), Ab(i, j)) of the object pixel Pij (S24). When doing this, it is also feasible to perform weighting according to the size ck of the area corresponding to the surround view, however, here, in order for simplification, the average value of the weighted average values VAPij_k for each size ck is used as the overall weighted average value for the object pixel Pij.

After the overall weighted average value VAPij has been found, the correction data calculation unit 100 calculates the ratio between the value VPij of the object pixel Pij and the overall weighted average value VAPij as the contrast improvement amount VRPij (Rr(i, j), Rg(i, j), Rb(i, j)) (S25).

The process after a contrast improvement amount VRPij (Rr(i, j), Rg(i, j), Rb(i, j)) has been obtained for every pixel by repeating this kind of procedure is the same as in the first embodiment.

By performing this kind of process, while at the same time utilizing the features of the image process of the first embodiment, it is possible to automatically improve the contrast of the input image without being greatly affected by the dynamic range or the size of dark areas such as shadows, and thus as a result the contrast improvement becomes for efficient.

The image processing of this second embodiment also can be realized by software process that uses a CPU and DSP.

Third Embodiment

Figure 13:
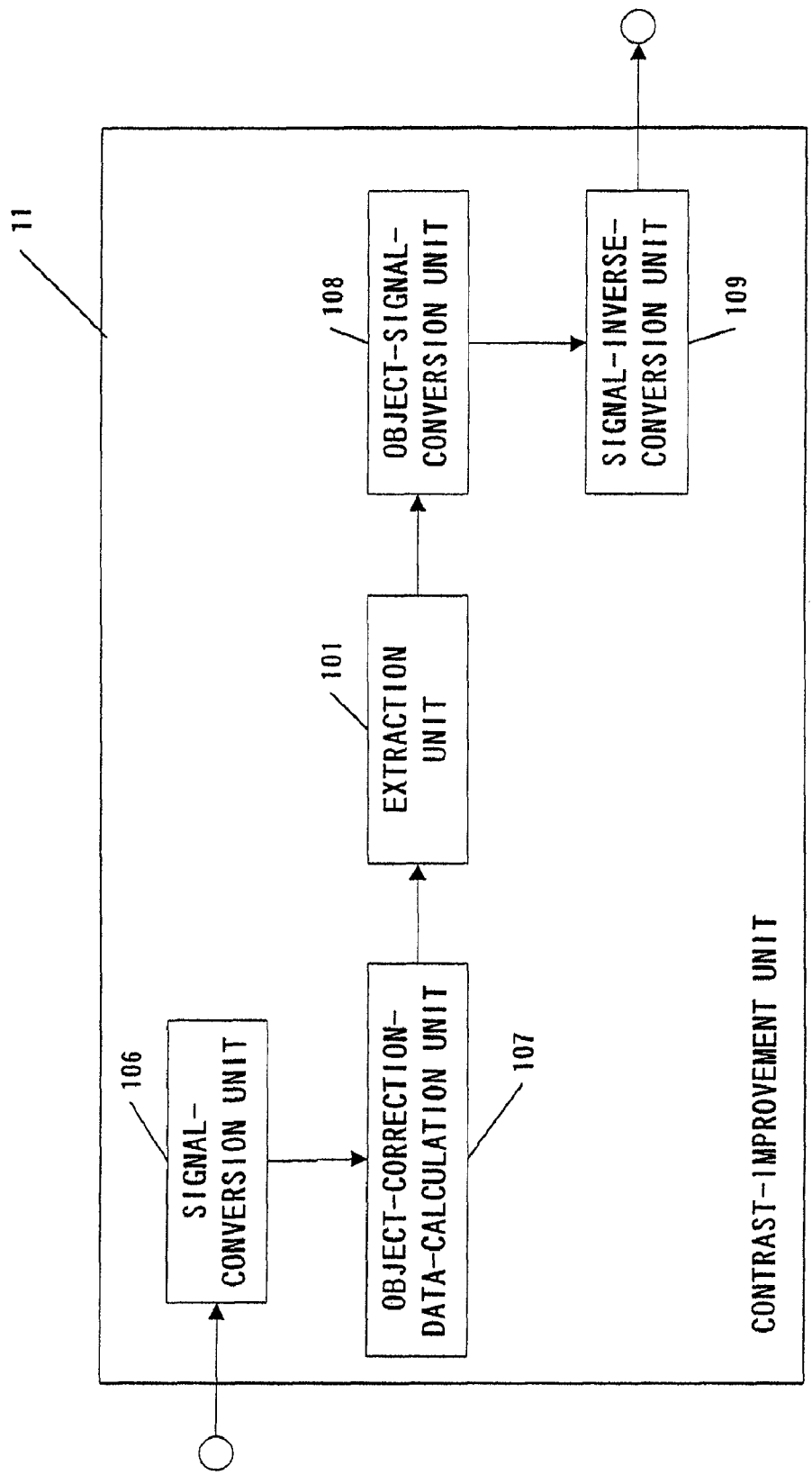
FIG. 13 is a block diagram showing the contrast improvement unit of a third embodiment of the invention.

In the image apparatus of the third embodiment, part of the contrast improvement unit 11 has different construction than in the image processing apparatus of the first embodiment. As shown in FIG. 13, instead of the correction data calculation unit 100, the contrast improvement unit 11 comprises a signal conversion unit 106 and an object correction data calculation unit 107. Also, instead of the pixel value conversion unit 102, it comprises an object signal conversion unit 108 and a signal inverse conversion unit 109.

Here, the signal conversion unit 106 converts the value VPij (r(i, j), g(i, j), b(i, j)) of a pixel Pij of a color image to another set of signals. The object correction data calculation unit 107 calculates the amount of contrast improvement in the same way as in the first embodiment for one of those signals as the object. The signal inverse conversion unit 109 performs the inverse conversion process of the conversion process by the signal conversion unit 106 from signals other than the signal obtained by the object signal conversion unit 108 and the object signal obtained by the signal conversion unit 106 to find the value of the pixel Pij on the enhanced image v.

The value VPij (r(i, j), g(i, j), b(i, j)) of a pixel Pij of a color image is converted to lightness L(i, j) and hue a*(i, j), b*(i, j), for example. This lightness L(i, j) is the signal of the object for which the contrast is to be improved. The color data of the input image is kept as is while controlling the lightness level. This means that the color balance of the input image vi is reproduced as is in the enhanced image v obtained by the contrast improvement unit 11.

Figure 14:
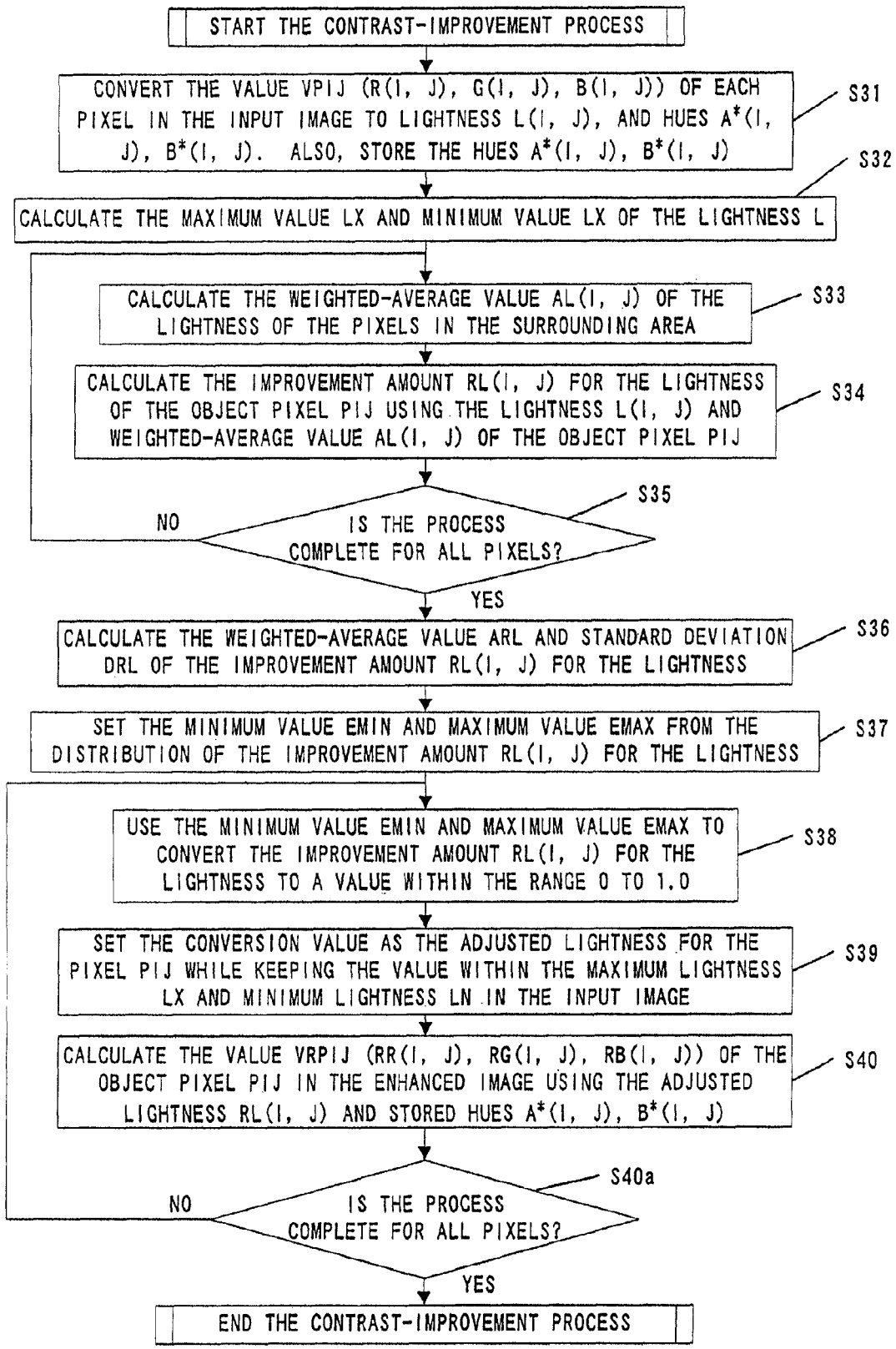
FIG. 14 is a flowchart explaining the contrast improvement process of the third embodiment.

The contrast improvement unit 11 performs the contrast improvement process by the procedure shown in more detail in FIG. 14.

After the contrast improvement process begins, the signal conversion unit 106 converts the value VPij (r(i, j), g(i, j), b(i, j)) of the pixel Pij in the input image vi to the value VPLij (L(i, j), a*(i, j), b*(i, j)) on the space La*b* (S31).

The object correction data calculation unit 107, extraction unit 101 and object signal conversion unit 108 perform processing of the lightness L(i, j) of the conversion value signals for the pixel Pij. During that processing, the hue a*(i, j) and b*(i, j) are temporarily kept constant. Also, in order to accurately maintain the balance of the color data of the input image vi in the enhanced image v as well, it is preferred that the lightness L(i, j) be normalized to a value in the range 0.0 to 1.0.

The object correction data calculation unit 107 calculates the maximum value Lx and minimum value Ln of the lightness L(i, j) of the pixel Pij in the input image (S32). Furthermore, it finds the weighted average value A(i, j) of the lightness (i, j) at the pixels in the area corresponding to the surround view for the object pixel Pij(S33). Moreover, it calculates the ratio of the lightness L(i, j) and the weighted average value AL (i, j) as the contrast improvement amount RL(i, j) for the lightness (S34).

After the calculation of the contrast improvement amount RL(i, j) for the lightness of the object pixel Pij has been repeated for all of the pixels in the input image vi, the extraction unit 101 finds the average value aRL and standard deviation dRL of the contrast improvement amount RL(i, j) for the lightness (S36). Using those values, the extraction unit 101 sets the minimum value emin and maximum value emax from the distribution of the contrast improvement amount RL(i, j) for the lightness (S37).

The object signal conversion unit 108 uses the minimum value emin and maximum value emax to convert the contrast improvement amount RL(i, j) for the lightness to a value in the range from 0.0 to 1.0 (S38). Furthermore, the object signal conversion unit 108 finds the lightness of the pixel in the enhanced image v from that conversion value (S39). This lightness is kept within the range of the maximum value Lx and minimum value Ln of the input image v.

The signal inverse conversion unit 109 uses the contrast improvement amount RL(i, j) for the lightness that was obtained in this way and the stored hue a*(i, j) and b*(i, j) to find the value VRPij (Rr(i, j), Rg(i, j), Rb(i, j)) of the pixel Pij of the enhanced image by using inverse conversion of the signal conversion performed by the signal conversion unit 106 (S40). Also, in order to generate the enhanced image v, this calculation is repeated for all of the pixels (S40a).

By applying this series of processes, it becomes easier to maintain the color balance of the pixels in the input image than when independently performing contrast improvement of the three components of the color image, and it is possible to keep the color in dark areas such as shadows in the improved image more stable. Furthermore, since the contrast improvement amount is calculated for just the lightness component instead of performing it independently for the three components, processing time can be greatly shortened.

In this embodiment, the signal conversion unit 106 converted the value VPij of the pixel Pij of the input image vi to the value VPLij of the La*b* space, however, the embodiment is not limited to this. It is also possible to convert the value VPij of the pixel Pij of the input image vi to the luminance y (i, j), and color differences u (i, j) and v (i, j). Of these, by using the luminance y (i, j) as the object signal, it is possible to perform the same image processing.

Also, the image processing in this third embodiment can be realized by software processing using a CPU and DSP.

Fourth Embodiment

Figure 15:
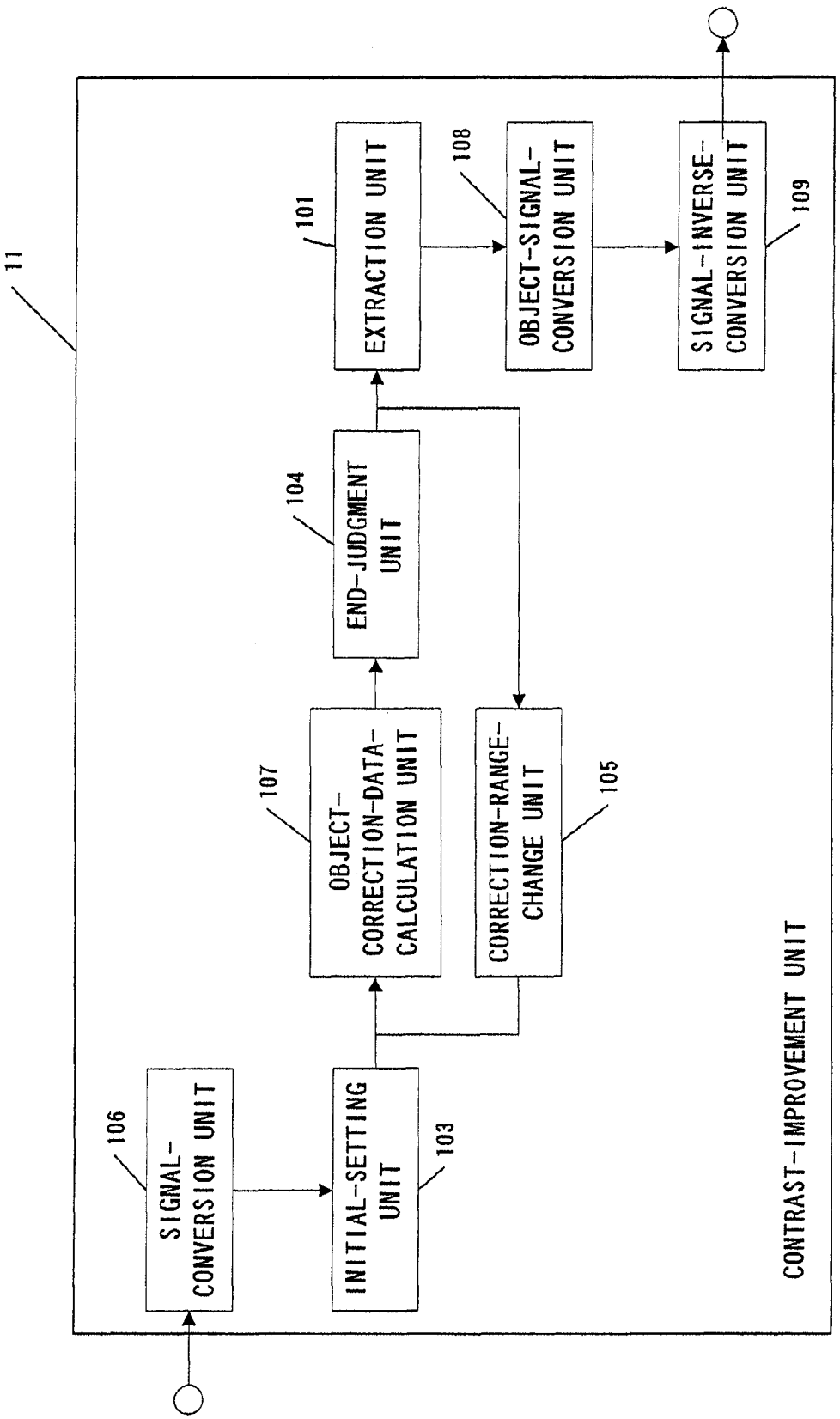
FIG. 15 is a block diagram showing the contrast improvement unit of a fourth embodiment of the invention.
Figure 16:
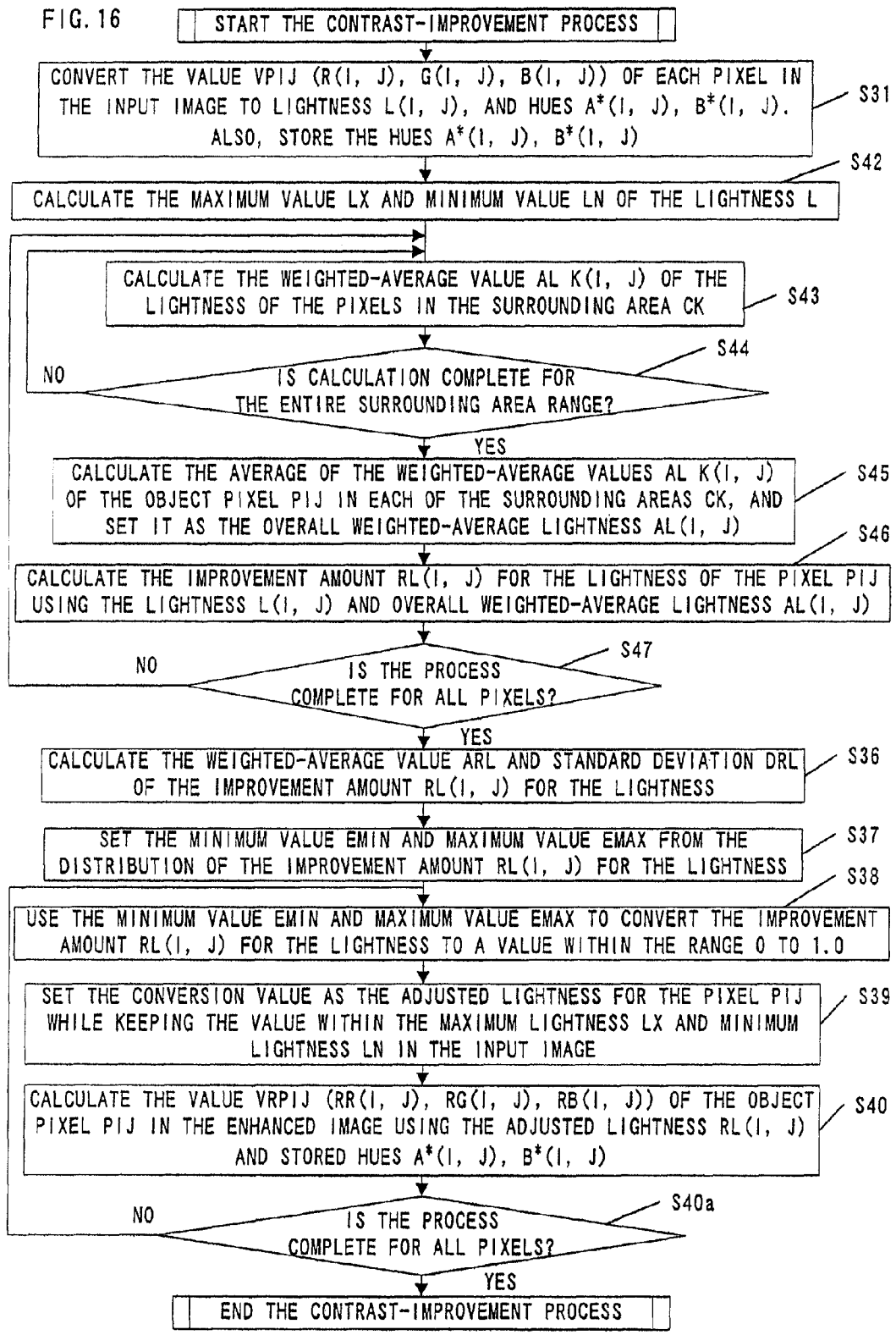
FIG. 16 is a flowchart explaining the contrast improvement process of the fourth embodiment.

In the image apparatus of the fourth embodiment, part of the contrast improvement unit 11 has different construction than in the image processing apparatus of the first embodiment. As shown in FIG. 15, the construction of that contrast improvement unit 11 is a combination of the construction of the contrast improvement unit 11 of the second embodiment and the construction of the contrast improvement unit 11 of the third embodiment. This means that the contrast improvement process explained in the second embodiment is performed only for the object signal of the third embodiment, as shown in FIG. 16.

As in the third embodiment, the signal conversion unit 106 converts the value VPij (r(i, j), g(i, j), b(i, j)) of the pixel Pij in the input image vi to the value VPLij (L(i, j), a*(i, j), b*(i, j)) in the space La*b* (S31). Of these converted signals, the hue a*(i, j) and b*(i, j) are maintained temporarily for later processing.

The initial setting unit 103 calculates the maximum value Lx and minimum value Ln of the lightness L(i, j) of the pixel Pij in the input image (S42). Furthermore, the initial setting unit 103 sets the size c of the area corresponding to the surround view to a size selected from among a plurality of sizes ck (k=0, 1, ..., Cnum−1).

The object correction data calculation unit 107 finds the weighted average value AL_k(i, j) of the lightness at the pixels in the current area ck (S43).

The end judgment unit 104 determines whether or not calculation of the weighted average value of the lightness has been completed for all sizes. When it is determined that calculation has not been completed, the comparison range change unit 105 changes the currently set area to the next candidate. After the size of the area has been changed, the object correction data calculation unit 107 calculated the weighted average value of the lightness for the area whose size has been changed.

After the calculation of the weighted average value of the lightness has been repeated like this and end judgment is performed, the object correction data calculation unit 107 finds the weighted average of the weighted average values for the areas ck of each size. It then sets that value as the overall weighted average lightness AL(i, j). The object correction data calculation unit 107 calculates the ratio of the lightness L(i, j) at the object pixel Pij and the overall weighted average lightness AL(i, j) as the contrast improvement amount RL(i, j) (S46).

The processing after obtaining a contrast improvement amount VRPij (Rr(i, j), Rg(i, j), Rb(i, j)) for every pixel by repeating this procedure is the same as that in the third embodiment.

By performing this kind of process, similar to the process in the second embodiment, not only is there no need to preset an area corresponding to the surround view, but as in the process in the third embodiment, it becomes easy to maintain the color balance of the pixels, and it is possible to better maintain the stability of color in dark areas such as shadows in the improved image. And, there is also the advantage that as the process is simplified, it becomes possible to reduce the processing time.

Of course, the image process in this fourth embodiment can also be realized with a software process that uses a CPU and DSP.

Fifth Embodiment

Figure 17:
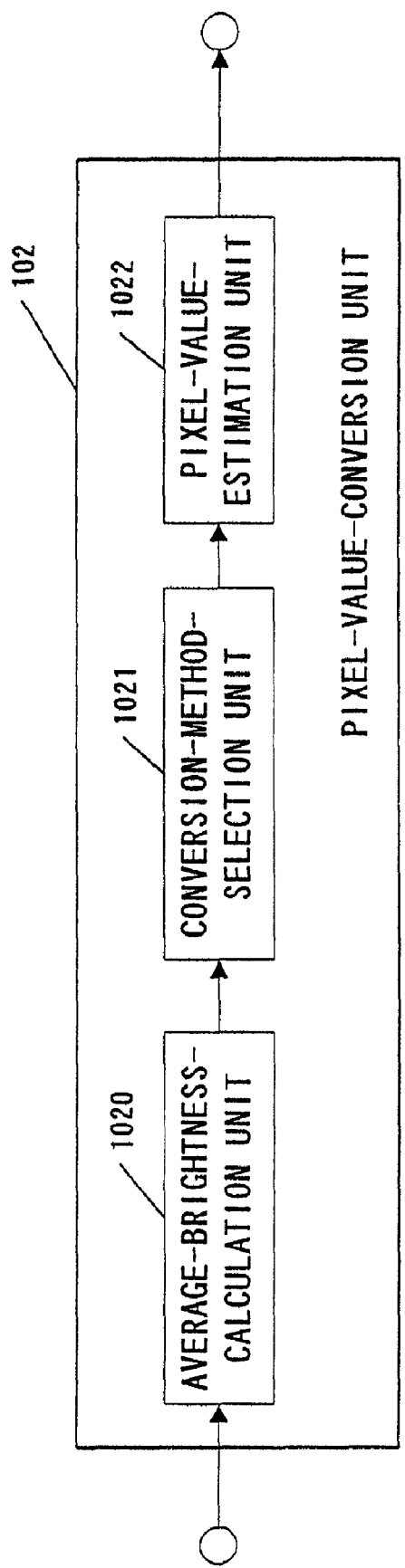
FIG. 17 is a block diagram showing the pixel value conversion unit of a fifth embodiment of the invention.

The image processing apparatus of the fifth embodiment of the invention has the same construction as the image processing apparatus in the first embodiment, however, as shown in FIG. 17, the pixel value conversion unit 102 further comprises: an average brightness calculation unit 1020, a conversion method selection unit 1021 and pixel value estimation unit 1022.

In that pixel value conversion unit 102, the average brightness calculation unit 1020 calculates the average brightness of the pixels in the input image vi. Based on that average brightness value, the conversion method selection unit 1021 selects the method for converting the contrast improvement amount obtained by the extraction unit 101 to the value of the enhanced image v. The pixel value estimation unit 1022 uses the conversion method selected by the conversion method selection unit 1021 and converts the contrast improvement amount obtained by the extraction unit 101 to the value of the enhanced image v.

In the contrast improvement unit 11, except for the pixel conversion unit 102, the correction data calculation unit 100 and extraction unit 101 perform the same processing as in the first embodiment.

Figure 18:
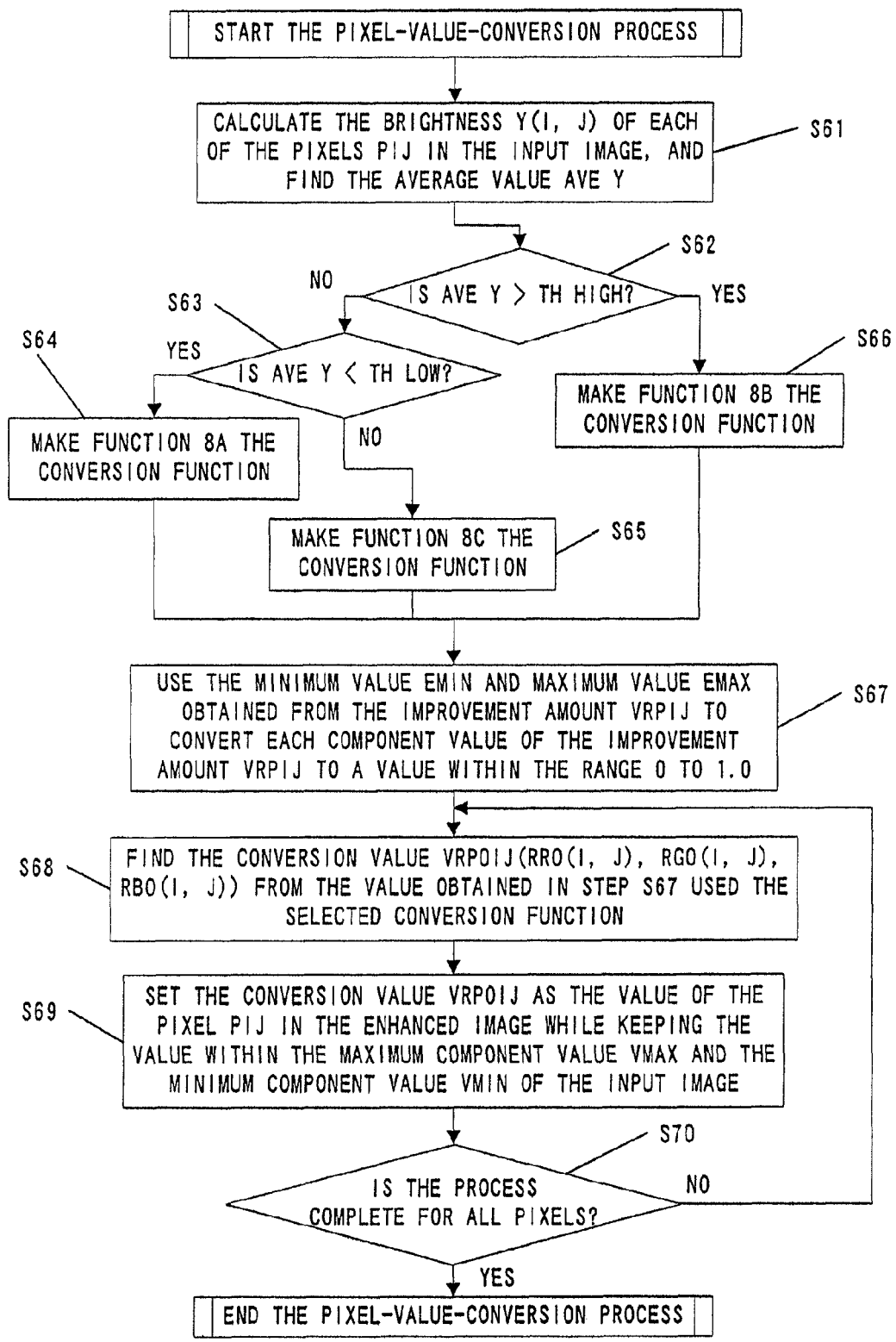
FIG. 18 is a flowchart explaining the pixel value conversion process of the fifth embodiment.

The correction data calculation unit 100 finds the contrast improvement amount for all of the pixels Pij in the input image vi. The extraction unit 101 extracts an effective range from the histogram distribution for each component of the contrast improvement amount. After the range has been extracted by the extraction unit 101 in this way, the pixel value conversion unit 102 executes the pixel value conversion process as shown in FIG. 18.

The average brightness calculation unit 1020 calculates the brightness y (i, j) of each pixel Pij in the input image vi, and finds the average value ave_y (S61).

Based on this average value ave_y, the conversion method selection unit 1021 selects the method for converting the contrast improvement amount to the actual pixel values on the enhanced image v. Many methods are possible for this selection method, however, here a low brightness threshold Th low and high brightness threshold Th high are set, and a conversion function gg(x) is selected as shown in Equations 8 below (S62 to S66).

$$ave\_y < Th\_low;\ gg(x) = k\_l \times x^{g\_l - 1} (g\_l > 1.0)$$

$$ave\_y > Th\_high;\ gg(x) = k\_h \times x^{h\_h} (g\_h < 1.0)$$

$$Th\_low \leq ave\_y \leq Th\_high;\ gg(x) = 1.0/\{1.0 + \exp(-g\_n \cdot (x - 0.5))\} \quad \text{(Eqs. 8)}$$

In Equations 8, k_l, g_l, g_n, k_h and g_h are preset constants, and x is the value of the object component of the contrast improvement amount before conversion.

This conversion function sets the portion on the image to focus on based on the average brightness value in the input image before processing. For example, when the overall brightness of the input image is low, instead of the entire image suddenly become bright, there is a better impression from a three-dimensional feel if the areas of low brightness remain as much as possible. Also, when the overall brightness of the input image is high, the human eye pays high attention to the bright areas, so it is necessary to maintain those areas as much as possible. Furthermore, when an image having an intermediate brightness, such as a nature image, is output to a printer or the like, processing to make areas that have a lower brightness than the center portion a little darker and to make areas that have a higher brightness than the center portion a little brighter is performed by gamma conversion. The conversion method here follows this kind of insight, however the method is not set to the method shown here, and any conversion method that follows this insight can be used in the same way.

After the conversion function has been selected, the pixel estimation unit 1022 uses that function to find the conversion value VRPoij (Rro(i, j), Rgo(i, j), Rbo(i, j)) for each component of the contrast improvement amount VRPij (Rr(i, j), Rg(i, j), Rb(i, j)) (S67, S68). Furthermore, from that conversion value, the pixel value estimation unit 1022 finds the pixel value Pij on enhanced image v (S69). That value is kept between the maximum value Vmax (rx, gx, bx) and minimum value Vmin (rn, gn, bn) of each component of the pixel Pij in the input image vi. Also, the enhanced image v is obtained by repeating steps S68 and S69 for all of the pixels (S70).

By selecting the conversion method based on the average brightness of the input image as described above, it is possible to improve the quality of contrast improvement.

The image processing apparatus of this embodiment can also be combined with the image processing apparatus of the second embodiment.

Moreover, the image apparatus of this fifth embodiment can also be realized by a software process that uses a CPU and DSP.

Sixth Embodiment

Figure 19:
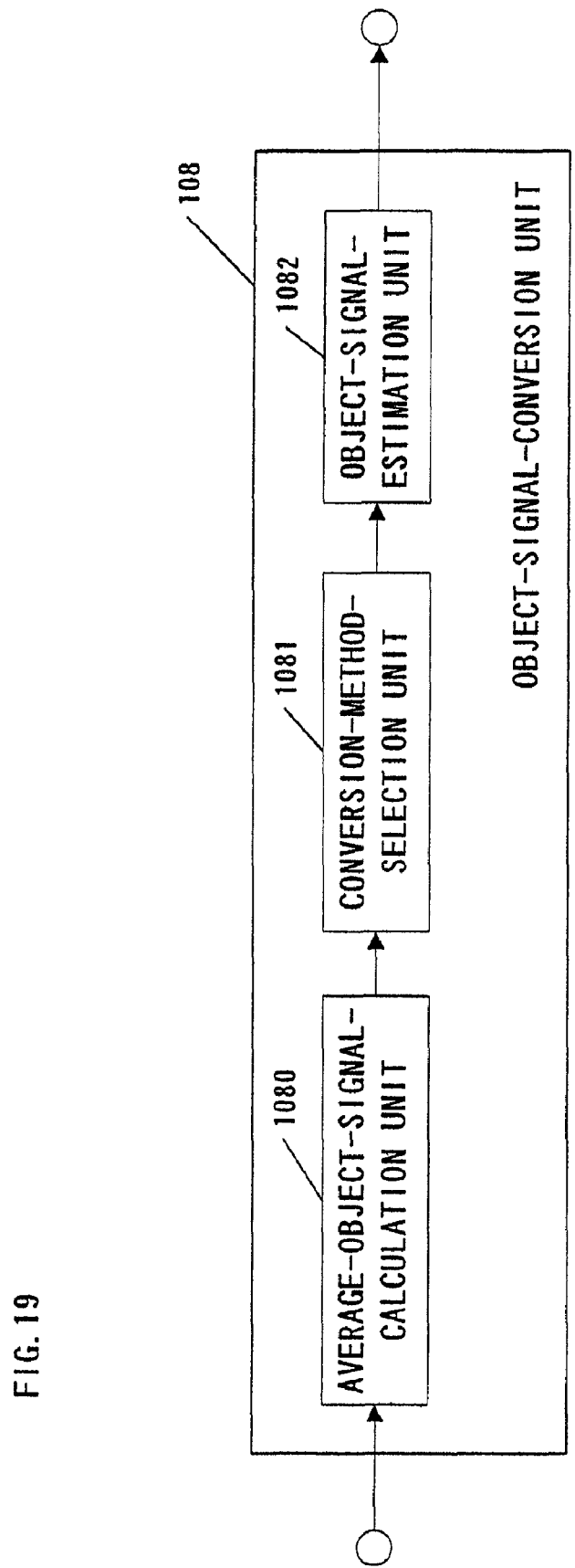
FIG. 19 is a block diagram showing the object signal conversion unit of a sixth embodiment of the invention.

The image processing apparatus of the sixth embodiment has the same construction as the image processing apparatus of the third embodiment, however, as shown in FIG. 19, the object signal conversion unit 108 further comprises: an average object signal calculation unit 1080, a conversion method selection unit 1081, and an object signal estimation unit 1082.

This kind of object signal conversion unit 108 selects the conversion method for an object signal instead of a pixel value as was done in the fifth embodiment, and then using the selected method, it finds the conversion value for the contrast improvement amount for the object signal obtained by the extraction unit 101.

After the contrast improvement amount for the object signal is input to the object signal conversion unit 108 from the extraction unit 101, the average object signal calculation unit 1080 calculates the average value of the object signals found from the value of the pixel in the input image vi. When the object signal is lightness, the average values for the hue that corresponds to it are not calculated. In the fifth embodiment, the average value of the brightness was found, however in this embodiment, only the average value of the lightness, which has the same kind of meaning as the brightness, is calculated.

The conversion method selection unit 1081 selects the method for converting the contrast improvement amount for the object signal that was obtained by the extraction unit 101 to the value of the object signal on the enhanced image vi based on the average value of the brightness that was obtained by the average object signal calculation unit 1080. Except that the average value of the lightness is obtained instead of that of the brightness, the selection procedure is the same as that in the fifth embodiment.

The object signal estimation unit 1082 finds the conversion value for the contrast improvement amount for the object signal obtained by the extraction unit 101 according to the conversion method selected by the conversion method selection unit 1081.

After the object signal estimation unit 1082 finds the conversion value, the signal inverse conversion unit 109 generates the enhanced image from that conversion value and the stored hue values in the same way as in the third embodiment.

By selecting the conversion method for the object signal in this way, not only is it possible to improve the stability of the color, but it is also possible to perform more highly precise contrast improvement.

It is also possible for the object signal conversion unit 108 in the fourth embodiment to comprise: an average object signal calculation unit 1080, a conversion method selection unit 1081, and an object signal estimation unit 1082.

Also, it is possible for the image processing apparatus of embodiment 6 to be realized by a software process that uses a CPU and DSP.

Seventh Embodiment

Figure 20:
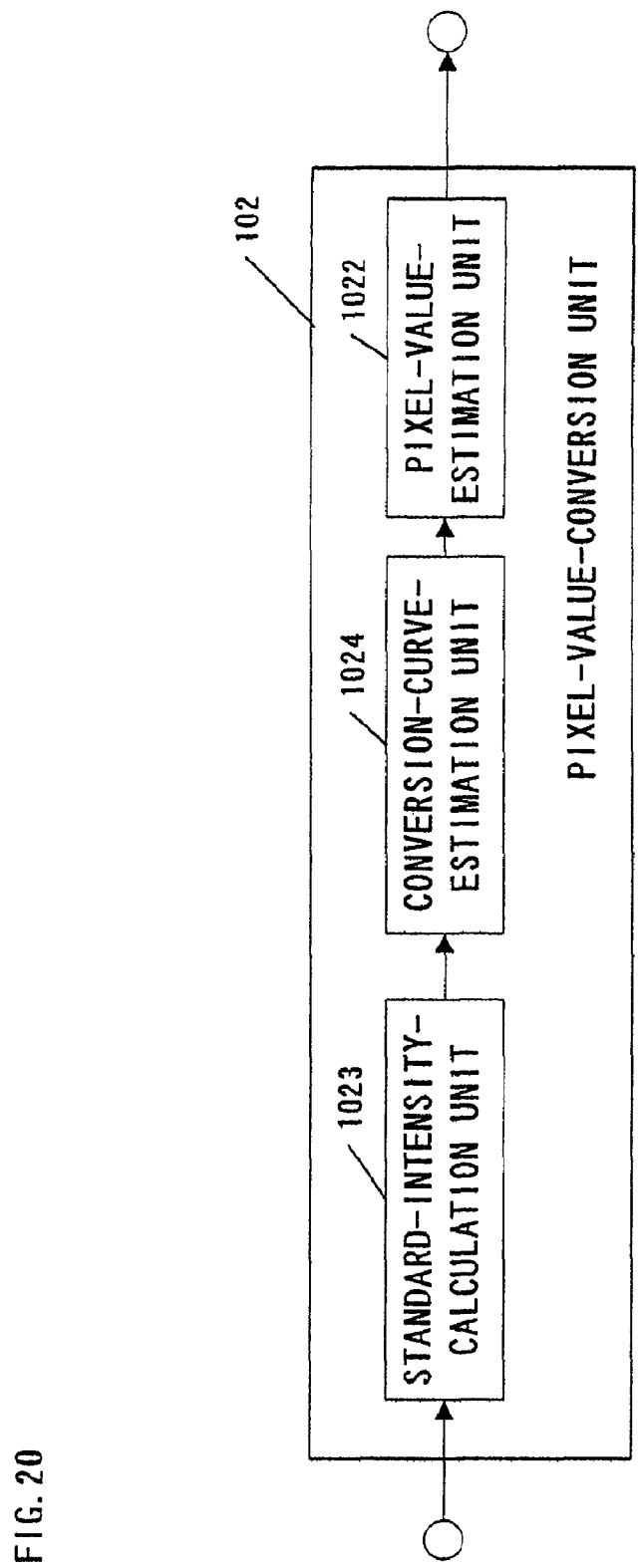
FIG. 20 is a block diagram showing the pixel value conversion unit of a seventh embodiment of the invention.

In the image processing apparatus of the seventh embodiment of the invention, the construction of part of the pixel value conversion unit 102 differs from that in the image processing apparatus of the fifth embodiment. As shown in FIG. 20, that pixel value conversion unit 102 comprises a standard intensity calculation unit 1023 and conversion curve estimation unit 1024 instead of the average brightness calculation unit 1020 and conversion method selection unit 1021.

In that pixel value conversion unit 102, the standard intensity calculation unit 1023 calculates the edge intensity of the brightness that expresses the contrast data of the input image vi. The conversion curve estimation unit 1024 uses a generic algorithm to estimate a conversion curve for converting the contrast improvement amount obtained by the extraction unit 101 to the value in the enhanced image v.

After the conversion curve has been estimated, the pixel value estimation unit 1022 finds the conversion value for the contrast improvement amount obtained by the extraction unit 101 based on the conversion curve instead of the selected conversion method.

Figure 21:
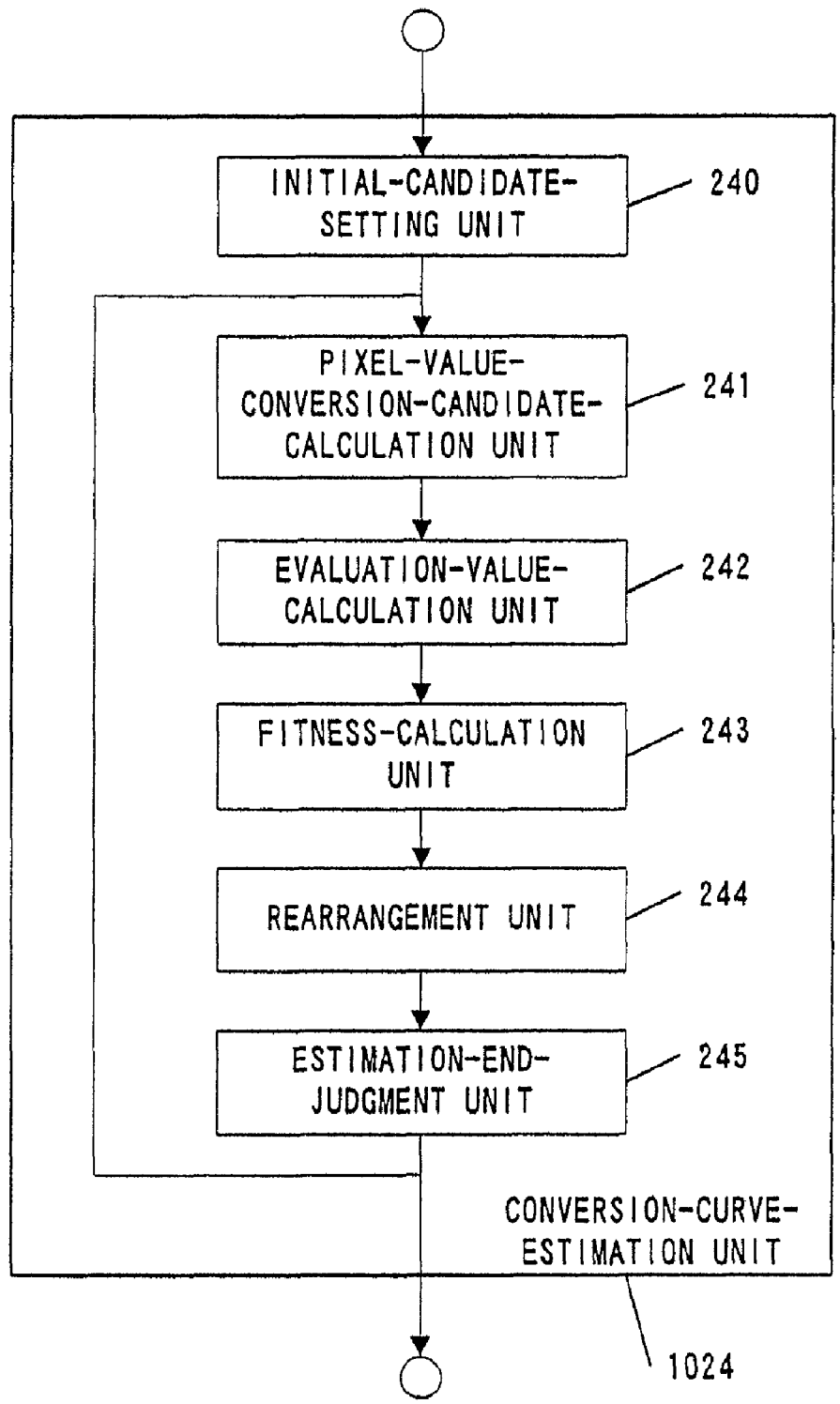
FIG. 21 is a block diagram showing the conversion curve estimation unit of the seventh embodiment.

FIG. 21 is a block diagram showing an overview of the construction of the conversion curve estimation unit 1024.

In the conversion curve estimation unit 1024, an initial candidate setting unit 240 prepares an initial population of chromosomes indicating a plurality of conversion curves. A pixel value conversion candidate calculation unit 241 finds a pixel value on each candidate for the enhanced image v based on the conversion curve shown by each chromosome. An evaluation value calculation unit 242 calculates an evaluation value for the conversion curves corresponding to each candidate from the brightness at the pixel on each candidate. A fitness calculation unit 243 calculates the fitness for each chromosome based on the evaluation value obtained by the evaluation value calculation unit 242. A recombination operation unit 244 performs recombination operation such as selection, crossover or mutation for the chromosomes contained in the chromosome population and generates the next generation of the chromosome population. An estimation end judgment unit 245 determines whether or not optimum estimation has ended for the conversion curve, and as soon as estimation ends, that conversion curve is given to the pixel value estimation unit 1022.

In this embodiment, a genetic algorithm is used to give make the edge sections of the enhanced image v sharper. Also, since a suitable conversion function is automatically estimated, it is not necessary to set conditions beforehand.

Figure 22:
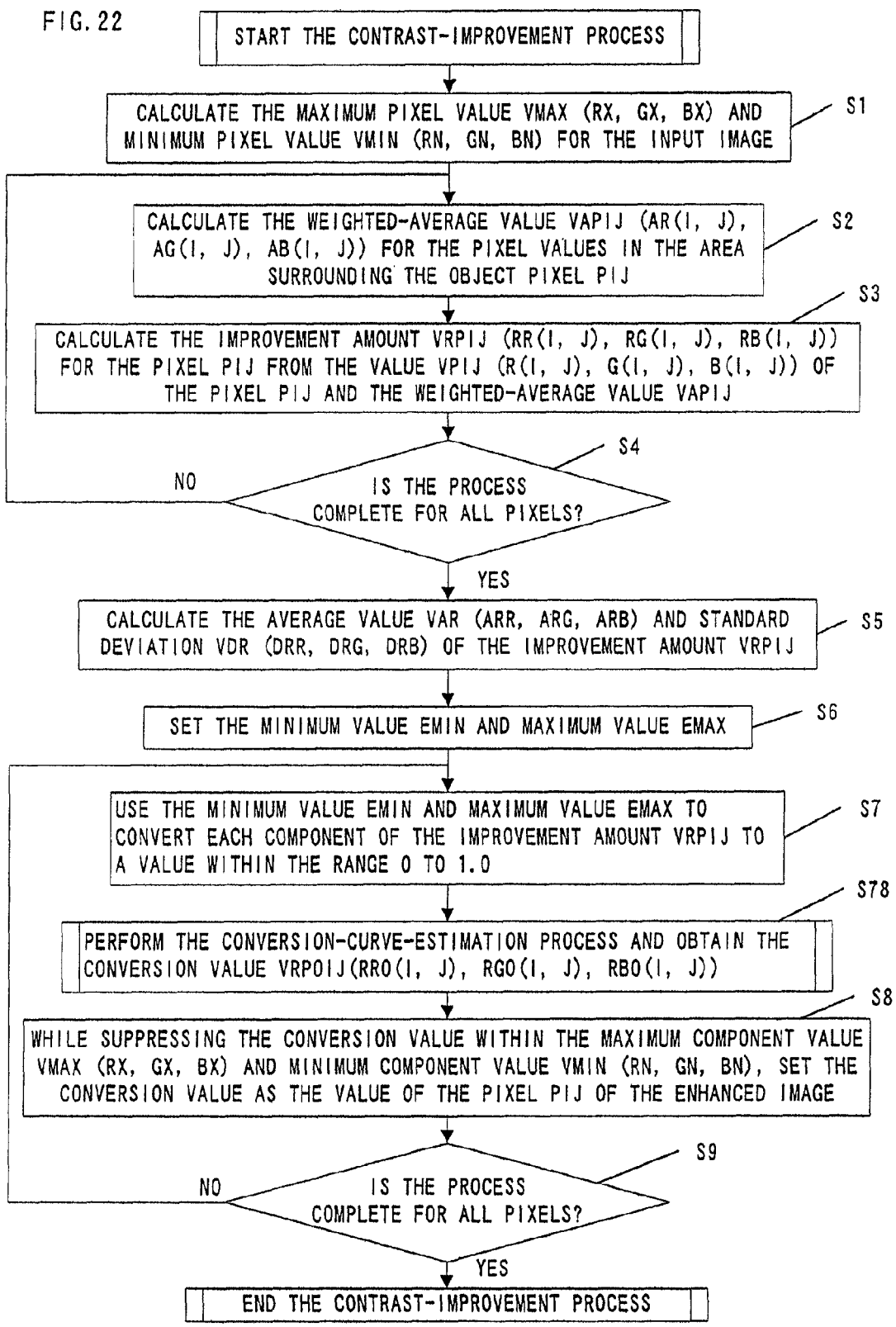
FIG. 22 is a flowchart explaining the contrast improvement process of the seventh embodiment.

FIG. 22 is a flowchart explaining the contrast improvement process of this embodiment.

Figure 23:
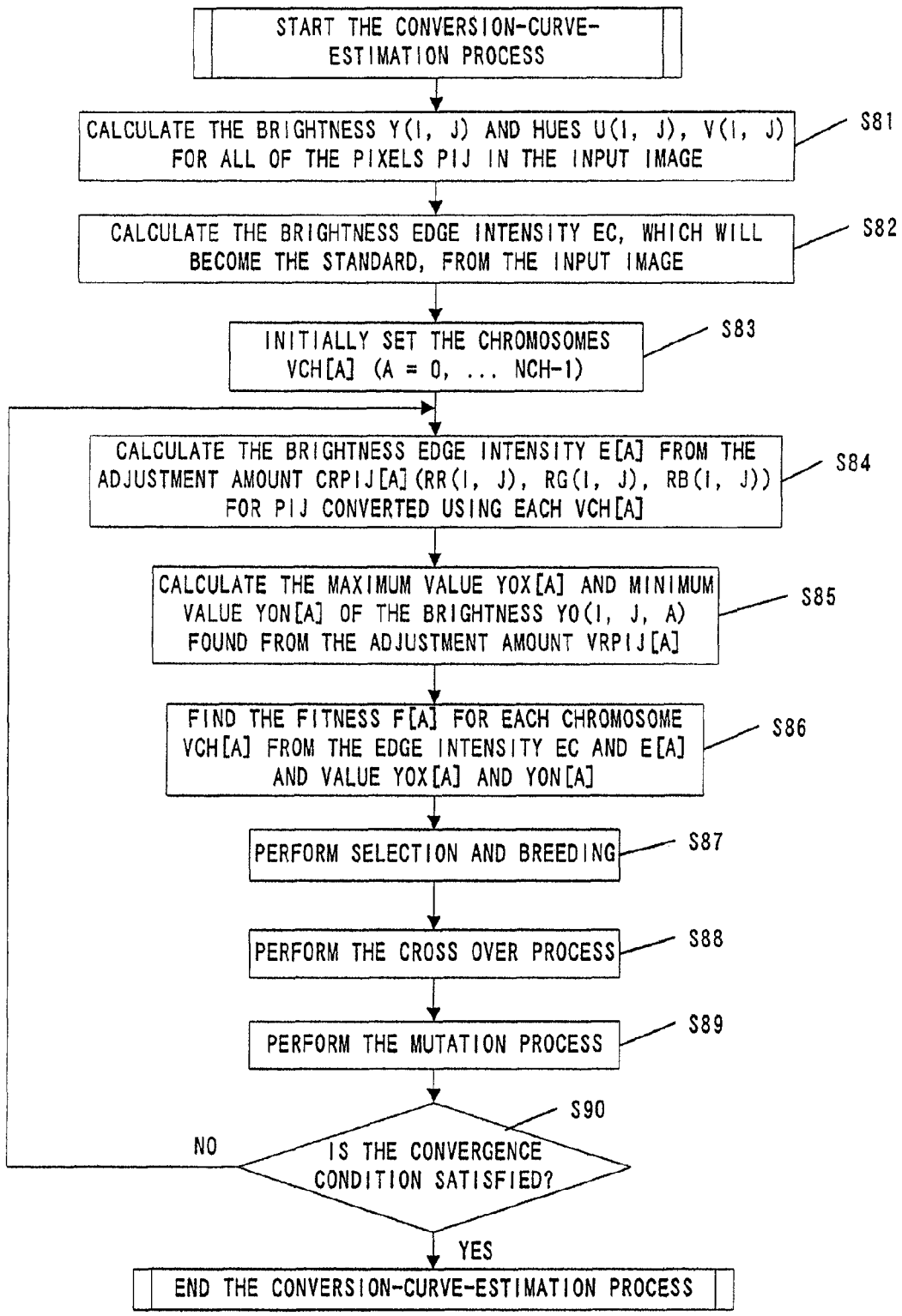
FIG. 23 is a flowchart explaining the conversion curve estimation process of the seventh embodiment.

As in the first embodiment, after the extraction unit 10 converts the values of each component of the contrast improvement amount VRPij (Rr(i, j), Rg(i, j), Rb(i, j)) to values within the range 0.0 to 1,0, the pixel value conversion unit 102 performs the pixel value conversion process S78, S79 including the conversion curve estimation process. FIG. 23 is a flowchart explaining in detail the pixel value conversion process.

The standard intensity calculation unit 1023 calculates the brightness y(i, j) and color difference u(i, j), v(i, j) for each pixel Pij in the input image vi (S81). Furthermore, from this brightness, it finds the edge intensity Ec of the input image vi (S82). This edge intensity is defined by Equations 9 below.

$$Ec = \Sigma\Sigma ec(i,j)$$

$$ec(i,j) = (de1i(i,j)^2 + de1j(i,j)^2)^{1/2}$$

$$de1j(i,j) = -y(i-1,j-1) + y(i-1,j+1) - 2.0*y(i,j-1) + 2.0*y(i,j+1) - y(i+1,j-1) + y(i+1,j+1)$$

$$de1i(i,j) = -y(i-1,j-1) + y(i+1,j-1) - 2.0*y(i-1,j) + 2.0*y(i+1,j) - y(i-1,j+1) + y(i+1,j+1) \quad \text{(Eqs. 9)}$$

In Equations 9, the edge intensity Ec is defined as the sum of the edge intensities ec(i, j) in the pixels Pij calculated using a Sobel filter.

After the standard intensity calculation unit 1023 finds the edge intensity Ec for the input image, the conversion curve estimation unit 1024 performs the conversion curve estimation process that uses a genetic algorithm.

The genetic algorithm is described in detail in documents such as 'Genetic Algorithms in Search, Optimization and Machine Learning' (David E. Goldberg, Addison Wesley). The genetic algorithm has superior global search ability, and even though it may not be possible to obtain differentiation information from the evaluation function for the optimal solution search problem, as long as it is possible to obtain the evaluation value itself, it is a useful method capable of performing a search. It can also be applied to problems where the only judgment standard is human subjective evaluation.

In the conversion curve estimation unit 1024, the initial candidate setting unit 241 prepares an initial population Gv, which has elements, Nch number of search vectors Vch[A] (S83). Here, the search vectors Vch[A] comprise n number of search parameters g0, g1, ..., gn−1. From their relationship to living matter, the search vectors Vch[A] are called chromosomes, and the members of the search vectors Vch[A] (k=0, ..., n−1) are called genes.

The chromosomes are made to correspond to the conversion curves for finding conversion values in the range from 0.0 to 1.0 for the input from the extraction unit 101. As shown in FIG. 24A, this conversion curve can be expressed n number of coordinates (ik, ok) that correspond to the combination of the input value ik and output value ok. In that case, the genes gk, except for gene g0, are made to correspond to the difference between the vector Ok from the origin to coordinate (ik, ok) and the vector Ok−1 from the origin to coordinate (ik−1, ok−1). The gene g0 is made to correspond to the vector O0 from the origin to the coordinate (i0, o0). As shown in FIG. 24B, it is possible to perform chromosome notation for the search vectors that correspond to the conversion curve by using a real coding scheme to arrange the n number of genes g0, g1, ..., gk, ..., gn−1 as are. Instead of the real coding scheme, it is also possible to use a binary coding scheme in which the genes gk are notated as binary numbers and those binary numbers are arranged in an array.

In order to prepare an initial population Gv of these kinds of chromosomes, the initial candidate setting unit 240 selects n number of real numbers generated from uniform random numbers in the range from −1 to 1, and sets one initial search vector v. By preparing the vectors of the same number as Nch number of preset chromosomes, the initial population Gv={Vch[A]} (A=0, ..., Nch−1) is set. The optimal search starts from this initial population Gv.

The pixel value conversion candidate calculation unit 241 uses the conversion curve corresponding to each of the chromosomes of set Gv to find the conversion value VRPoij[A] (Rro(i, j, A), Rgo(i, j, A), Rbo(i, j, A)) from the input value VRPij (Rr(i, j), Rg(i, j), Rb(i, j)) obtained by the extraction unit 101. The candidates for the enhanced image v are found from this conversion value. Furthermore, the pixel value conversion candidate calculation unit 241 calculates the brightness yo(i, j, A) for that conversion value.

The evaluation value calculation unit 242 finds the edge intensity E[A] for the candidates of the enhanced image v obtained from the conversion curves according to that brightness yo as the evaluation value (S84). This evaluation value is the result of evaluating the appropriateness of the solution of the search vectors Vch[A] corresponding to the conversion curves according to a preset measure for evaluation. This measure for evaluation is called the evaluation function (fitness function). Here, Equations 9 gives the evaluation functions. This is because that an image with good visual contrast has the feature that light and dark in the image is not only very distinguishable but also the edges in image are sharp.

The fitness calculation unit 243 finds the maximum value yox[A] and minimum value yon[A] of the brightness yo(i, j, A) at each pixel in the candidate of the enhanced image v obtained from the conversion curves (S85). Furthermore, from the evaluation value E[A] found by the evaluation value calculation unit 242, it calculates the fitness of the search vectors corresponding to the conversion curves (S86). Various functions are possible as the functions for calculating the fitness f[A]. Here the function given by Equation 10 is used. $\Phi$ is a constant.

$$f[A] = \{E[A] + \Phi*(yox[a] - yon[A])\}/Ec \quad \text{(Eq. 10)}$$

The value obtained by adding, to the edge intensity E[A] of that candidate of the enhanced image v obtained from each conversion curve, a value that is related to the distance between the maximum value yox[A] and the minimum value yon[A] of the candidate is divided by the edge intensity Ec of the input image vi to give the fitness f[A]. The term related to the distance between the maximum value yox[A] and the minimum value yon[A] not only is used for improving the edge intensity, but is also used to contain as many conversion output areas as possible.

The larger the value for the fitness f[A] is, the better the search vector, or in other words, the conversion curve is determined to be.

The recombination operation unit 244 performs a selection for each chromosome of the population Gv according to this fitness f[A] (S87), and in order to generate a next generation population from that set Gv, it performs genetic recombination operation of the selected chromosomes such as crossover (S88) and mutation (S89). Here, the number Nch of chromosomes of each generation is fixed, however the number can be increased or decreased.

The selection is performed by the Roulette selection method of selecting a search vector with probability that is proportional to the fitness. A summary of processing by the Roulette selection method is given in (i) to (iii) below.

(i) The sum F of the fitness of all of the search vectors is found using Equation 11 below from the fitness f[A] of the search vectors Vch[A](A=0, ... , Nch−1) of the population Gv.

$$F = \sum_{j=1}^{n} [A] \quad (k = 1, \dots, Nch) \quad \text{(Eq. 11)}$$

(ii) The selection probability h[k] for selecting a search vector Vch[A] as a parent for creating the next generation search vectors is set according to Equation 12 below.

$$h[A]=f[A]/F \quad \text{(Eq. 12)}$$

(iii) A selection range I[A] for each search vector is assigned in the space [0, 1] according to Equations 13 below, for example.

$$Ih[0] = 0 \quad \text{(Eqs. 13)}$$
$$Ih[A] = \sum_{j=0}^{A} [j]$$
$$I[A] = [Ih[A-1], Ih[A]) \quad (A = 1, \dots, Nch)$$

Also, a set RR of uniform random numbers ra[A] is generated with [0, 1] where RR=(ra[0], ra[1], ... , ra[Nch−1]). Here 0<ra[j]<1.

Also, a set Num=(num[0], num[1], ... , num[Nch−1]) in num[B]=I[A] that satisfies Equation 14 below is found for the random numbers ra[B] in the set RR. In this way the set of Nch number of search vectors corresponding to the set Num is selected.

$$ra[B] \in I[A](AB=0,1,\dots,Nch-1) \quad \text{(Eq. 14)}$$

Using this kind of Roulette selection method, new next generation search vectors Vch[A] are selected from the current population of search vectors Gv.

Figure 25A:
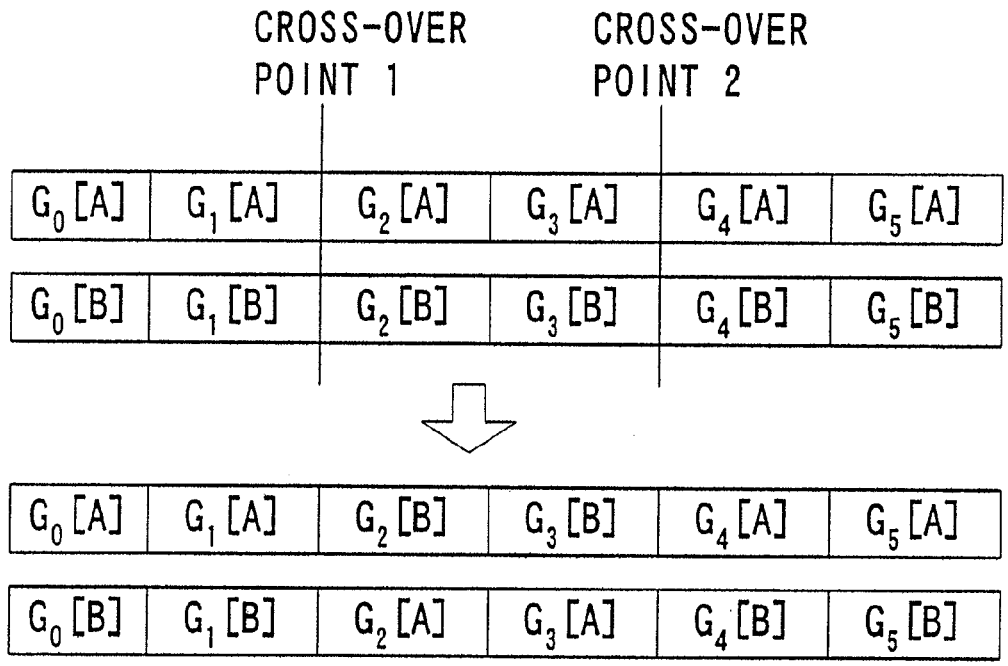
FIGS. 25A and 25B are schematic diagrams that graphically show the recombination operation process of the genetic algorithm.
Figure 25B:
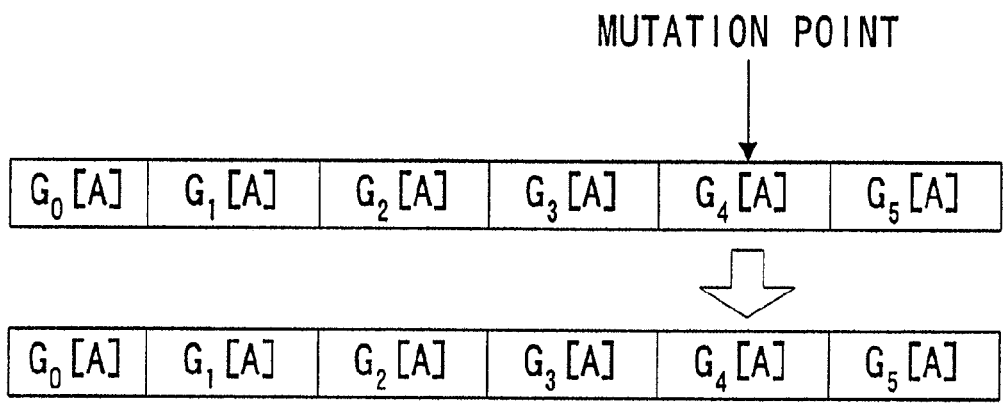

After the chromosomes have been selected as the parent of new next generation chromosomes, cross over processing and mutation processing are performed on them as shown in FIGS. 25A and 25B. Cross over is an operation of creating a new search vector by exchanging parts of two chromosomes expressed by finite symbols. This operation corresponds to searching in a location separated far from the current solution vector. In the example in FIG. 25A, the symbols between cross over point 1 and cross over point 2 of chromosome Vch[A] and chromosome Vch[B] are exchanged. The cross over here can also be one-point cross over or two-point cross over.

Also, mutation is an operation of selecting at random a symbol in part of the chromosome having low probability, and changing to selected symbol with another symbol. This operation corresponds to searching near the current search vector. In the example shown in FIG. 25B, of the symbols of the chromosome, the symbol g4 [A] is mutated to f4[A]. By changing the probability of performing mutation using half of the population and the remaining half, it is possible to better maintain the diversification of the search vector.

The population of next generation search vectors is created by this kind of cross over and mutation processing.

When the estimation end judgment unit 245 determines that the convergence condition has not yet been satisfied, the steps S84 to S89 are repeated. That convergence condition can be a condition such as when the number of repetitions exceeds the allowable number of repetitions.

By repeating this process, estimation of search parameters of the optimum conversion curve is performed. Many candidates are globally prepared, and by repeatedly performing a symbol recombination operation such as cross over or mutation that are not trapped easily by the local optimum solution (local minimum), it becomes possible to automatically and accurately estimate the optimum conversion curve.

After the optimum conversion curve is obtained, the pixel value estimation unit 245 uses that conversion curve to find the conversion value in the range of 0.0 to 1.0, and finds the value of the pixel on the enhanced image v (S79). The value of the pixel in the enhanced image v is kept within the maximum value Vmax (rx, gx, bx) and the minimum value Vmin (rn, gn, bn) of each of the components of the pixel Pij in the input image vi.

As described above, in the image processing apparatus of this embodiment, by using as an evaluation value improvement degree of the edge intensity related to the articulation of detailed areas when estimating the conversion function, it is possible to improve the contrast and also improve the sharpness of the edges. Also, by using a genetic algorithm in the estimation of the optimum conversion function, it is possible to automatically estimate the optimum conversion function without depending on the input image.

It is also possible to combine the image processing of this embodiment with the image processing of the second embodiment.

Moreover, the image processing of this seventh embodiment can be realized by a software process that uses a CPU and DSP.

Eighth Embodiment

Figure 26:
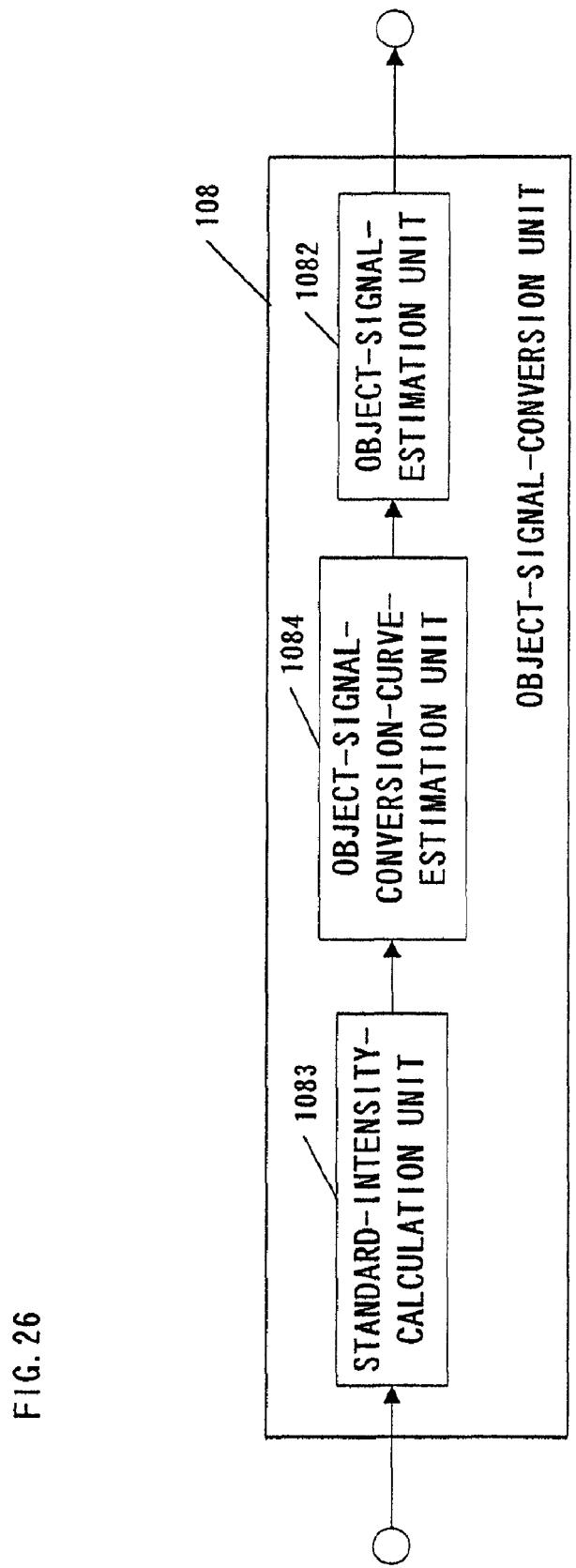
FIG. 26 is a block diagram shown the object signal conversion unit of an eighth embodiment of the invention.

In the image processing apparatus of the eighth embodiment, part of the object signal conversion unit 108 has different construction than that of the image processing apparatus of the sixth embodiment. As shown in FIG. 26, that object signal conversion unit 108 comprises a standard intensity calculation unit 1083 and object signal conversion curve estimation unit 1084 instead of the average object signal calculation unit 1080 and conversion method selection method 1081.

When the contrast improvement amount for the object signal is input from the extraction unit 101 to that object signal conversion unit 108, the standard intensity calculation unit 1083 calculates the edge intensity for the object signal that expresses the contrast data of the input image vi. The object signal is the lightness, for example.

Figure 27:
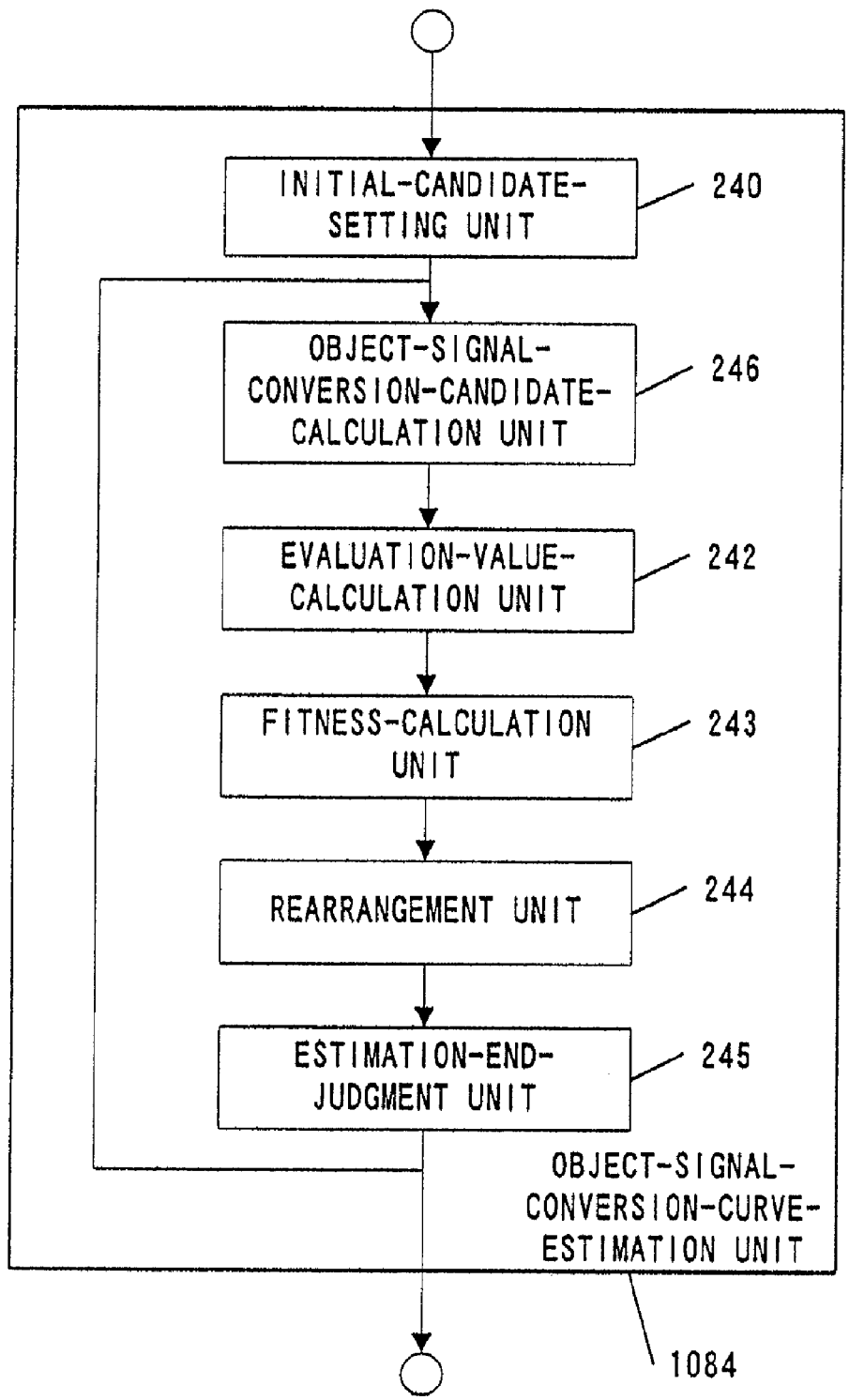
FIG. 27 is a block diagram showing the object signal conversion curve estimation unit of the eighth embodiment.

The object signal conversion curve estimation unit 1084 uses a genetic algorithm to estimate the object signal conversion curve for converting the contrast improvement amount for the lightness to the value in the enhanced image v. As shown in FIG. 27, except for having an object signal conversion candidate calculation unit 246 instead of the pixel value conversion candidate calculation unit 241, the object signal conversion curve estimation unit 1084 has the same construction as the conversion curve estimation unit 1024.

In the object signal conversion curve estimation unit 1084, after the initial candidate setting unit 246 prepares an initial population, the object signal conversion candidate calculation unit 246 finds the value for the lightness of the candidate for the enhanced image v based on the object signal conversion curve indicated by the prepared population of chromosomes. The evaluation calculation unit 242 calculates an evaluation value for the object signal conversion curves corresponding to each candidate from the found values for the lightness of each candidate. The fitness calculation unit 243, recombination operation unit 244 and estimation end judgment unit 245 perform the same processing as in the seventh embodiment except that when the estimation end judgment unit 245 determines the end of estimation, the object signal conversion curve is given to the object signal estimation unit 1082.

After the object signal conversion curve has been estimated, the object signal estimation unit 1082 finds the conversion value for the contrast improvement amount for the object signal obtained by the extraction unit 101 based on the object signal conversion curve instead of the selected conversion method.

As described above, in the image processing of this embodiment, by performing the same process as in the seventh embodiment for the object signal, which in this case is the lightness, not only is it possible to improve the contrast and the sharpness of the edges, but it is also possible to improve the color stability of pixels in dark areas such as shadows.

It is also possible to combine the image processing of this embodiment with the image processing of the fourth embodiment.

Moreover, the image processing of this eighth embodiment can also be realized by a software process that uses a CPU and DSP.

Ninth Embodiment

On problem with images taken with a digital camera is the phenomenon of color cast. This is a phenomenon where due to the photographic conditions, certain colors come out stronger than what is proper. Humans are capable of adapting to light, so seeing different colors due to differences in the light source does not often occur, however, in an image taken with a digital camera, color cast occurs a little due to the light source when the image was taken. At sunrise and sunset there is red color cast, and under fluorescent light, there is a tendency for the color to turn a green color. Also, the color cast occurs by reflection from the circumference of the subject of a photograph, for example reflection by water in a pool causes the blue color cast to occur, and reflection by plants causes the green color cast to occur.

In order to remove this kind of color cast, for example, when the color green G is to strong, correction of the tone curve and density level in order to weaken the cyan C and yellow Y signals is performed manually.

Also, there is auto white balance processing that performs adjustment automatically based on the Evans theory. The Evans theory is a theory based on the assumption that when all of the photographed objects in the world are added the result is achromatic color, the basis of this processing is to adjust the balance of all colors such that the average value of the entire input image is gray (achromatic color).

Figure 28:
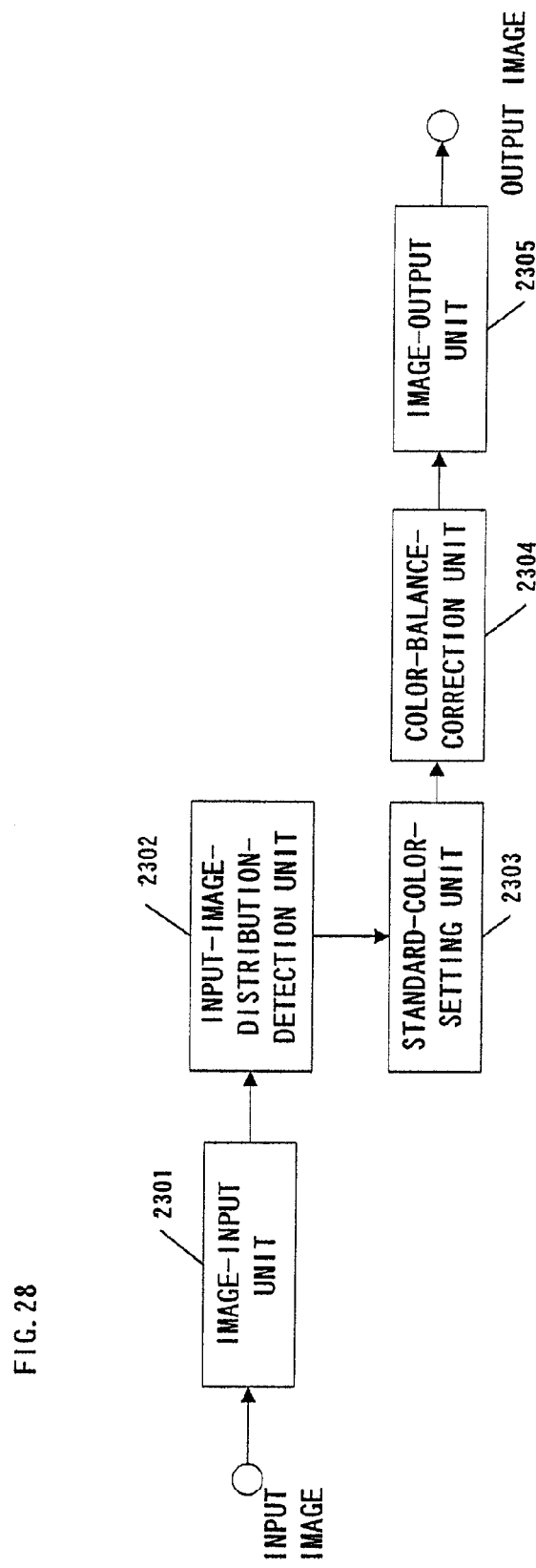
FIG. 28 is a block diagram showing an image processing apparatus that performs auto white balance.

FIG. 28 is a block diagram showing one example of the construction of an apparatus for performing this kind of process automatically. In this apparatus, the input image distribution detection unit 2301 finds the average value for the red, blue and green signals in the input image from the image input apparatus 2301. The standard color setting unit 2303 calculates the average value of the brightness of the input image and sets this value as the standard color. The color balance correction unit 2304 corrects each of the signals such that the average value of each of the red, blue and green signals obtained by the input image distribution detection unit 2303 becomes the standard color. With this correction, the average color of the entire input image becomes gray and color cast is automatically reduced.

However, when this kind of process is used for the input image and there is an object in that input image that has a very vivid color that occupies a large area, the tendency for that color to become the average color becomes strong, and there is a problem that this color will become close to the achromatic color. For example, when the color green of grass or lawn occupies a large part of the image, a phenomenon (color failure) occurs in which the color of the grass becomes the achromatic color.

In this ninth embodiment, image processing is explained in which the contrast is improved and the input image and enhanced image are adaptively combined such that this kind of color cast is reduced.

Figure 29:
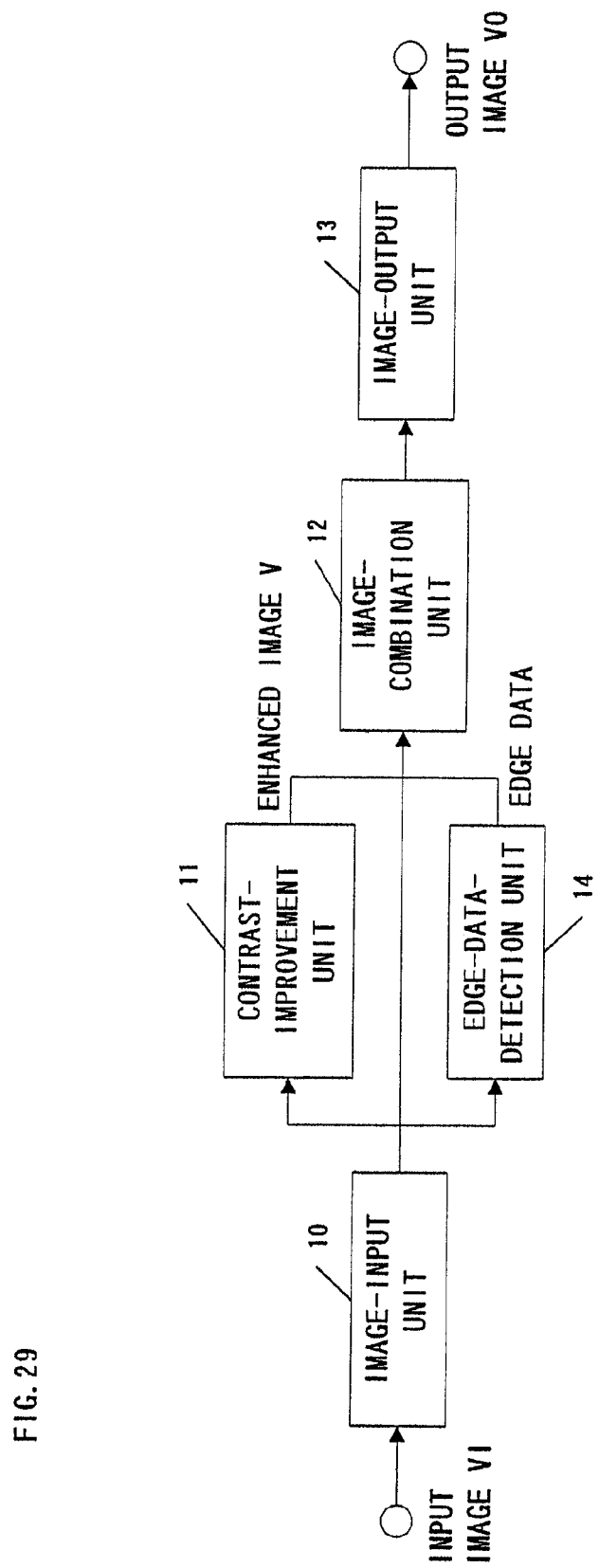
FIG. 29 is a block diagram showing the overall construction of the image processing apparatus of a ninth embodiment of the invention.

As shown in FIG. 29, in addition to an image input unit 10, contrast improvement unit 11, image combination unit 12 and image output unit 13, the image processing apparatus of this ninth embodiment comprises an edge data detection unit 14 that detects edge data from the input image vi.

Figure 30:
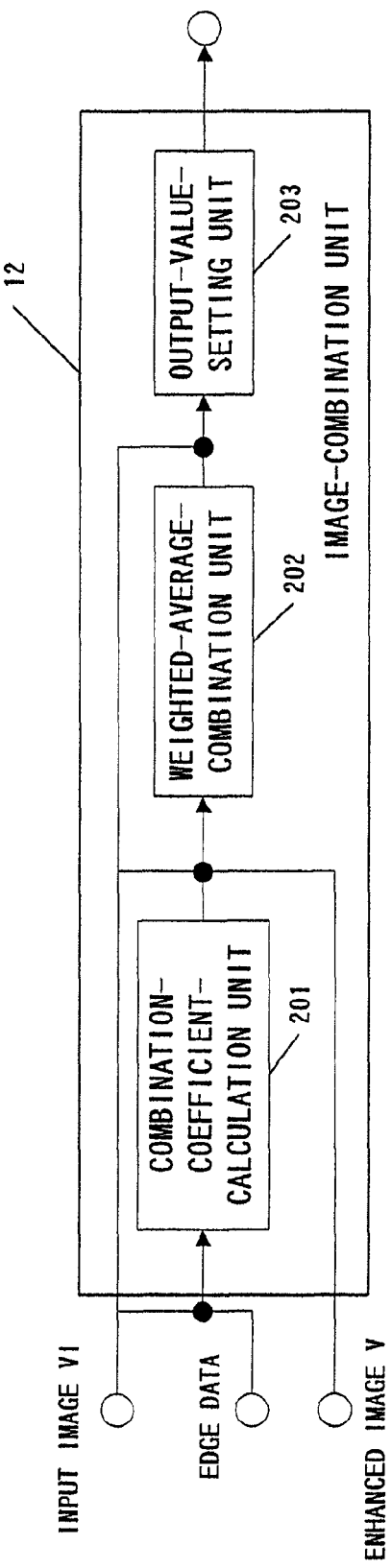
FIG. 30 is a block diagram showing the construction of the image combination unit of the ninth embodiment.

Also, as shown in FIG. 30, in addition to the combination coefficient calculation unit 201 and weighted average combination unit 202, the image combination unit 12 comprises an output value setting unit 203, but does not comprise a selection standard value judgment unit 200. Here, the combination coefficient calculation unit 200 sets combination coefficients w0 and w1 based on the edge data obtained by the edge data detection unit 14 and not on the judgment results of the selection standard value judgment unit 201. The output value setting unit 203 compares the combined image obtained by the weighted average combination unit 202 and the input image vi to set the value of the pixels in the output image vo.

Figure 31:
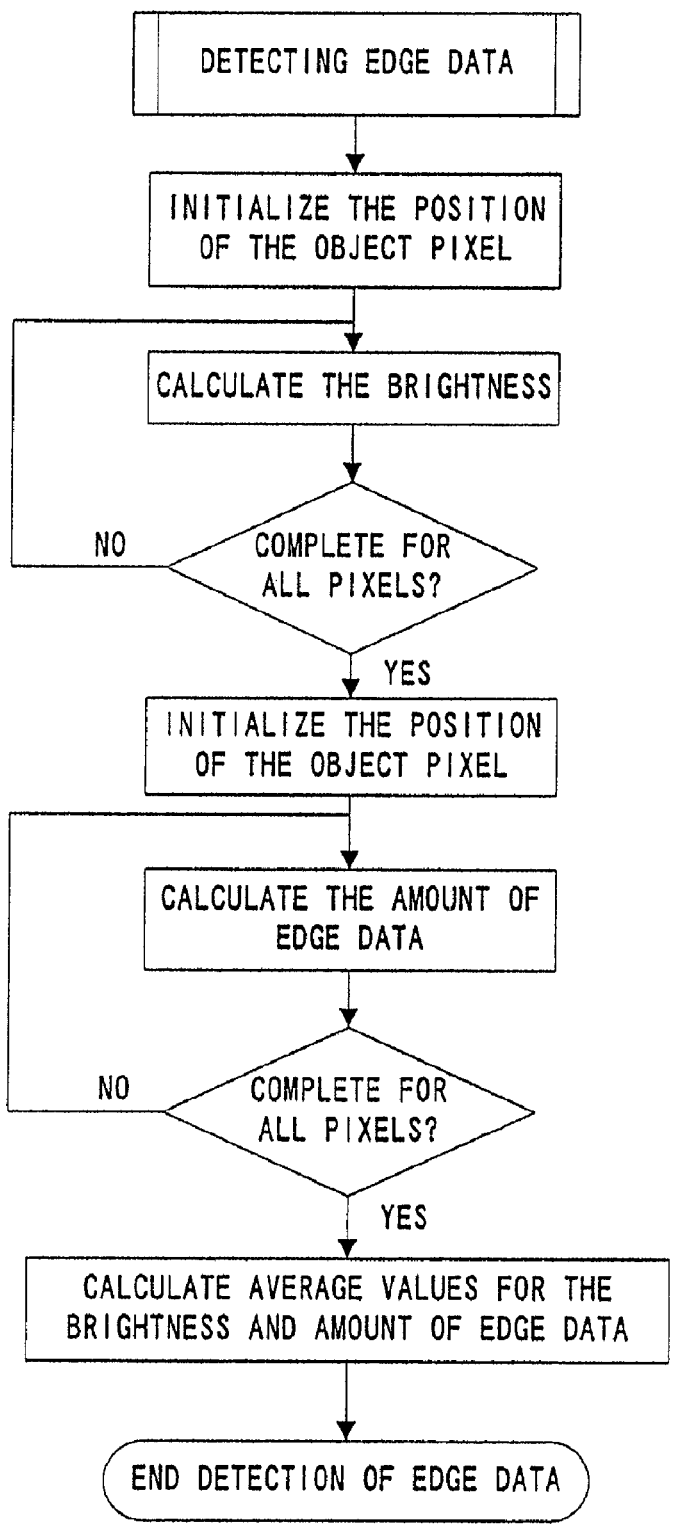
FIG. 31 is a flowchart explaining the edge data calculation process of the ninth embodiment.

FIG. 31 is a flowchart explaining the process of detecting edge data.

After image data is input from the image input unit 10, the edge data detection unit 14 initializes the position of the object pixel and then calculates the brightness y(i, j), for example, of the pixel Pij in the input image vi. This calculation is repeated for all of the pixels to obtain the brightness y(i, j) for all of the pixels Pij in the input image vi. Furthermore, the edge data detection unit 14 initializes the position of the object pixel again, and then calculates the edge data based on the calculated brightness. It is possible to detect edge data for each value of the three color components, however, by detecting the edge data for just the brightness, it is possible to simplify the process. There are various methods for detecting edge data, however, here 5 pixel×5 pixel sized filters, such as shown in FIG. 32, will be used. Pixel Pij is taken to be the center, and each filter is applied and the square root of the sum of the squares of the component amount ex(i, j) obtained in the x direction and the component amount ey(i, j) obtained in the y direction is taken to be the edge data ed(i, j) of that pixel Pij. The filter size and type are not limited to those of this example, and it is also possible to use the previously described 3 pixel×3 pixel sized Sobel filter.

The edge data detection unit 14 repeats the process described above for detecting edge data for all of the pixels in the input image vi, and from that obtains the edge data for each pixel Pij of the input image vi. Furthermore, the edge data detection unit 14 finds the average value ave_y of the brightness and the average value ave_ed of the edge data based on the brightness and edge data of each pixel Pij.

Image data that is the same as that input to the edge data detection unit 14 is also input to the contrast improvement unit 11. The contrast improvement unit 11 generates an enhanced image the same as done in the first embodiment except that it uses Equations 15 and 16 below instead of Equations 4 and 5.

$$Ay(i, j) = \sum_i \sum_j y(i, j)/C^2 \quad \text{(Eq. 15)}$$

$$Rr(i, j) = r(i, j)/Ay(i, j) \quad \text{(Eqs. 16)}$$
$$Rg(i, j) = g(i, j)/Ay(i, j)$$
$$Rb(i, j) = b(i, j)/Ay(i, j)$$

Equation 15 defines the average value Ay(i, j) of the brightness y(i, j) of the pixels in the c pixel sized area corresponding to the surround view. Also, Equations 16 define the contrast improvement amount VRPij (Rr(i, j), Rg(i, j), Rb(i, j)) by the ratio of each component of the pixel Pij and the average value Ay(i, j) instead of the values of each component of the weighted average value VAPij.

By defining the contrast improvement in this way, the comparison value for each component value is the same. Here, it is possible to define the contrast improvement as in Equations 4 and 5, however, calculating the contrast improvement amount using a common value makes it possible to better maintain balance of the obtained contrast improvement amounts than when calculating the contrast improvement amounts for each component independently.

Figure 33:
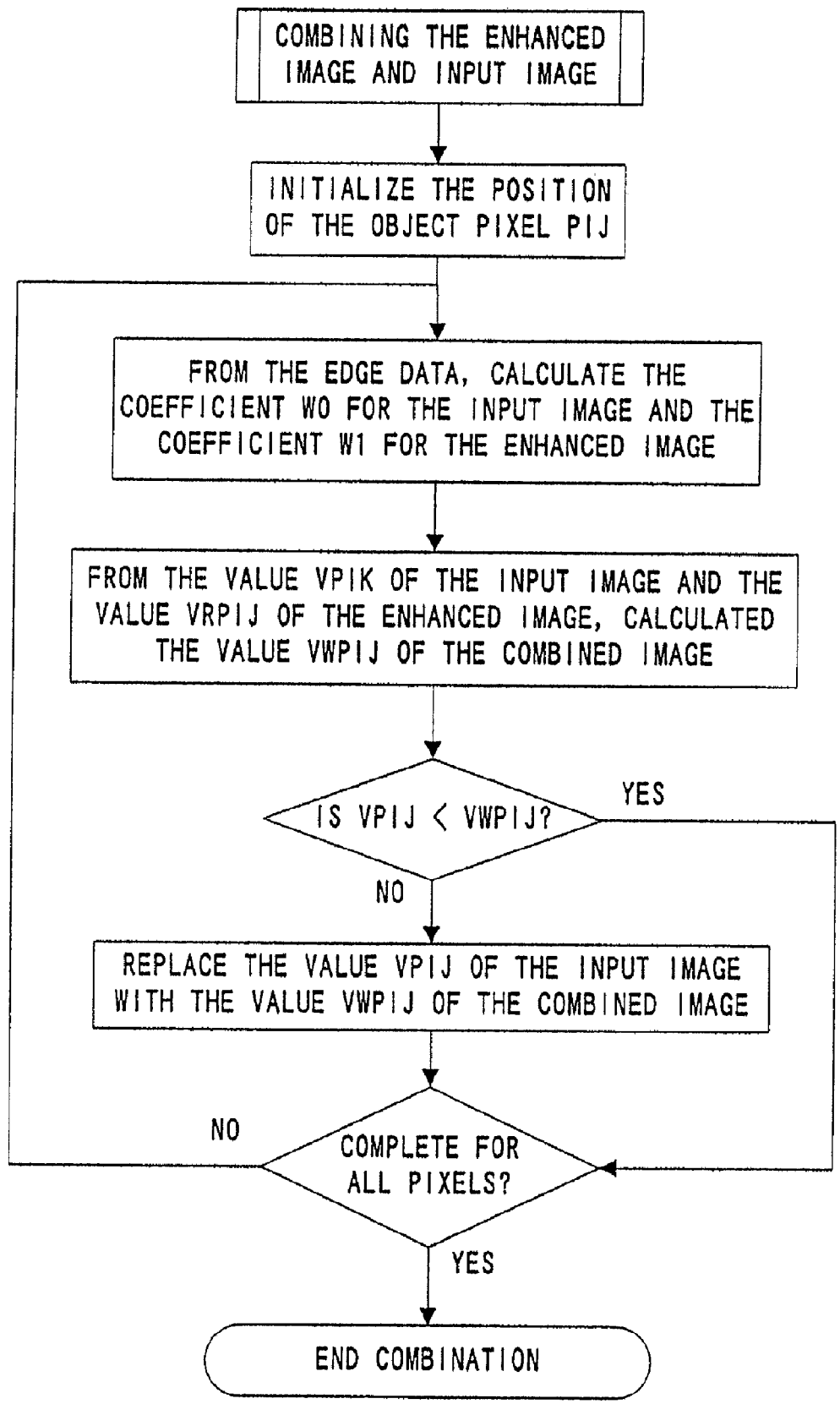
FIG. 33 is a flowchart explaining the image combination process of the ninth embodiment.

The contrast improvement unit 11 generates an enhanced image v, and when that enhanced image v is input to the image combination unit 12, the combination coefficient calculation unit 201 initializes the position of the object pixel Pij, as shown in FIG. 33, and then sets combination coefficients w0 and w1 for both images. In this embodiment, the input image vi and enhanced image v are adaptively combined by controlling the combination coefficients based on the brightness and edge data of the pixels in the input image vi. Setting the combination coefficients is performed according to fuzzy Rules 1 and 2 below.

(Rule 1)
if y(ij) is Low and ed(ij) is Low or y(i, j) is High and ed(i, j) is Low then VWP(i, j) is VP(i, j)

(Rule 2)
if y(ij) is High and ed(ij) is High or y(ij) is Middle and ed(ij) is Middle then M(i, j) is VRP(i, j)

Figure 34:
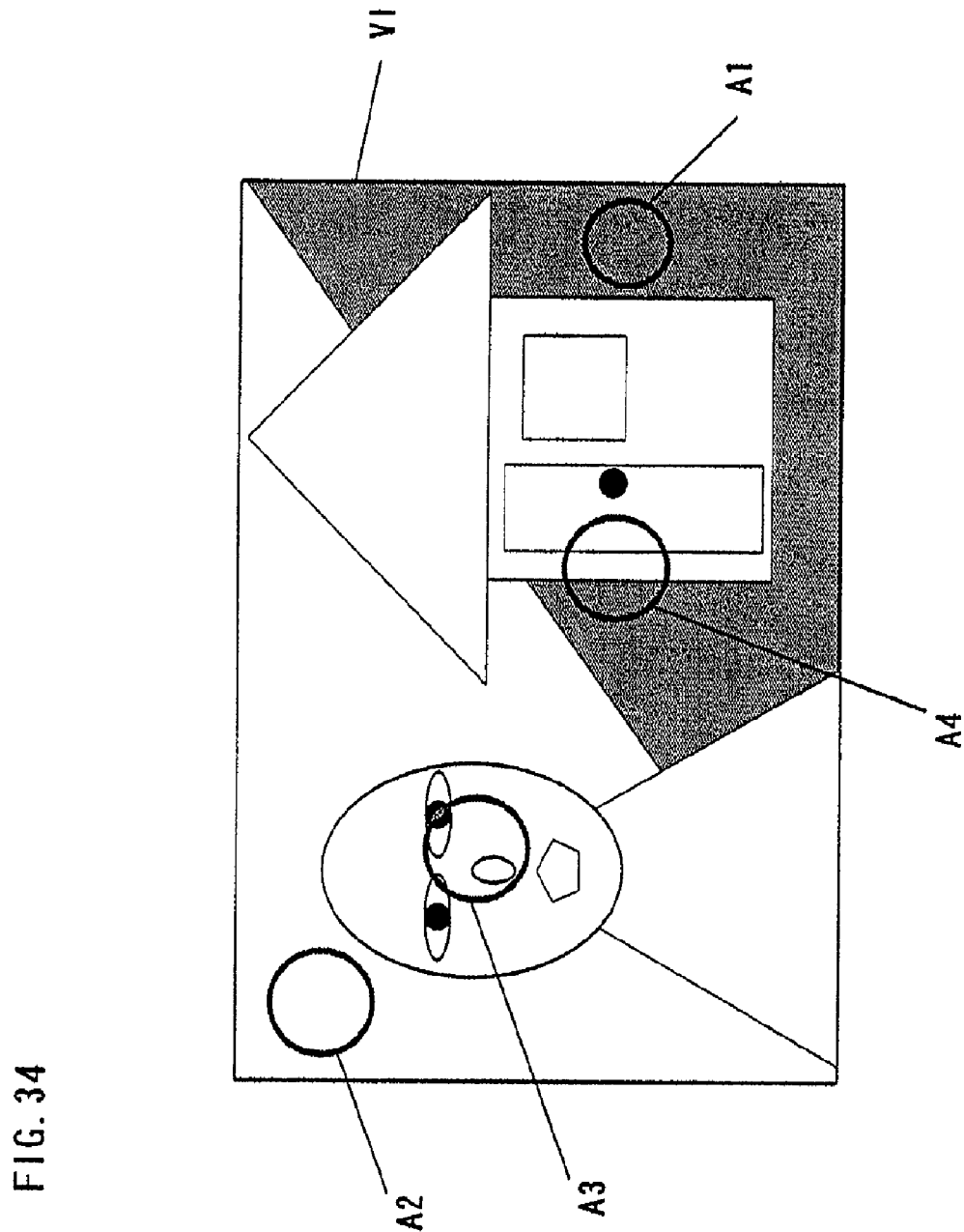
FIG. 34 is a concept diagram showing the relationship between the edge data and image combination process.

In the example of the input image vi shown in FIG. 34, Rule 1 is the rule that corresponds to area A1 or A2. Rule 2 is the rule that corresponds to area A3 or A4. In an areas such as area A1 where the brightness of the pixels is low and change is smooth, or in an area such as A2 where the brightness of the pixels is high and the change is smooth, there is a possibility that color noise or compression noise will appear due to a decreases in brightness and sudden increases in brightness in the enhanced image. In other areas such as area A3 and A4 this problem does not occur in the enhanced image, and color cast in that enhanced image is also decreased.

Therefore, when the degree of reliability m1 of Rule 1 is large, the value of the pixels in the input image vi are given more influence on the values of the pixels of the combined image than the values of the pixels in the enhanced image v, to prevent a drop in brightness or to prevent color noise or compression noise from occurring. Moreover, when the degree of reliability m2 of Rule 2 is large, the value of the pixels in the enhanced image v are given more influence on the values of the pixels of the combined image than the values of the pixels in the input image vi, to improve the contrast and decrease color cast.

Figure 35:
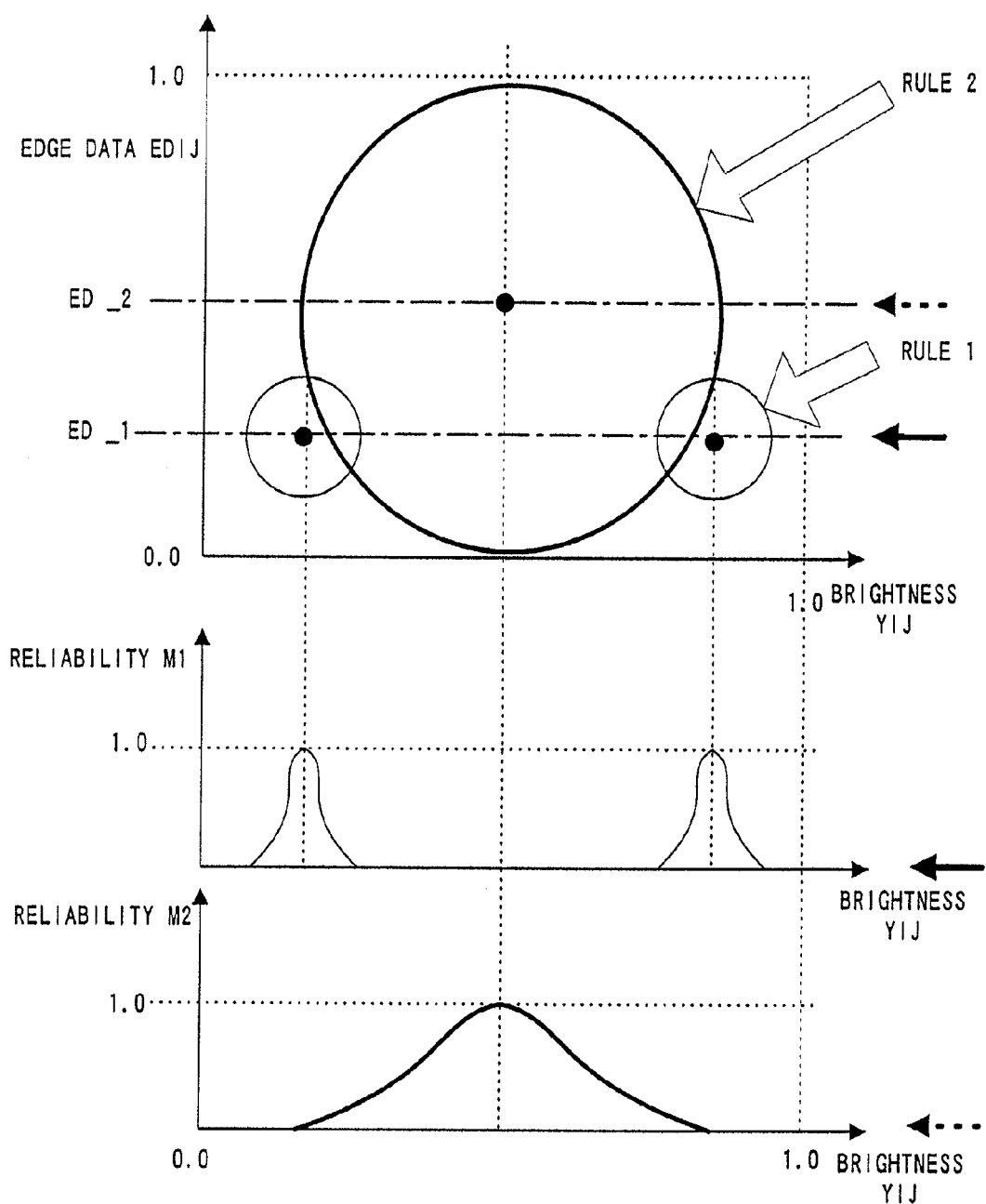
FIG. 35 is a concept diagram showing the fuzzy rule that determines the weighting coefficients for the input image and enhanced image.

The degrees of reliability m1 and m2 are given as shown in FIG. 35 for example. The degree of reliability m1 can be defined by a peak shaped function such as a Gauss function having two peaks; one at the point where the edge data is small and brightness is high and the other where the brightness is low. Also, the degree of reliability m2 can be defined by a peak shaped function where the average value ave_ed of the edge data and the average value ave_y of the brightness of the input image are at the center.

The combination coefficient calculation unit 201 sets the combination coefficient w1 for the enhanced image v based on the degree of reliability m1 and m2 such that w1=m2/(m1+m2). Also, it sets the combination coefficient w0 for the input image v1 such that w0=1.0−w1.

The weighted average combination unit 202 finds the value VWPij (Wr(i, j), Wg(i, j), Wb(i, j)) of the object pixel Pij in the combined image based on the set combination coefficients w0 and w1.

By controlling the combination coefficients such that priority is given to the input image vi in areas not near the edge, but where the brightness is high or low, and priority is given to the enhanced image v in other areas near the edges, not only the contrast is improved but color cast is suppressed. Also, it is possible to prevent a decrease of brightness in highlighted areas and prevent color noise or compression noise from occurring in shadow areas, and it is also possible to suppress the possibility of discontinuity that could occur in the combined image.

However, even when the values of the pixels in the combined image are set in this way, there is a possibility that there will be a decrease in brightness when compared with the pixel values of the input image.

Therefore, the output value setting unit 203 compares the value VPij (r(i, j), g(i, j), b(i, j)) of the object pixel Pij in the input image vi with the value VWPij (Wr(i, j), Wg(i, j), Wb(i, j)) of the object pixel of the combined image. As a result, when the value VWPij is less than the value VPij, the output value setting unit 203 replaces the value VWPij with the value VPij. When the value VWPij is not less than the value VPij, replacement is not performed.

It is also possible to set w0=1.0 and w1=0.0 when the combination coefficient calculation unit 201 compares the pixel value VPij of the input image vi with the pixel value VRPij of the enhanced image v and all of the three components of the value VPij are not less than the value VRPij. In other cases it sets w1=w3=0.5.

Doing this simplifies the process of setting the combination coefficients. However, particularly in areas that are not edges, in a combined image where the coefficient w0 is larger than in the example above, the percentage of the image occupied by the input image becomes large. Therefore, the image receives the bad influence of color cast of the input image.

Also, the image processing of this ninth embodiment can be combined with the image processing of the second embodiment.

In the second embodiment, the ratio of the value VPij of the object pixel Pij with the overall weighted average value VAPij was used as the contrast improvement amount, however, it is also possible to used the ratio of the ratio of the value VPij with the maximum weighted average value. The maximum weighted average value is found by comparing the weighted average values of each size ck for each component. The time for the comparison process increases, however, there are advantages in that the fluctuation of the pixel values in the enhanced image v becomes gradual, and sudden increases in values near the edges are prevented.

Furthermore, the image processing of this ninth embodiment can also be realized by a software process that uses a CPU and DSP.

Tenth Embodiment

Figure 36:
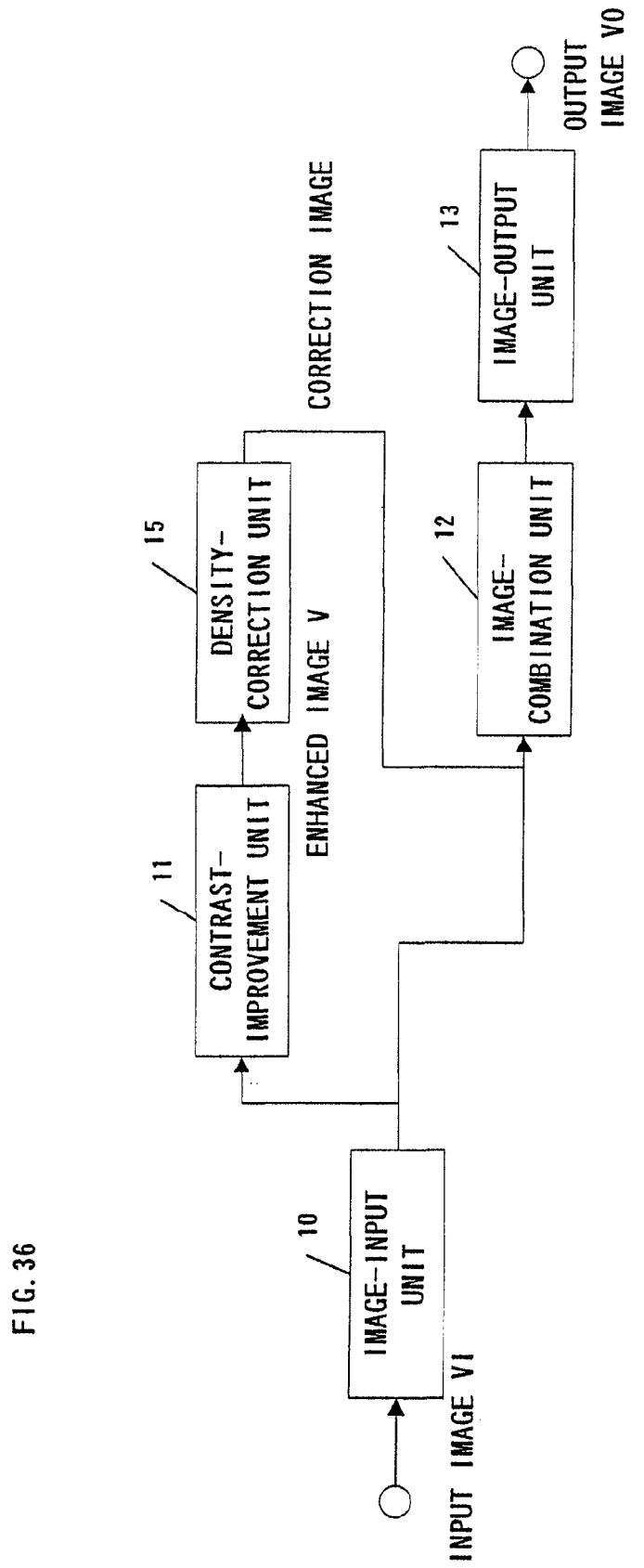
FIG. 36 is a block diagram shows the overall construction of the image processing apparatus of a tenth embodiment of the invention.

As shown in FIG. 36, in addition to an image input unit 10, contrast improvement unit 11, image combination unit 12 and image output unit 13, the image processing apparatus of a tenth embodiment of the invention comprises a density correction unit 15 that corrects the density distribution of the enhanced image v according to the density distribution of the input image vi.

Figure 37:
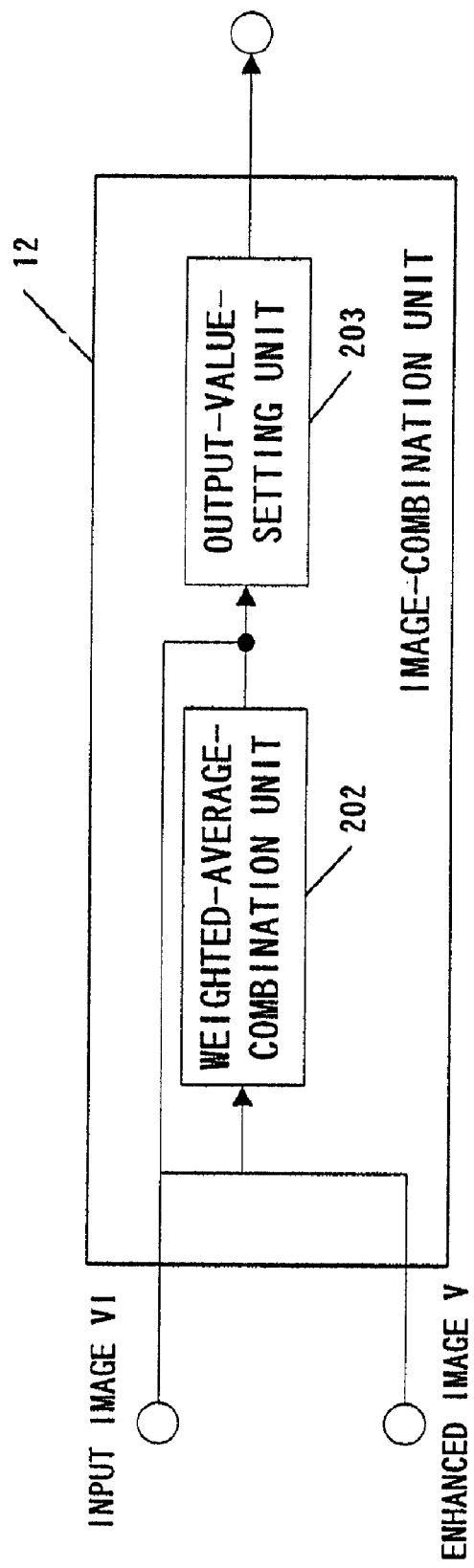
FIG. 37 is a block diagram showing the construction of the image combination unit of the tenth embodiment.

Moreover, the image combination unit 12, as shown in FIG. 37, comprises a weighted average combination unit 202 and output value setting unit 203 as in the ninth embodiment, however, it does not comprise a combination coefficient calculation unit 201. This simplified image combination unit 12 combines the corrected image obtained by the density correction unit 15 and the input image.

Figure 38:
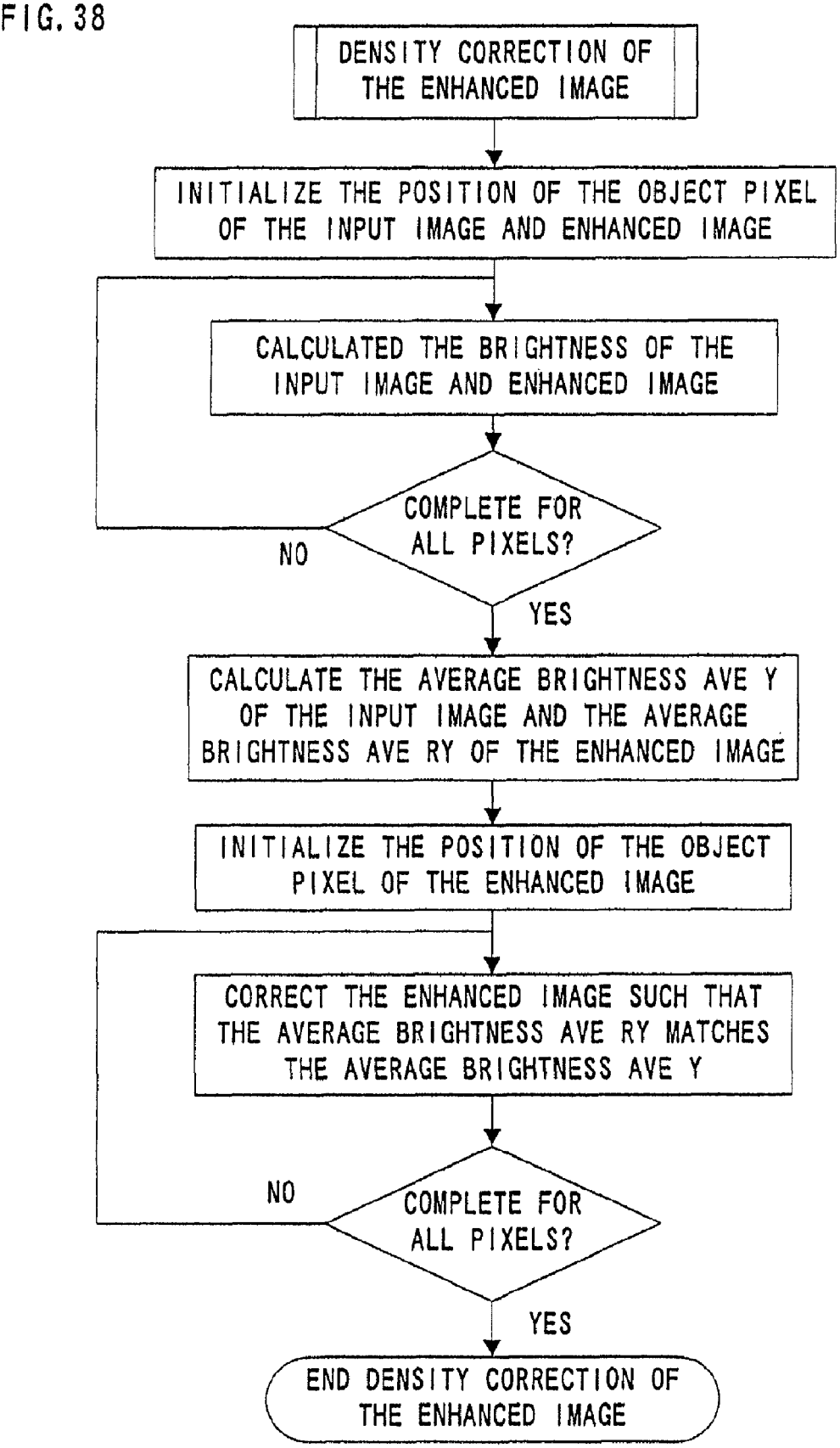
FIG. 38 is a flowchart showing the density correction process of the enhanced image of the tenth embodiment.

FIG. 38 is a flowchart explaining the density correction process.

After the enhanced image v is obtained by the contrast improvement unit 11, the density correction unit 15 initializes the position of the object pixel Pij and then calculates the luminance Ry(i, j), and color differences Ru(i, j), Rv(i, j) of the object pixel Pij in the input image vi and enhanced image v.

After this calculation is repeated for all of the pixels in the input image vi and enhanced image v, the density correction unit 15 calculates the average luminance ave_y of the input image vi and the average luminance ave_Ry of the enhance image v from these values.

After calculating the average luminance ave_y and ave_Ry, the density correction unit 15 initializes the position of the object pixel Pij in the enhanced image v, and performs correction by adding the difference between the average luminance values ave_y−ave_Ry to the luminance Ry(i, j) of the object pixel Pij in the enhanced image v.

After correcting the luminance Ry(i, j), the density correction unit 15 calculates the corrected value VDPij (Dr(i, j), Dg(i, j), Db(i, j)) of the object pixel Pij in the enhanced image v from the corrected luminance Ry(i, j) and color differences Ru(i, j), Rv(i, j).

Figure 39:
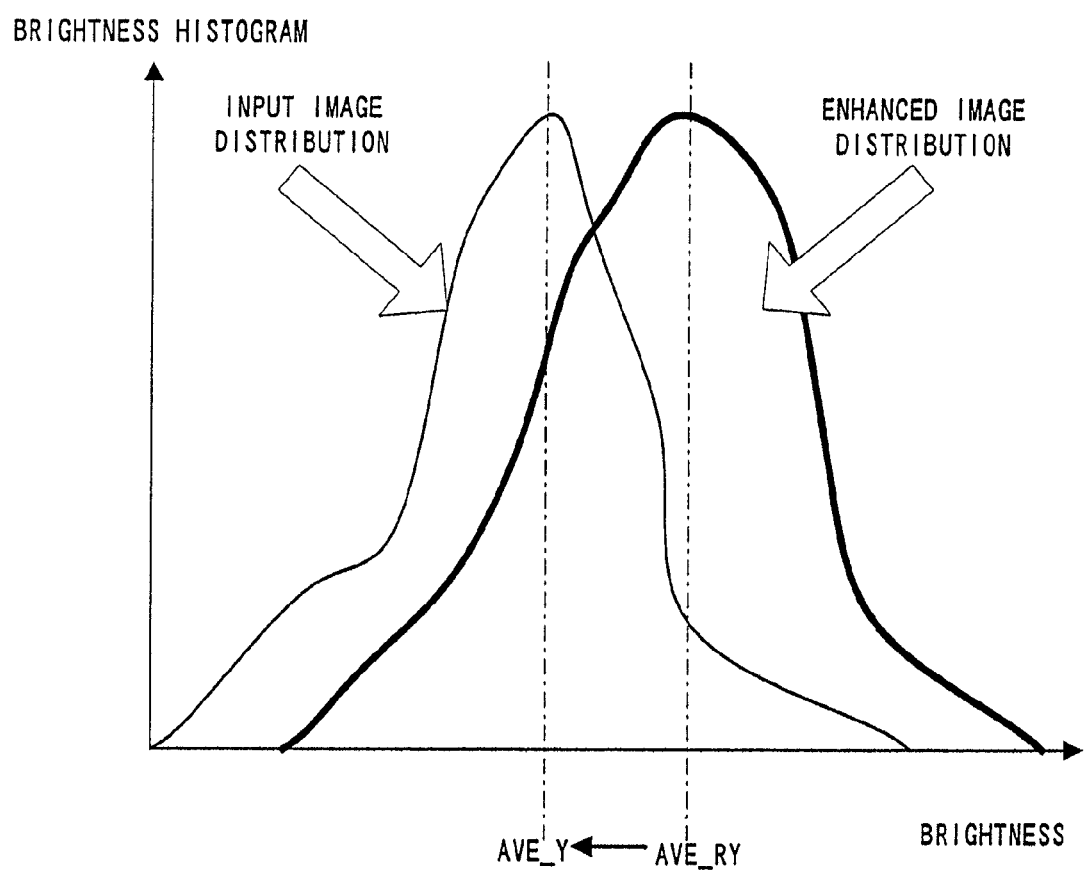
FIG. 39 is a concept diagram of the density correction process for the enhanced image of the tenth embodiment.

The corrected image is obtained by calculating a correction value for each pixel in the enhanced image v. In areas where the change in luminance is small over a wide area, there is a possibility that the luminance will decrease or suddenly increase by the contrast improvement. As a result, the average luminance in the enhanced image ave_Ry tends to be affected largely. Therefore, as shown in FIG. 39, the correction value is calculated such that the average luminance ave_Ry of the enhanced image v matches the average luminance ave_y of the input image while saving the luminance distribution of the image with enhanced detail. By doing this, decreases in luminance in highlighted areas and sudden increases in luminance in shadows are suppressed in the corrected image.

Figure 40:
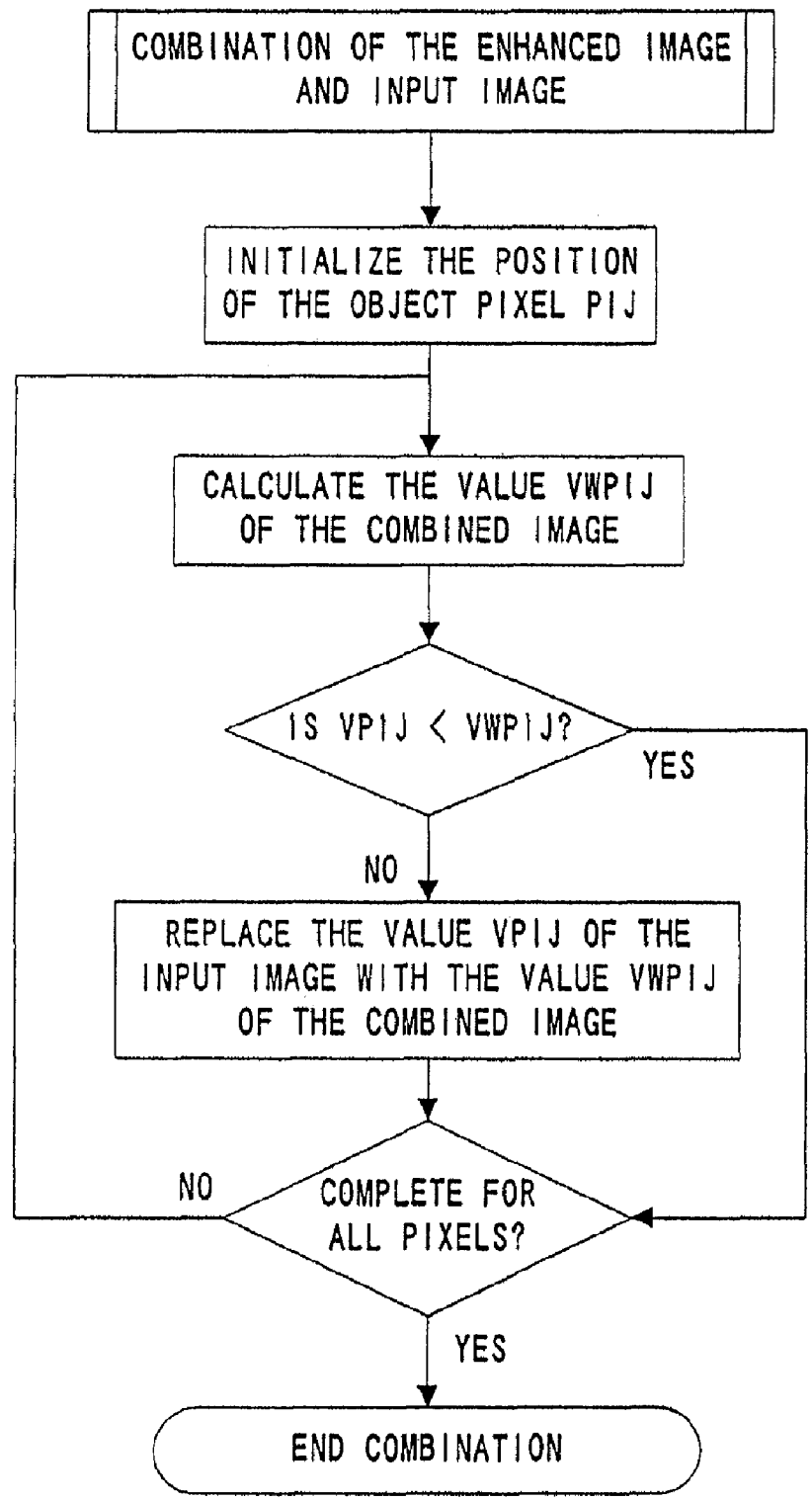
FIG. 40 is a flowchart explaining the image combination process of the tenth embodiment.

As shown in FIG. 40, when the corrected image is input to the image combination unit 12 from the density correction unit 15, the weighted average combination unit 202 initializes the position of the object pixel Pij, then uses the combination coefficient w0 and w1 to calculate the value VWPij of the combined image from the value VPij of the input image and the value VRPij of the corrected image.

As already described, decreases in luminance in large highlighted areas are suppressed in the corrected image, so there is little need to use edge data to calculate the combination coefficients w0 and w1. It is also possible to use preset values for the combination coefficients w0 and w1 such that the values of the corrected image have priority of the input image. For example, the combination coefficient w0 for the input image is set in advance to 0.3, and the combination coefficient w1 for the corrected image is set to 0.7.

Moreover, the output value setting unit 203 performs the same procedure as in the ninth embodiment. The combined image is obtained from this.

By using the corrected image instead of the enhanced image as described above, it is possible to more easily obtain a combined image with improved contrast while at the same time suppressing decreases in luminance in highlighted areas and sudden increases in luminance in shadows. Furthermore, since the percentage of the output image occupied by the input image is reduced, it is possible to suppress the effect of color cast in the input image from appearing in the output image.

The image processing of this tenth embodiment can also be realized by a software process that uses a CPU and DSP.

Eleventh Embodiment

Figure 41:
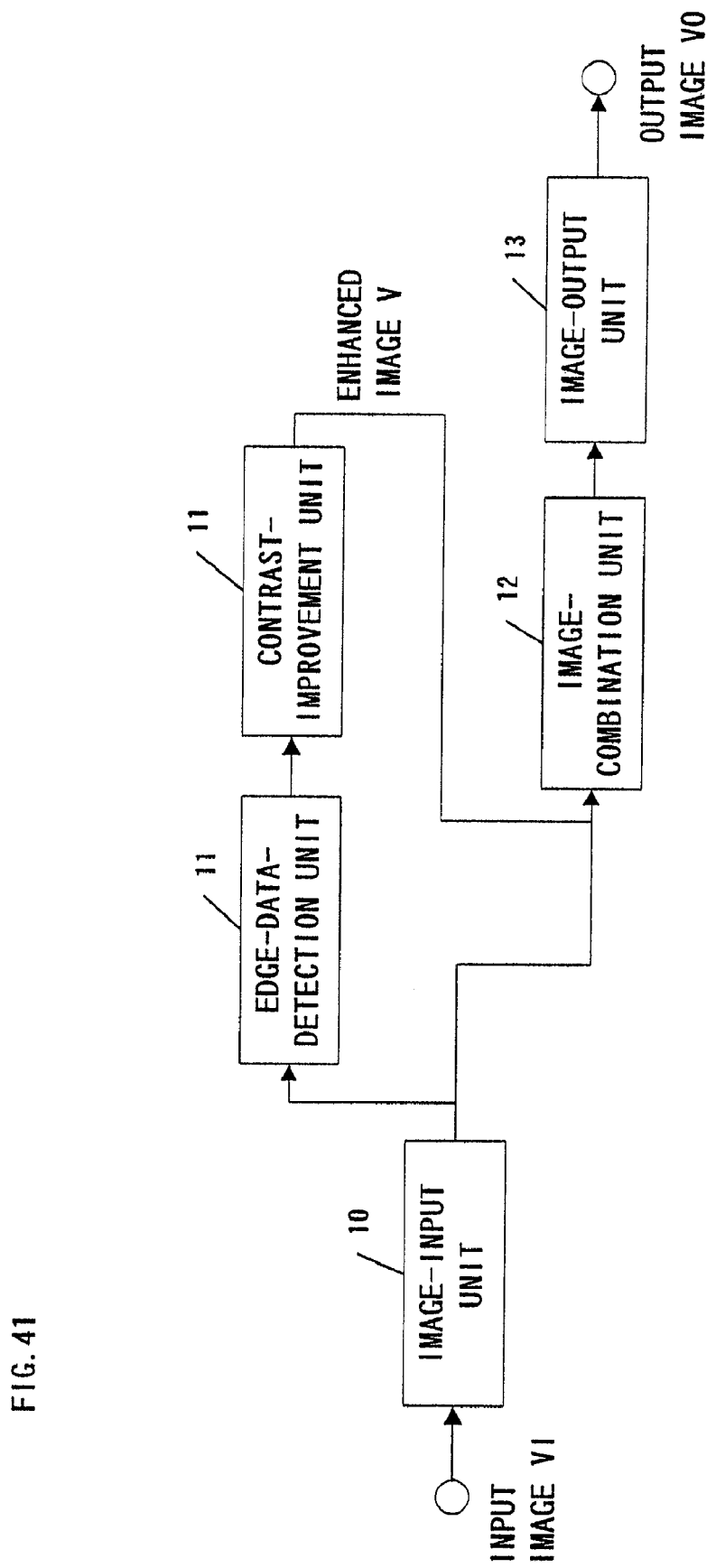
FIG. 41 is a block diagram showing the overall construction of the image processing apparatus of an eleventh embodiment of the invention.

As shown in FIG. 41, the image processing apparatus of an eleventh embodiment of the invention is similar to the image processing apparatus of the ninth embodiment in that it comprises an edge data detection unit 14, however, the edge data found by that unit is used by the contrast improvement unit 11 instead of the image combination unit 12.

Figure 42:
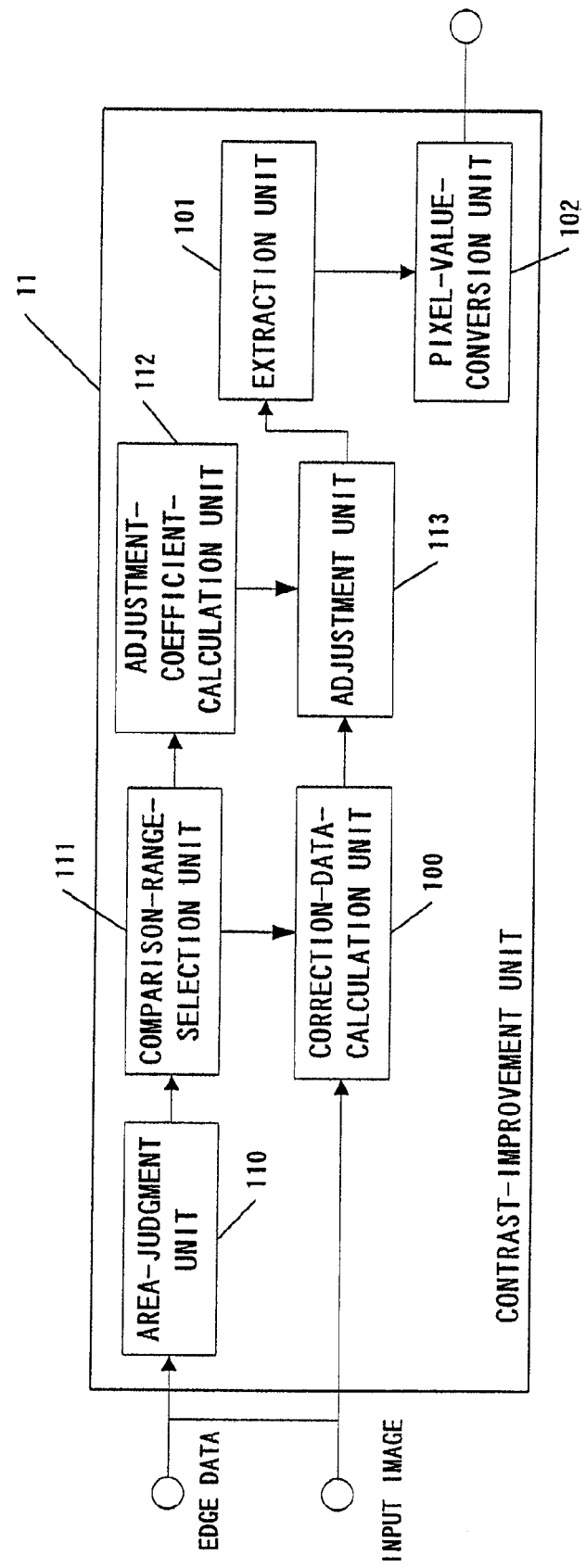
FIG. 42 is a block diagram showing the construction of the contrast improvement unit of the eleventh embodiment.

Also, as shown in FIG. 42, the contrast improvement unit 11 comprises a correction data calculation unit 100, extraction unit 101 and pixel value conversion unit 102 as in the image processing apparatus of the first embodiment, and further comprises an area judgment unit 110, comparison range selection unit 111, adjustment coefficient calculation unit 112 and adjustment unit 113.

Figure 43:
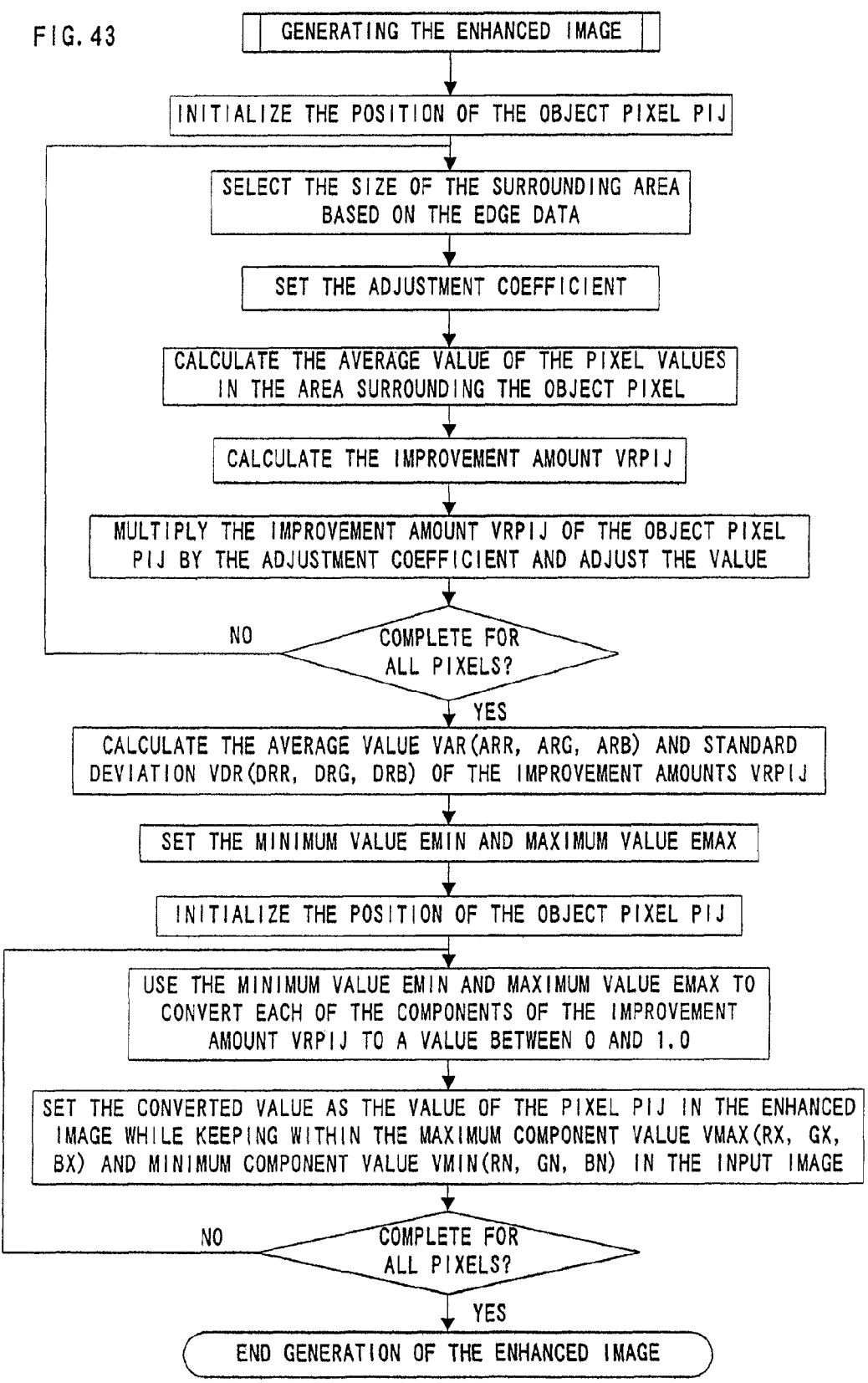
FIG. 43 is a flowchart explaining the contrast improvement process of the eleventh embodiment.

When edge data ed(i, j) is input from the edge data detection unit 14, the contrast improvement unit 11 performs a process of generating the enhanced image v according to the procedure shown in FIG. 43.

In that contrast improvement unit 11, the area judgment unit 110 initializes the position of the object pixel Pij, then determines the area in which that pixel exists based on the edge data ed(i, j) and brightness y(i, j) of the object pixel Pij. That area includes: shadow areas, such as area A1 in FIG. 34, where there is low brightness and smooth change; highlighted areas, such as area A2, where there is high brightness and smooth change; and areas near edges such as areas A3 and A4.

The comparison range selection unit 111 selects the size of the area corresponding to the surround view according to the judgment result. In the case where it is determined that the pixels exists in a shadow area with low brightness and smooth change or a highlighted area with high brightness and smooth change, the comparison range selection unit 111 selects a large size in order to suppress over enhancement or decreases in brightness compared with the input image. In the case where it is determined that the pixel is in an area near an edge, it selects a small size in order to enhance changes that are buried in the input image. In the case where it is unclear where the pixels exist, it selects an intermediate size.

Also, the adjustment coefficient calculation unit 112 sets an adjustment coefficient according to the judgment result of the area judgment unit 110 for adjusting the contrast improvement amount obtained by the correction data calculation unit 100. Of the areas described above, in areas with high brightness and smooth change, the contrast improvement amount VRPij tends to be near 1.0 and is expected to become lower than the value of the input image, so an adjustment coefficient k(i, j) is set in order to increase the contrast improvement amount. Here, the adjustment value k(i, j) is set to 1.2 in order to increase the contrast improvement amount by 20%. For areas where the brightness is low and there is smooth change, the contrast improvement amount VRPij tends to be near 1.0 and is expected to be abruptly higher than the value of the input image, so an adjustment coefficient k(i, j) is set in order to decrease the contrast improvement amount. Here, the adjustment value k(i, j) is set to 0.8 in order to decrease the contrast improvement amount by 20%. For areas near edges, the adjustment coefficient k(i, j) will be set to 1.0.

After the adjustment coefficient k(i, j) is set by the adjustment coefficient calculation unit 112, and the contrast improvement amount VRPij is found by the correction data calculation unit 100, the adjustment unit 113 multiplies each component of the contrast improvement amount VRPij by the corresponding adjustment coefficient k(i, j) to adjust the contrast improvement amount VRPij.

After repeating this series of processes and adjusting the contrast improvement value VRPij for each pixel, the extraction unit 101 and pixel value conversion unit 102 perform the same procedure as in the first embodiment.

By adjusting the contrast improvement amount in this way, it is possible to prevent the brightness of highlighted areas in the enhanced image from becoming less than that of the input image and to prevent excessive enhancement in shadow areas. Therefore, as in the tenth embodiment, it is possible to more easily combine images. Furthermore, since the percentage of the output image that the input image occupies becomes smaller, it is possible to prevent the bad influence of color cast of the input image from appearing in the output image.

In the case of combining images in the same way as in the ninth embodiment, the image combination unit 12 as well as the contrast improvement unit 11 can use the edge data found by the edge data detection unit 14.

Figure 44:
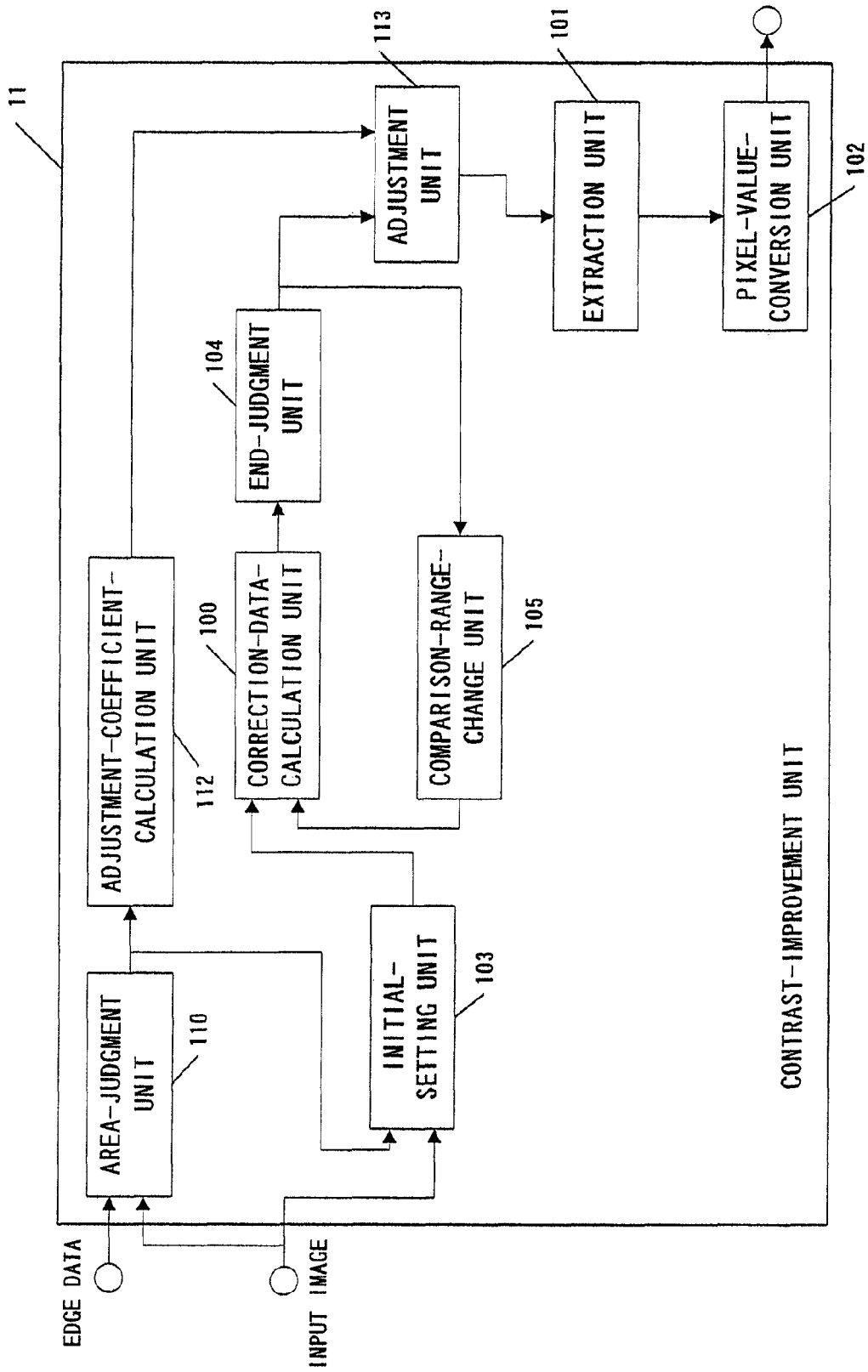
FIG. 44 is a block diagram showing another example of the contrast improvement unit of the eleventh embodiment.

Also, as shown in FIG. 44, it is possible to combine the construction of the contrast improvement unit 11 of the image processing apparatus of this embodiment with the construction of the contrast improvement unit 11 of the second embodiment.

In this case, the adjustment unit 113 adjusts the contrast improvement amount calculated using the weighted average APij k for a plurality of sized areas ck.

By doing this, it is possible to reduce the effects of misjudged size selection. Also, when calculating the contrast improvement amount for just values near the pixels in the edge area, there is a possibility that the color white will stick out due to excessive enhancement, however it is possible to decrease the amount that it sticks out near the edges. Furthermore, when the selected size is too small for the size of the shadow, the value of the object pixel will approach the value of the surrounding pixels and there is a possibility that enhancement will be insufficient, however it is possible to reduce that possibility.

Also, the image processing of this eleventh embodiment can be realized by a software process that uses a CPU and DSP.

Twelfth Embodiment

Figure 45:
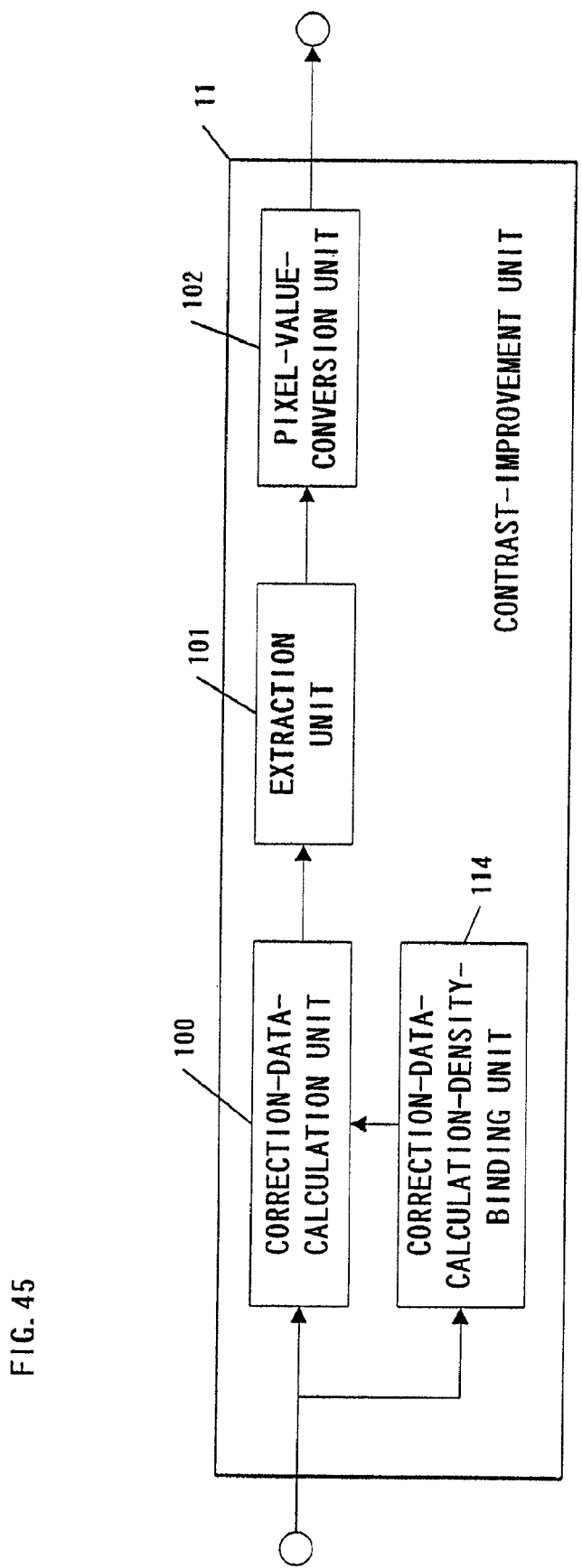
FIG. 45 is a block diagram showing the construction of the contrast improvement unit of a twelfth embodiment of the invention.

In the image processing apparatus of a twelfth embodiment of the invention, the construction of part of the contrast improvement unit 11 is different than that in the first embodiment. As shown in FIG. 45, in addition to a correction data calculation unit 100, extraction unit 101 and pixel value conversion unit 102, the contrast improvement unit 11 comprises a correction data calculation density binding unit 114.

The correction data calculation standard binding unit 114 binds values of the pixels in the area corresponding to the surround view surrounding the object pixel. Also, the correction data calculation unit 100 uses the value of the bound pixels to find the contrast improvement amount for the object pixel.

Figure 46:
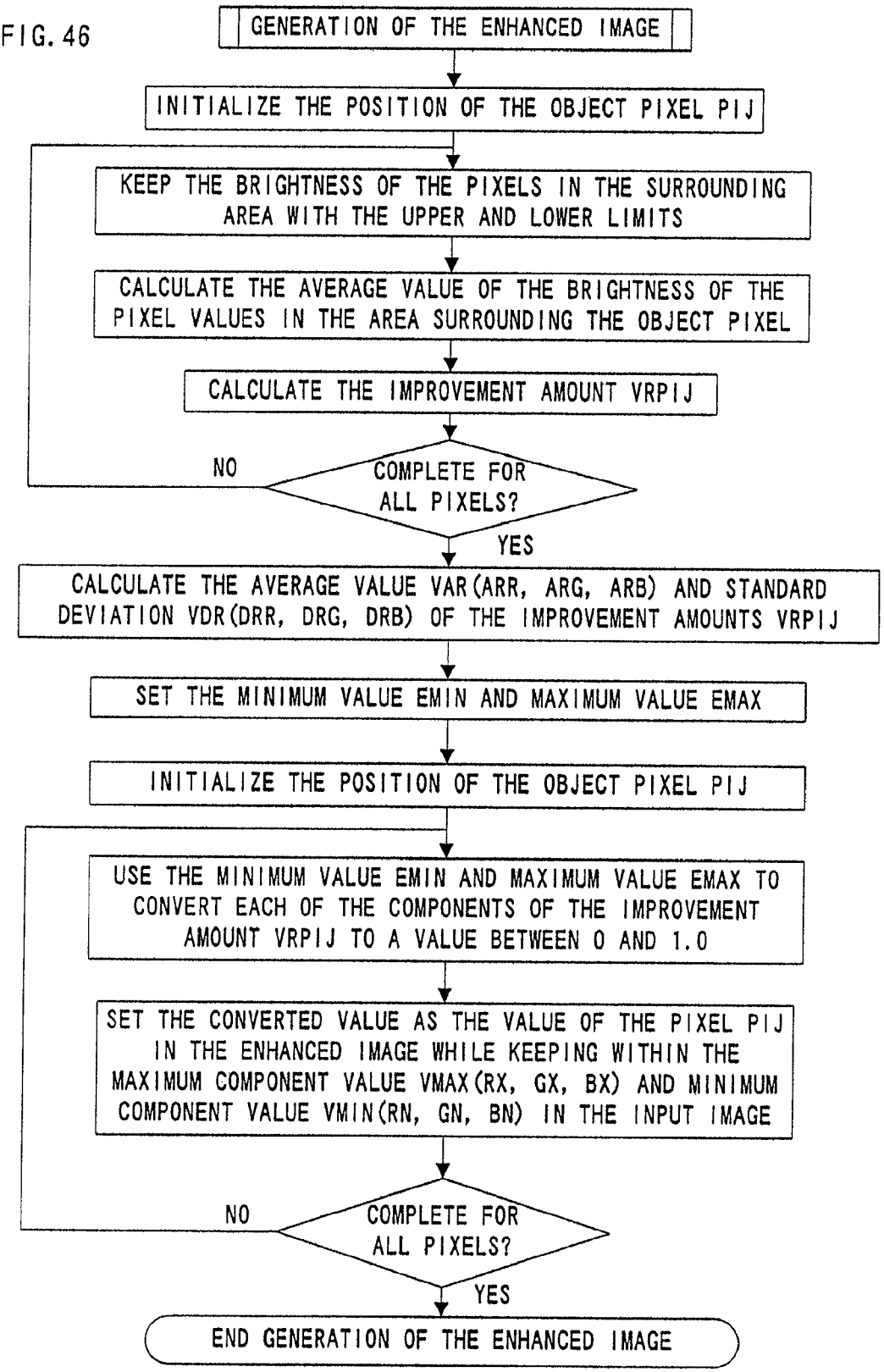
FIG. 46 is a flowchart explaining the contrast improvement process of the twelfth embodiment.

As shown in FIG. 46, the procedure of this contrast improvement process is nearly the same as that of the ninth embodiment, however, it differs in that the contrast improvement amount is found with the upper and lower limits of the values of the pixels in the area corresponding to the surround view of the object pixel Pij being controlled.

Figure 47:
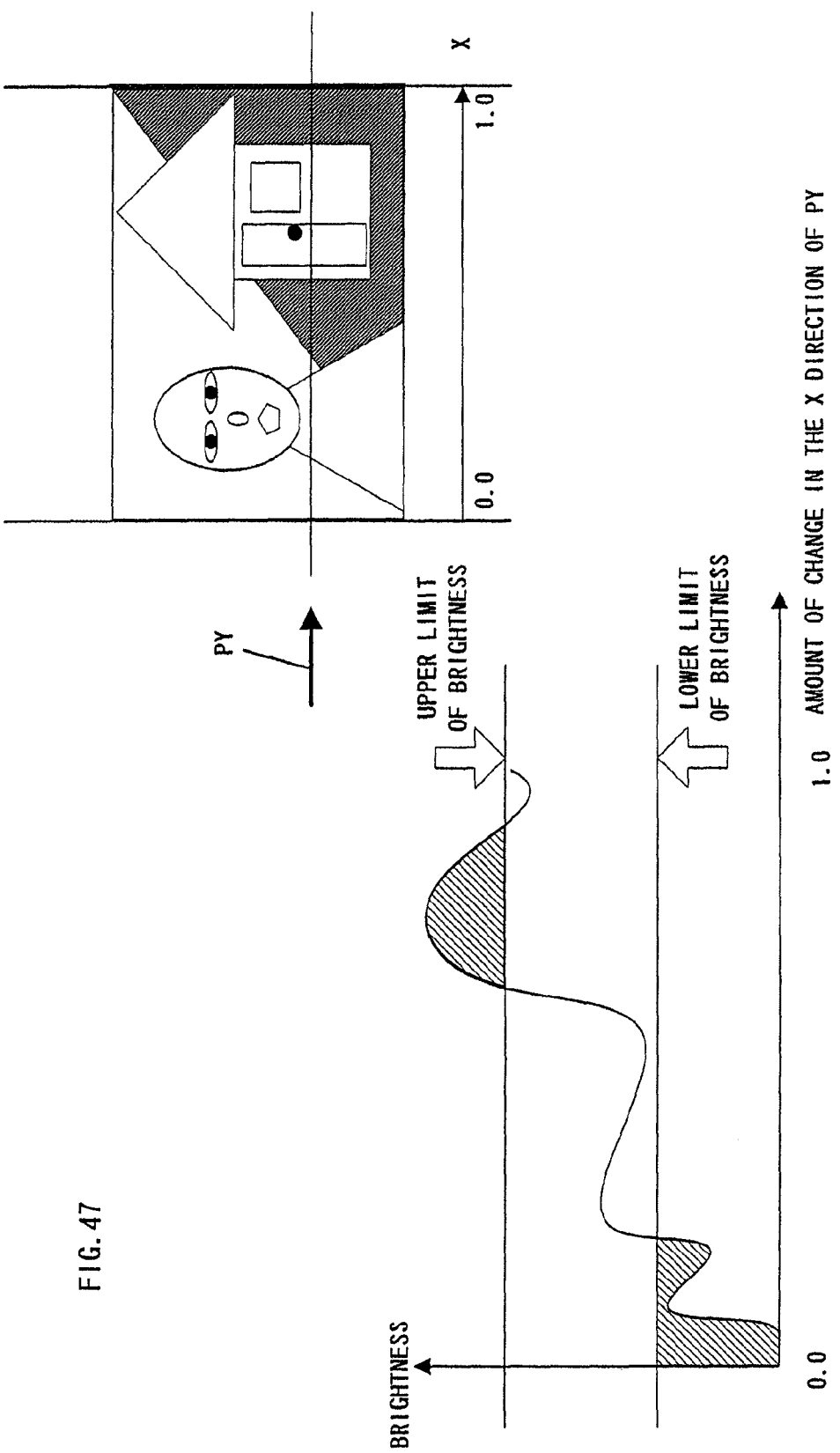
FIG. 47 is a diagram explaining the binding process.

Here, the case of calculating the contrast improvement amount VRPij (Rr (i, j), Rg (i, j), Rb (i, j)) using Equations 15 and 16 will be considered. In that case, as shown in FIG. 47, the correction data calculation density binding unit 114 applies a lower limit thLow_y and upper limit thigh_y to the brightness y(i, j) of the pixels in the area corresponding to the surround view of the object pixel Pij. When calculating the contrast improvement amount, values that exceed the upper limit are handled as being the same as the upper limit, and values less than the lower limit are handled as being the same as the lower limit.

When finding the contrast improvement amount for pixels in uniformly large highlighted areas by controlling the upper limit of the brightness y(i, j) in this way, the average value Ay(i, j) is kept less than the brightness y(i, j) of the object pixel Pij. As a result, the contrast improvement amount VRPij becomes a value larger than 1.0, which is the value in the center. Therefore, the values of the enhanced image obtained by the pixel value conversion unit 102 become high.

On the other hand, when finding the contrast improvement amount for pixels in uniformly large shadow areas by controlling the lower limit of the brightness y(i, j), the average value Ay(i, j) increases more than the brightness y(i, j) of the object pixel Pij. As a result, the contrast improvement amount VRPij becomes a value smaller than 1.0, which is the value in the center. Therefore, the values of the enhanced image obtained by the pixel value conversion unit 102 become low values.

By intentionally suppressing or increasing the amount corresponding to the denominator when finding the contrast improvement amount in this way, the values of the pixels obtained from this contrast improvement amount can be controlled. In this way, it is possible to suppress decreases in the contrast improvement amount in uniformly large highlighted areas or sudden increases in the contrast improvement amount in uniformly large shadow areas somewhat by a very simple process.

Figure 48:
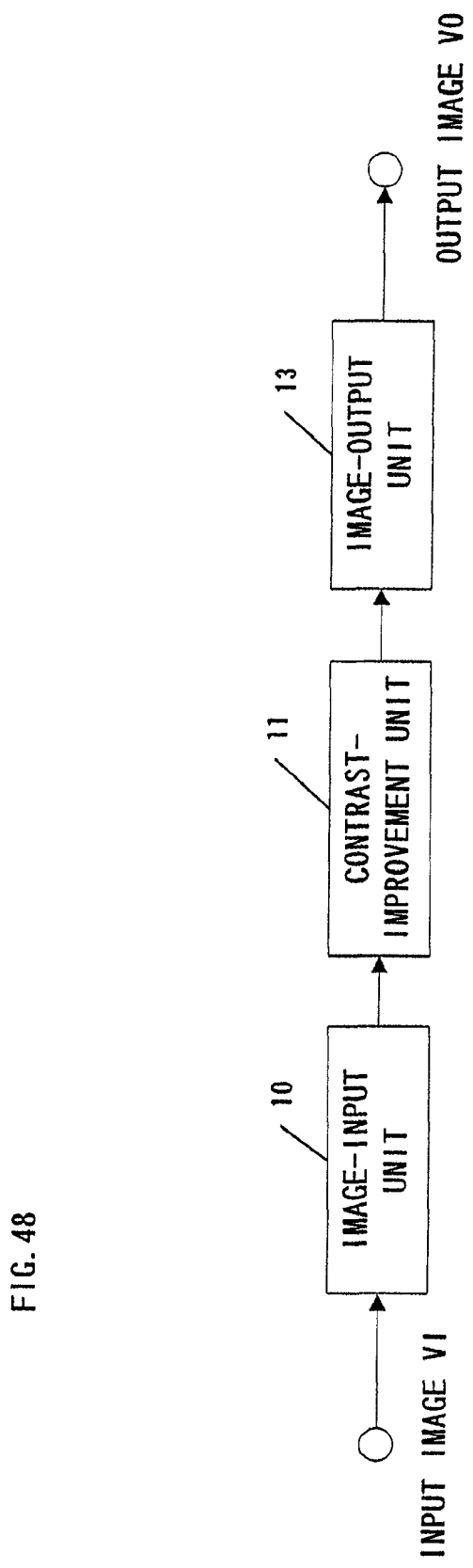
FIG. 48 is a block diagram showing one example of the overall construction of the image processing apparatus of the twelfth embodiment.

Therefore, as shown in FIG. 48, it is possible to output the enhanced image obtained by the contrast improvement unit 11 as is as the output image without having an image combination unit 12 in the image processing apparatus.

Of course, in order to more accurately suppress decreases in the contrast improvement amount in highlighted areas or sudden increases in the contrast improvement amount in shadow areas, it is possible to use an image combination unit 12 and to adaptively combine the input image and enhanced image.

In this embodiment, and example was explained that used Equations 15 and 16, however it is also possible to calculate the contrast improvement amount by using Equations 4 and 5. In this case, the upper and lower limits of the three components can be matched, however, in order that the balance of the finally obtained output image is not lost, it is preferred that upper and lower limits be set for each of the components.

Figure 49:
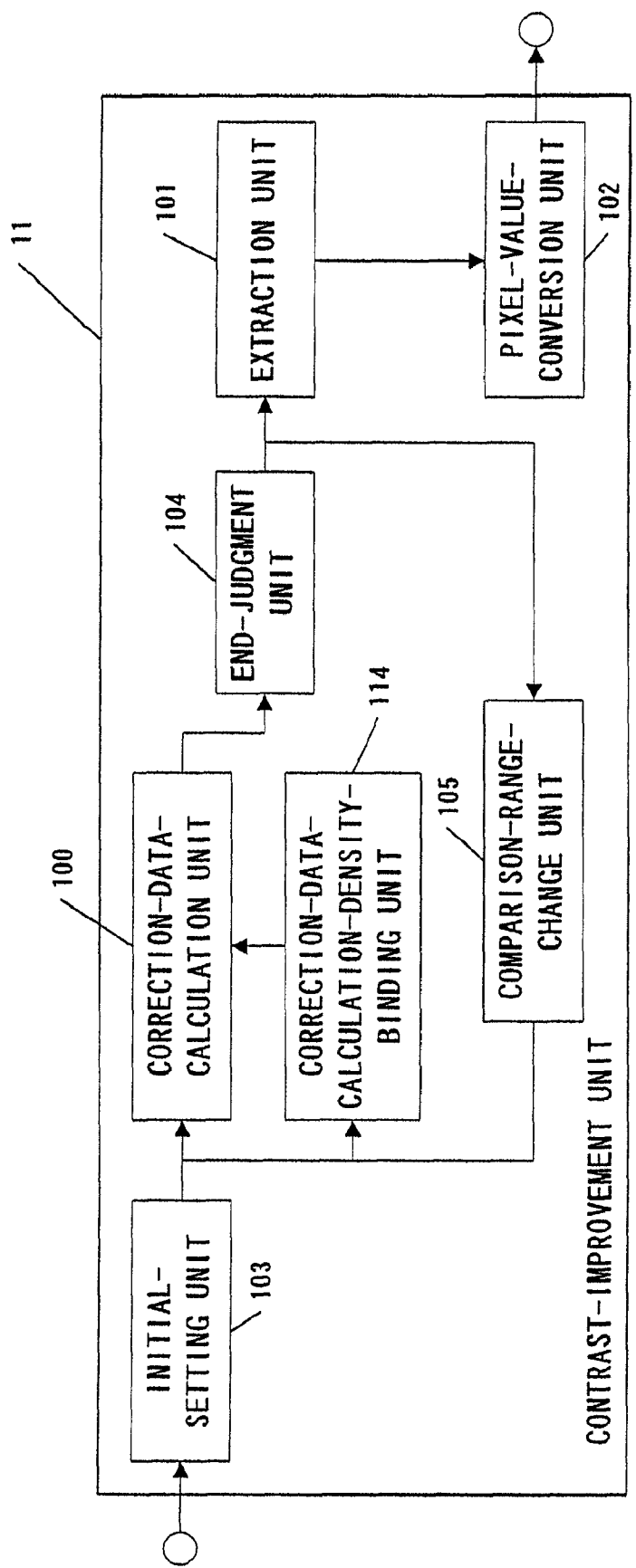
FIG. 49 is a block diagram showing another example of the contrast improvement unit of the twelfth embodiment.

Moreover, as shown in FIG. 49, it is possible to combine the construction of the contrast improvement unit 11 of the image processing apparatus of this embodiment with the construction of the contrast improvement apparatus 11 of the second embodiment.

Also, the image processing of this twelfth embodiment can be realized by a software process that uses a CPU and DSP.

Thirteenth Embodiment

Figure 50:
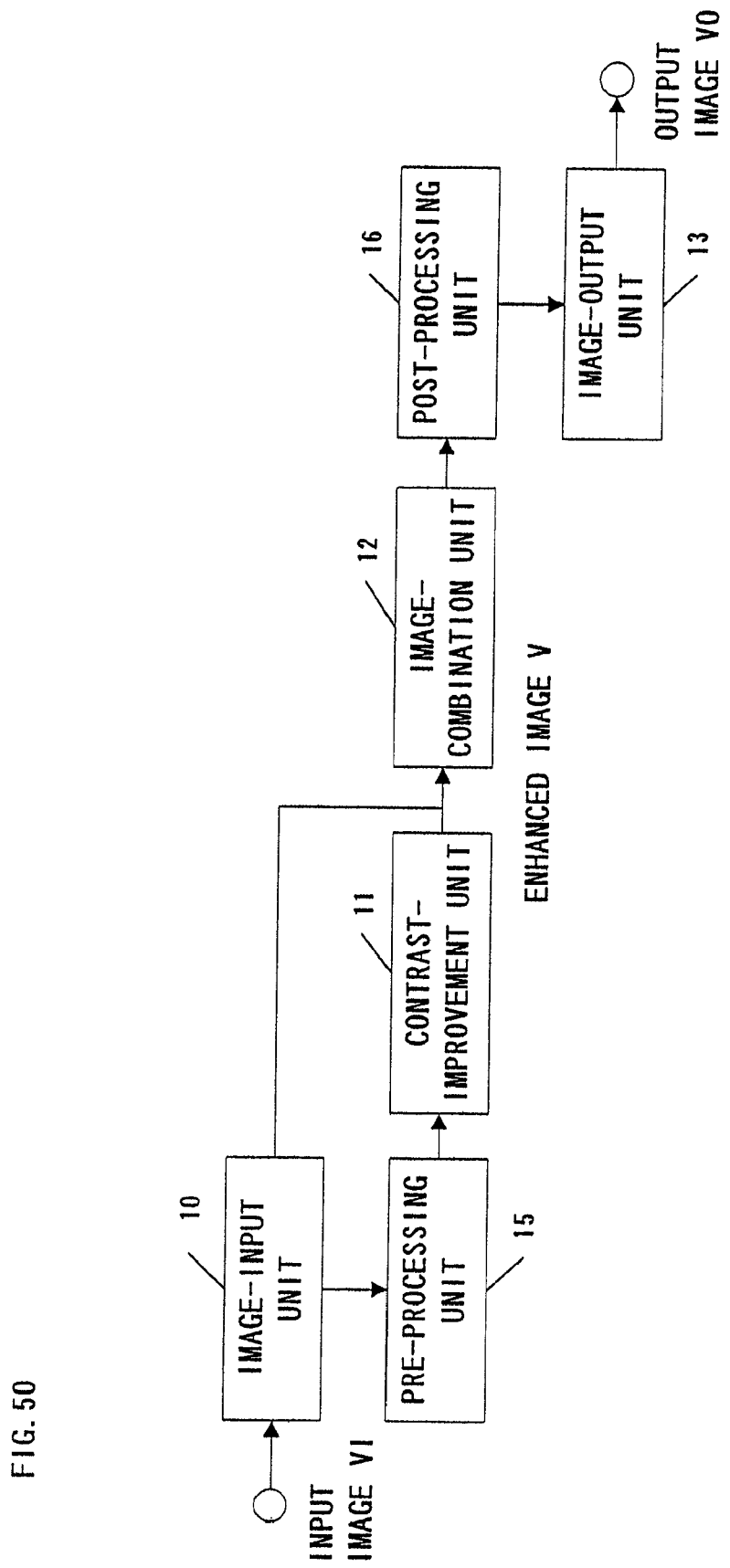
FIG. 50 is a block diagram showing the construction of the image processing apparatus of the thirteenth embodiment of the invention.

As shown in FIG. 50, in addition to an image input unit 10, image combination unit 12 and image output unit 13, the image processing apparatus of a thirteenth embodiment of the invention comprises a pre-processing unit 15 and a post-processing unit 16.

Figure 51:
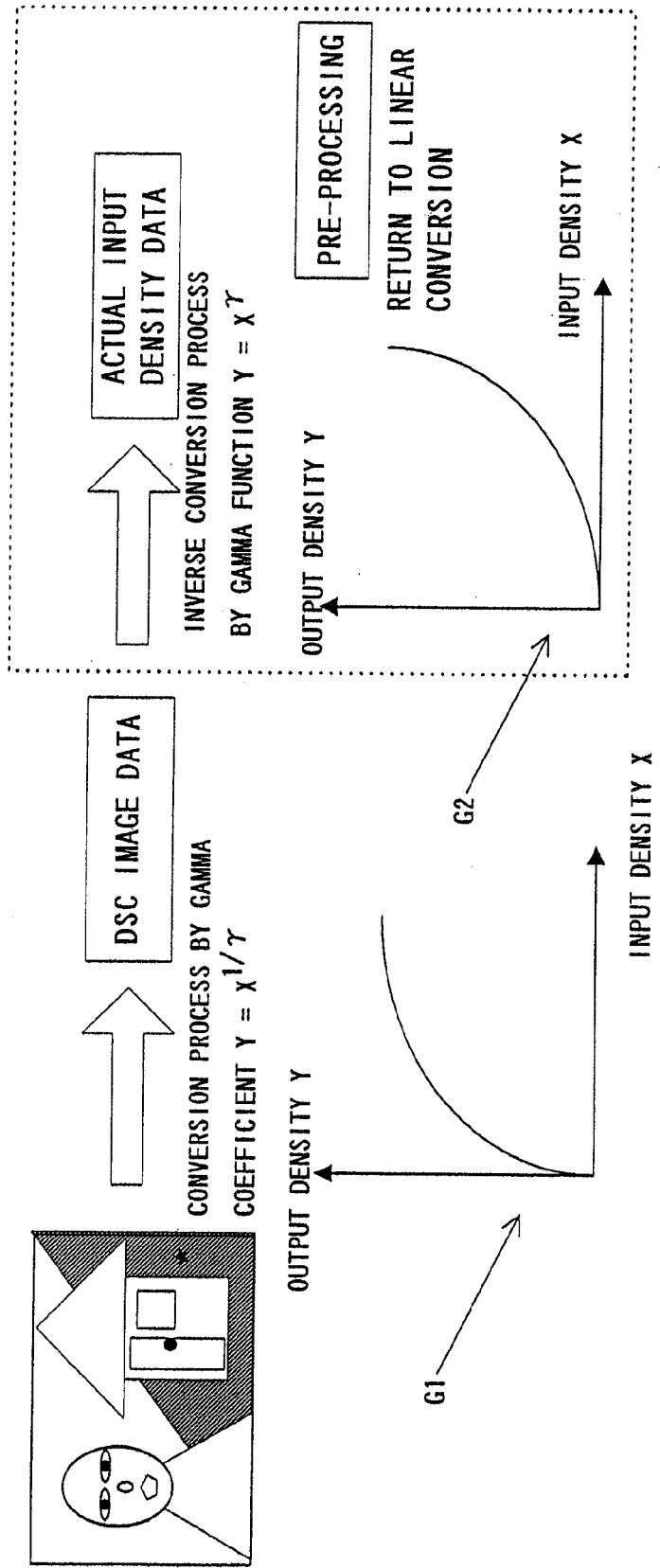
FIG. 51 is a schematic diagram showing an example of the pre-processing.

The pre-processing unit 15 performs pre-processing such as inverse gamma conversion of the image input from the image input unit 10. In recent years, images taken by a digital still camera (DSC) have increase as image data, which become the object of contrast improvement processing. When displaying the image data taken by a DSC on a monitor such as a personal computer, in order to make the input image clearer, a conversion process using a gamma function G1 that has an upwardly convex shape as shown in FIG. 51 is normally performed. In a normally used sRGB space, a gamma value of 2.2 is used for this gamma conversion. Even when outputting the image to printer, the image processing is executed for outputting the image on the assumption that this gamma function has been applied beforehand to the input image. In order to accurately extract image data obtained by a photographic element such as a CCD, it is necessary to perform a conversion process using an inverse gamma function to restore the effect of $\gamma=2.2$. In this case, the pre-processing unit 15 performs inverse gamma conversion using a function G2 that has a downward face convex shape.

The contrast improvement unit 11 performs the contrast improvement process on the image from the pre-processing unit 15 instead of the image from the image input unit 10.

Figure 52:
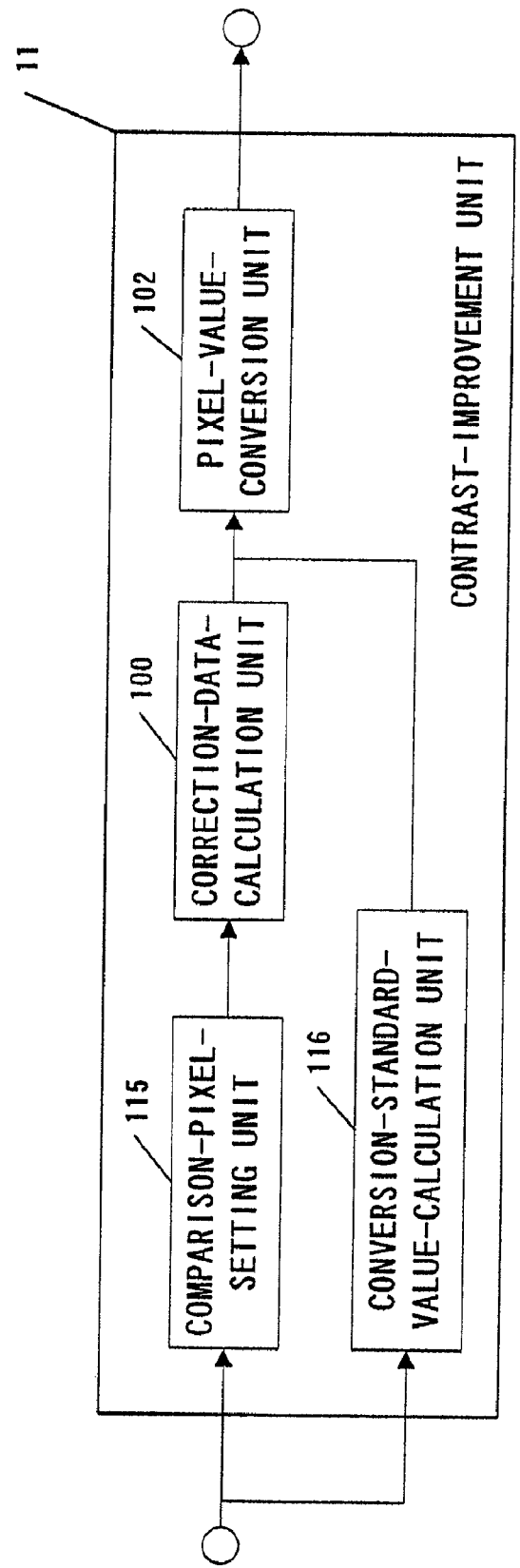
FIG. 52 is a diagram showing the construction of the contrast improvement unit of the thirteenth embodiment.

In this embodiment, as shown in FIG. 52, in additions to the correction data calculation unit 100 and pixel value conversion unit 102, the contrast improvement unit 11 comprises a comparison pixel setting unit 115 and conversion standard value calculation unit 116, but does not comprise an extraction unit 101.

Figure 53:
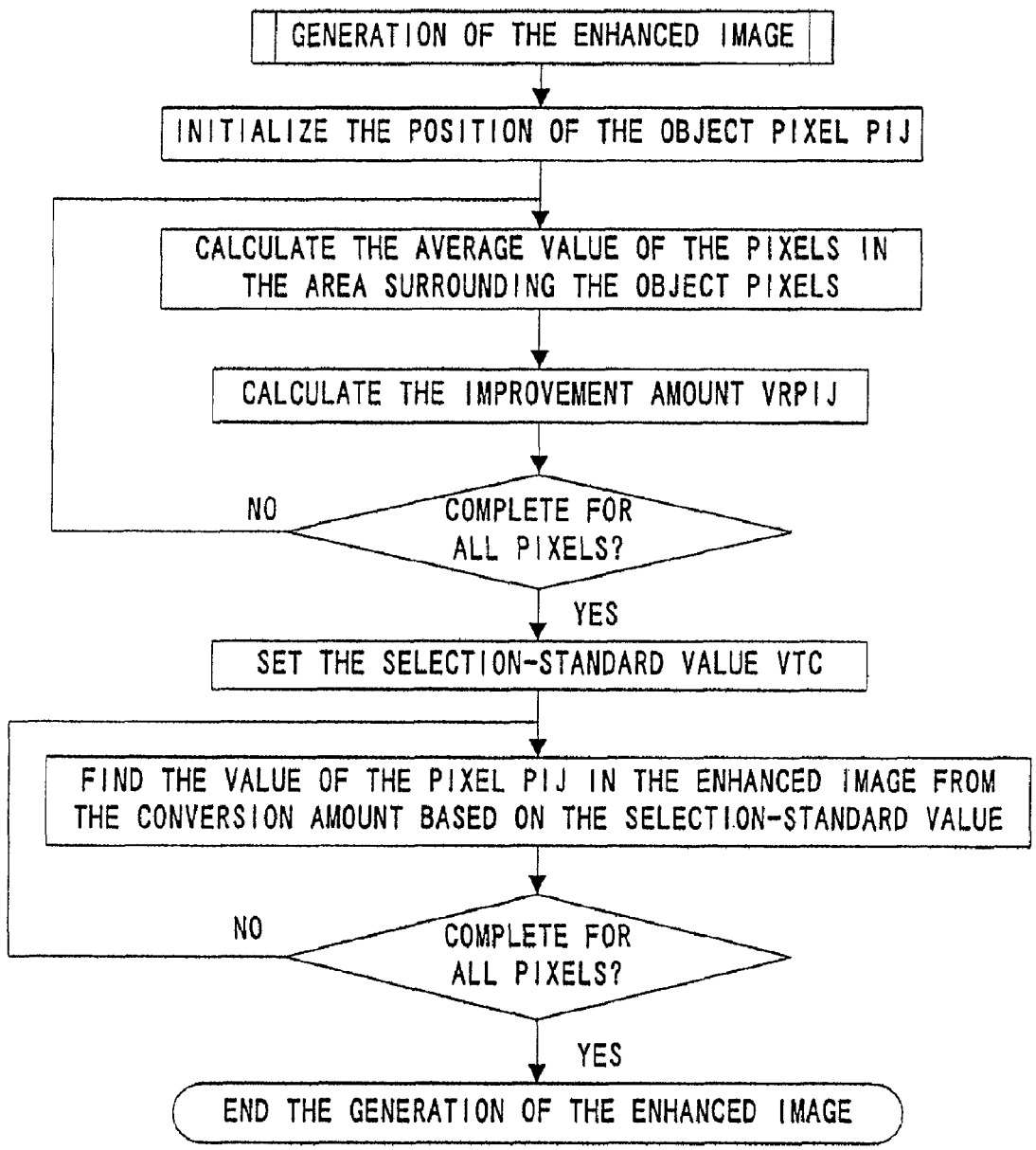
FIG. 53 is a flowchart explaining the contrast improvement process of the thirteenth embodiment.

As shown in FIG. 53, the comparison pixel setting unit 115 initializes the position of the object pixel Pij, and selects comparison pixels from among the pixels in the area corresponding to the surround view of the object pixel to be used in the calculation of the contrast improvement amount VRPij.

Figure 54:
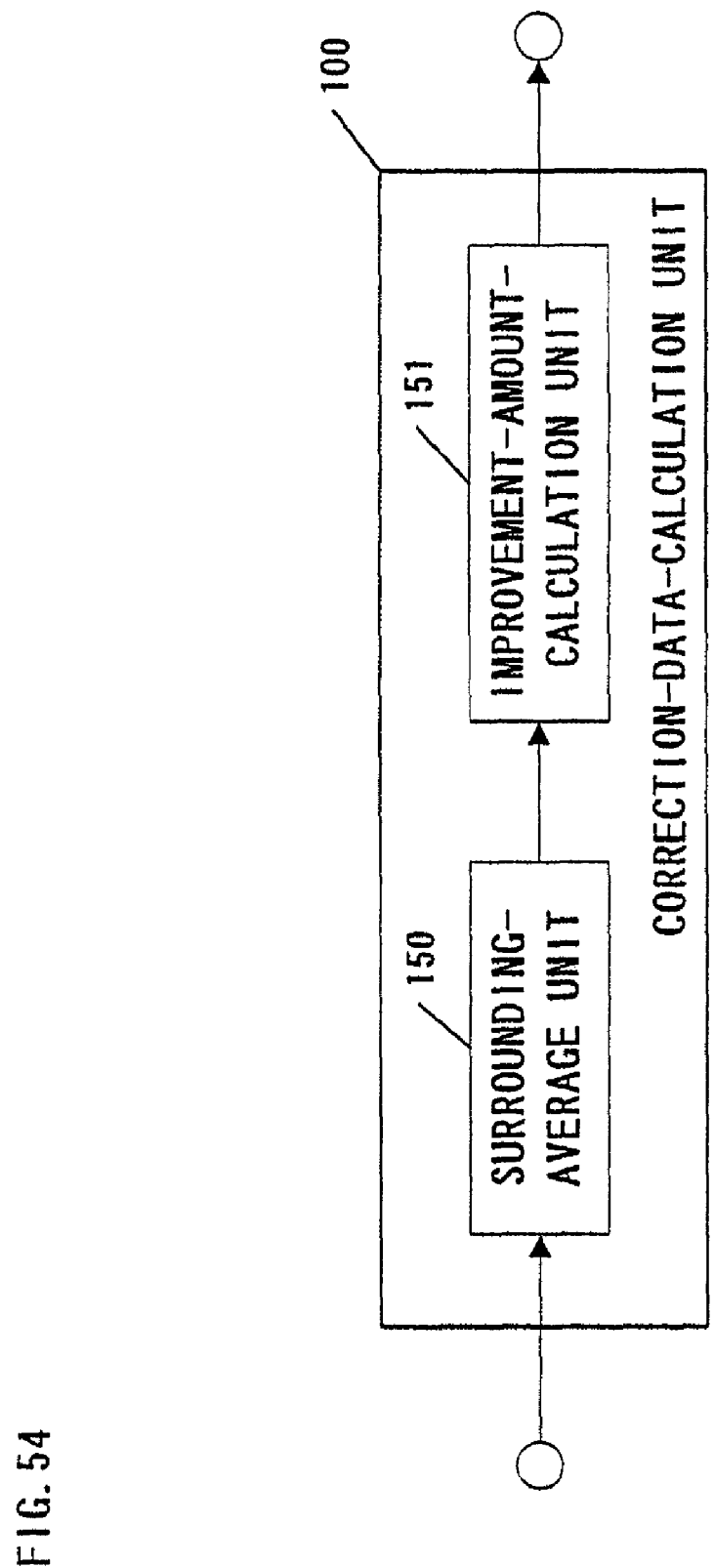
FIG. 54 is a block diagram showing the construction of the correction data calculation unit of the thirteenth embodiment.

The correction data calculation unit 100 uses the values of the comparison pixels to find the contrast improvement amount VRPij. As shown in FIG. 54, the correction data calculation unit 100 comprises a surrounding average unit 150 and improvement amount calculation unit 151.

The surrounding average unit 150 finds the average value of the comparison pixels. The improvement amount calculation unit 151 calculates the contrast improvement amount from the average value that was found and the value of the object pixel Pij. Here, Equations 15 and 16 are used to calculate the contrast improvement amount instead of Equations 4 and 5.

After the contrast improvement amount has been found for each pixel, the conversion standard value calculation unit 116 finds the conversion standard value VTc (trc(i, j), tgc(i, j), tbc(i, j)) for converting the contrast improvement amount VRPij (Rr(i, j), Rg(i, j), Rb(i, j)) to the value of the pixel of the enhanced image v.

The pixel value conversion unit 102 converts the contrast improvement amount VRPij to the value of the pixel of the enhanced image v based on the found conversion standard value VTc.

In this embodiment, the contrast improvement amount VRPij that is normalized in the range 0.0 to 1.0 is multiplied by the conversion standard value VTc, to convert the data to real number data within the range 0.0 to 1.0. Also, this real number data is converted to integer data that is expressed by the 8 bits 0 to 255, for example.

The conversion standard value VTc can be given by Equations 17, for example, using the brightness y(i, j) of the object pixel Pij in the pre-processed input image vi.

$$trc = Cen + Dev \times (y(i, j) - Ycen)$$

$$trc = Cen + Dev \times (y(i, j) - Ycen)$$

$$trc = Cen + Dev \times (y(i, j) - Ycen) \quad \text{(Eqs. 17)}$$

Here, Cen is the center value of the conversion standard value VTc, Dev is the amount of displacement with respect to the brightness, and Ycen is the center value of the brightness. Here, VTc=0.5, Dev=0.2 and Ycen=0.5 will be used. Ycen can also be the average brightness value.

The reason for giving a conversion standard value VTc such as that from Equation 17 is to convert to a higher value the higher the brightness is, and convert to a lower value the lower the brightness is. The conversion standard values VTc can be uniformly set to the average value, VTc=(0.5, 0.5, 0.5), however, by controlling the conversion standard value VTc as described above, it is possible to suppress sudden changes from the input image. It is also possible to suppress sudden increases in brightness of shadow areas.

However, when the slope in Equations 17 becomes too large, contrast improvement in dark areas is suppressed, and the original feature of enhancing and improving the contrast in areas where there is a difference in change is lost.

Also, in this embodiment, values are converted to the desired pixel values after first converting them to real number data in the range 0.0 to 1.0. Therefore, it is preferred that the conversion standard value VTc be defined such that the obtained value for the conversion standard value VTc is in the range 0.0 to 1.0.

Furthermore, in this example, the conversion standard value VTc is given using Equations 17, however it is not limited to this. There is no need for a linear relationship as in Equations 17, and it is also possible to use a non linear relationship. Here, a process of multiplying the contrast improvement amount VRPij that is normalized in the range 0.0 to 1.0 by the conversion standard value VTc was performed, however, it is also possible to set the conversion standard value VTc such that takes values in the range 0 to 255 such as Cen=140, Dev=0.2, Ycen=128, without normalizing the contrast improvement amount VRPij. When doing this, the brightness y(i, j) is defined such that it takes a value in the range 0 to 255, and a process of keeping the value obtained after multiplication by the conversion standard value VTc within the range 0 to 255 is necessary.

Figure 55:
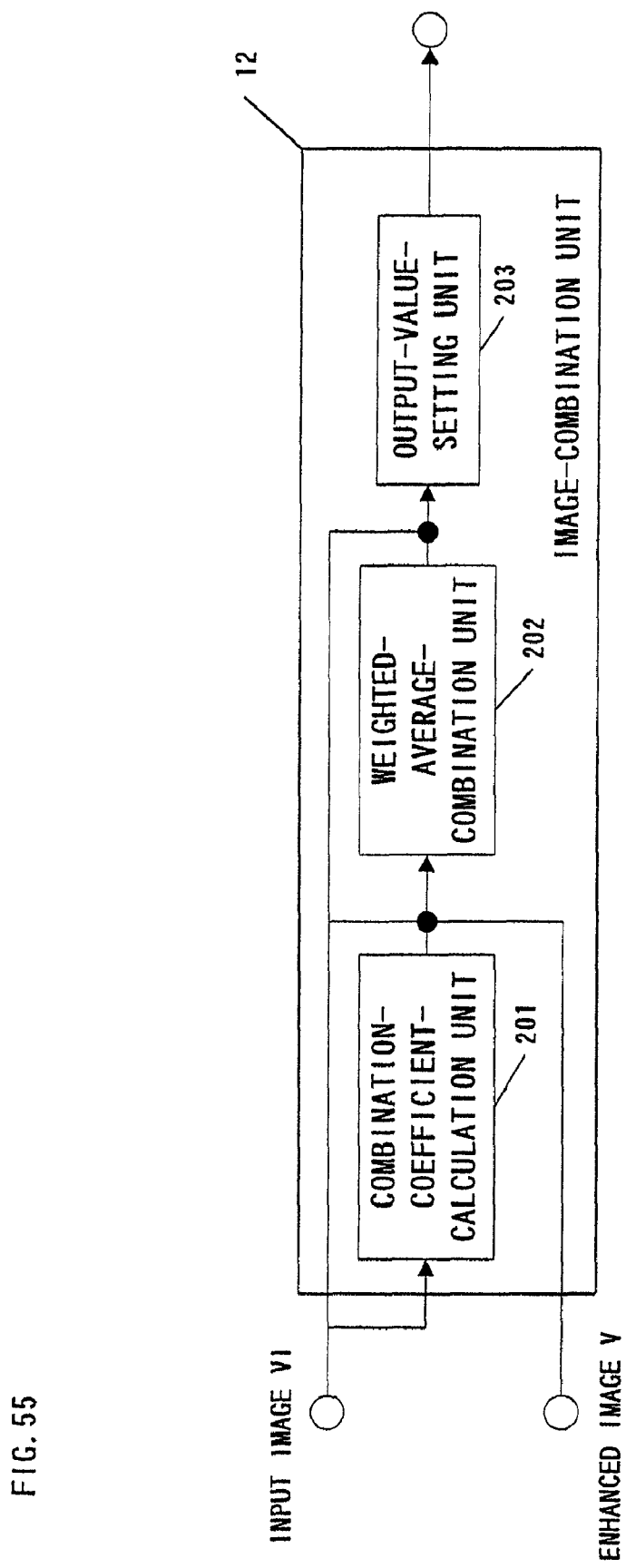
FIG. 55 is a block diagram showing the construction of the image combination unit of the thirteenth embodiment.

After the values of the enhanced image have been found for all pixels, the image combination unit 12 adaptively combines the obtained enhanced image and the input image in the same way as was done in the first and ninth embodiments, for example. Here, as shown in FIG. 55, the image combination unit 12 comprises a combination coefficient calculation unit 201, weighted average combination unit 202 and output value setting unit 203.

The combination coefficient w1 for the enhanced image is given by Equation 18 below using the thresholds TH and THComb, and the combination coefficient w0 for the input image is given as w0=1.0−w1.

$$w1(i, j)=\exp(-y(i, j)^2/TH^2)$$

where $zz=wy(i, j)/y(i, j)$ $$ww=THComb/(zz+THComb)$$

$$\text{if } (w1(i, j) > ww) w1(i, j) = ww \qquad \text{(Eq. 18)}$$

This Equation 18 gives priority of the values of the enhanced image over the input image in dark areas. When the improvement is sudden based on the ratio between the brightness of the input image and the brightness of the enhanced image, the noise enhancement in dark areas is suppressed by suppressing the combination coefficient w1.

Also, w1(i, j) can be defined as in Equation 19 below.

$$w1(i, j)=ww\cdot\exp(-y(i, j)^2/TH^2) \qquad \text{(Eq. 19)}$$

In this case, there is a possibility that the w1(i, j) of the enhanced image in dark areas will be suppressed, however, since w1(i, j) changes continuously, it is possible to suppress sudden change.

In the case of giving the combination coefficient using Equation 18, overhead in the processing time by the exponential function is possible, however, by putting the exponent function according to preset precision in a table, the overhead due to that processing time can be suppressed by referencing that table.

Figure 56:
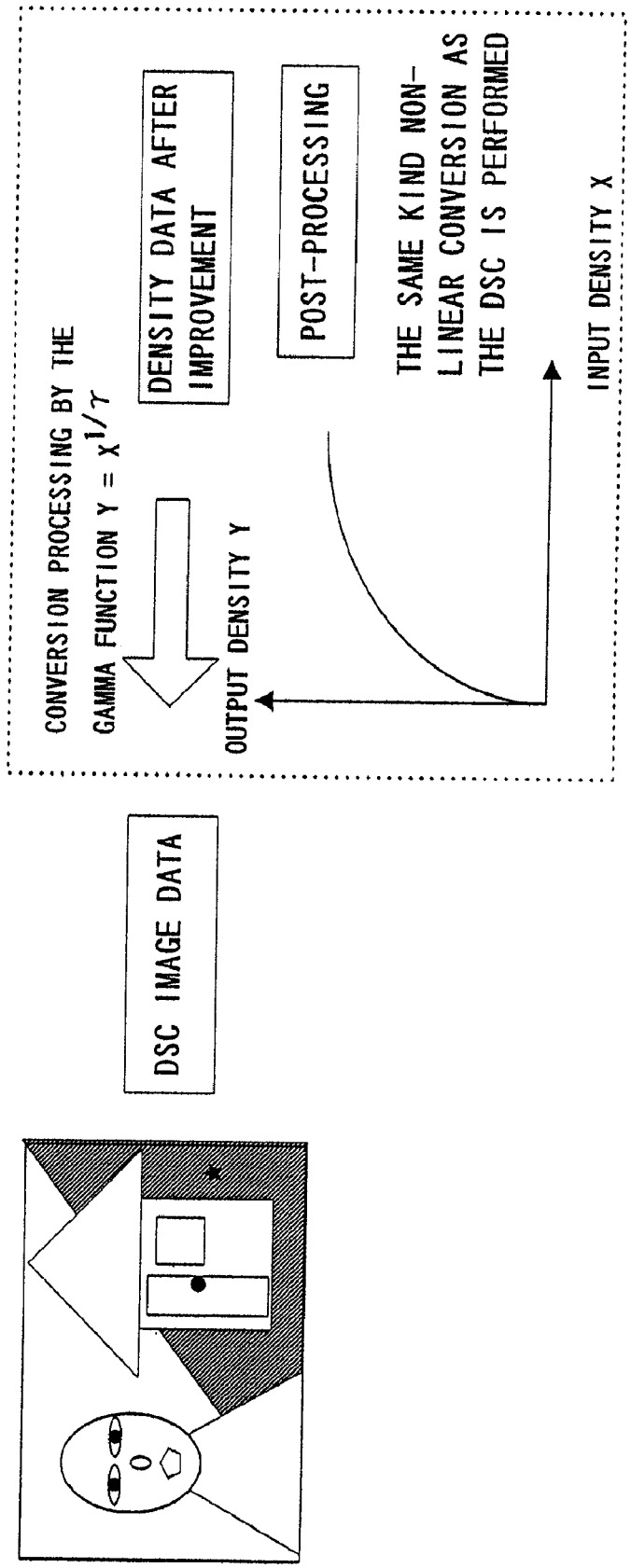
FIG. 56 is a schematic diagram of the post-processing.

As shown in FIG. 56, after obtaining a combined image using the combination coefficients w0 and w1, the post-processing unit 16 performs post-processing on the combined image such as the gamma conversion that was applied originally to the input image.

After the post-processing unit 16 performs this kind of post-processing, the image output unit 13 generates the final output image to be output to a device such as a printer or display from that image.

In the image processing of this embodiment, it is possible to easily and accurately perform contrast improvement in which noise enhancement due to decreases in brightness in highlighted areas and sudden increases in brightness in shadow areas are suppressed. Furthermore, since the extraction process by the extraction unit 101 is not needed, it is possible to reduce the amount of processing.

It is possible to combine the construction of the contrast improvement unit 11 of this embodiment with the construction of the contrast improvement apparatus 11 of the second embodiment.

Moreover, the image processing of this thirteenth embodiment can also be realized by a software process that uses a CPU and DSP.

Fourteenth Embodiment

Figure 57:
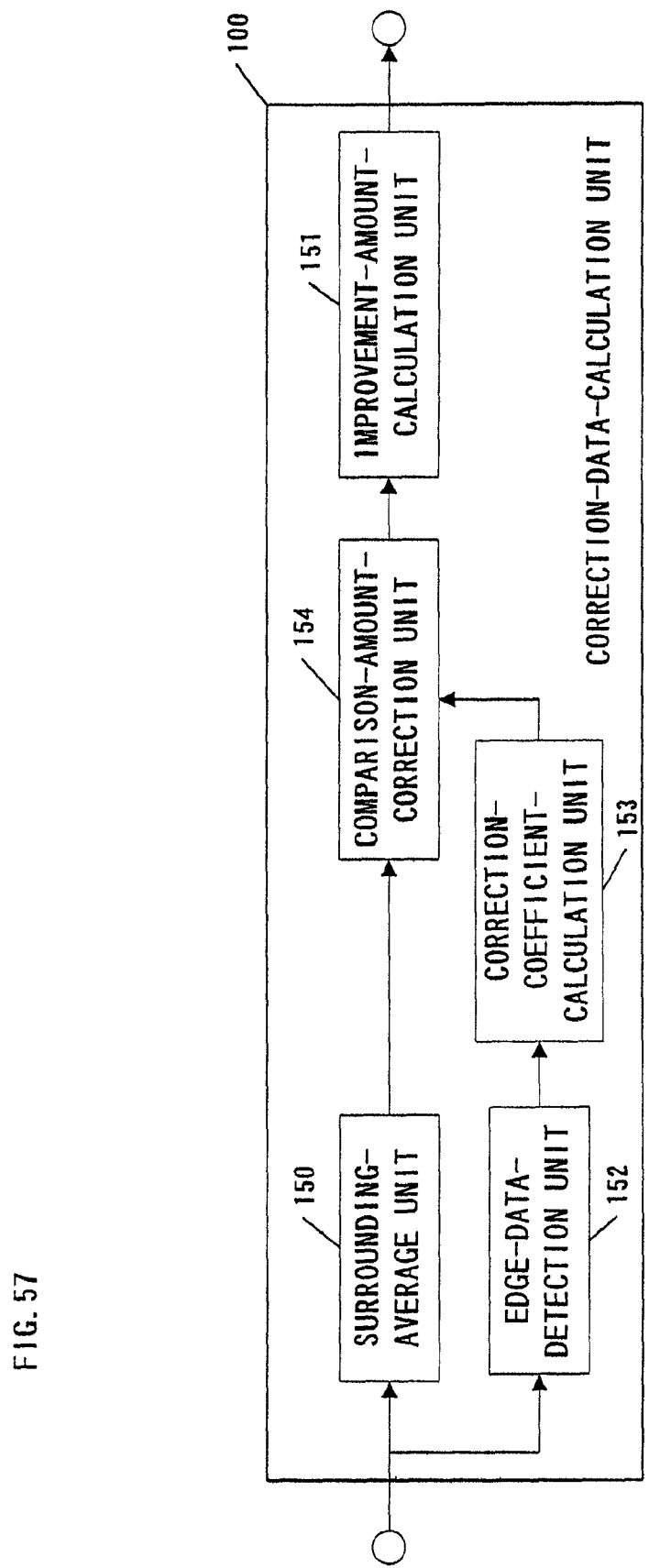
FIG. 57 is a block diagram showing the construction of the correction data calculation unit of a fourteenth embodiment of the invention.

The image processing apparatus of a fourteenth embodiment of the invention has the same construction as the image processing apparatus of the thirteenth embodiment, however, as shown in FIG. 57, in addition to the surrounding average unit 150 and improvement amount calculation unit 151, the correction data calculation unit 100 comprises an edge data detection unit 152, correction coefficient calculation unit 153 and comparison amount correction unit 154.

Figure 58:
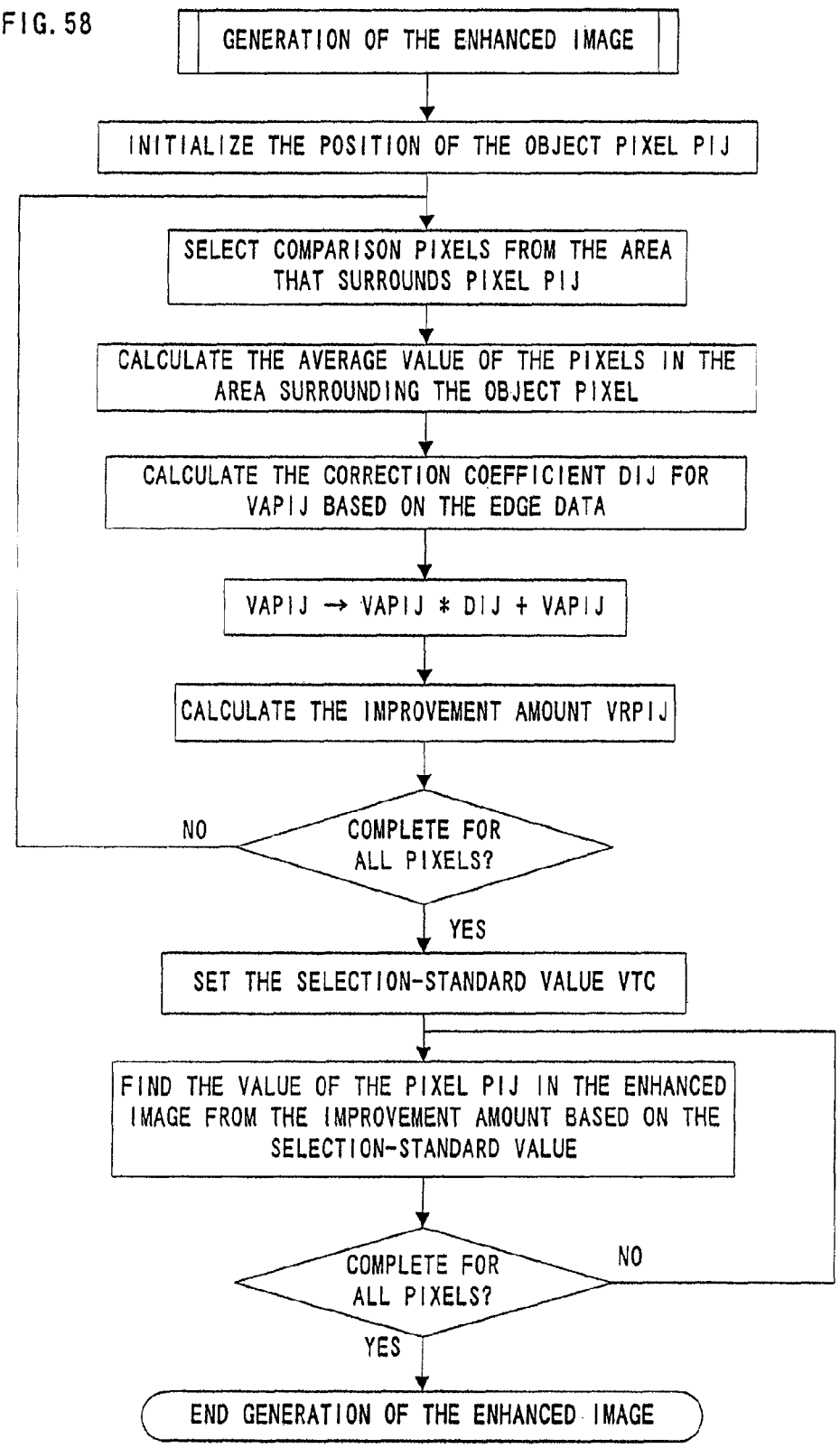
FIG. 58 is a flowchart explaining the contrast improvement process of the fourteenth embodiment.

As shown in FIG. 58, in this image processing apparatus, after the pre-processed input image is input to the contrast improvement unit 11, the comparison pixel setting unit 115 of the correction data calculation unit 100 initializes the position of the object pixel Pij and then selects comparison pixels.

The surrounding average unit 150 calculates the weighted average value VAPij (Ar(i, j), Ag(i, j), Ab(i, j)) of the comparison pixels as in the thirteenth embodiment.

The edge data detection unit 152 finds edge data ed(i, j) of the brightness y(i, j) of the object pixel Pij.

The correction coefficient calculation unit 153 finds a correction coefficient VDAPij (dAr(i, j), dAg(i, j), dAb(i, j)) for correcting the average value VAPij based on the edge data ed(i, j).

The comparison amount correction unit 154 corrects the average value VAPij based on the correction coefficient VDAPij. Here, average value VAPij is multiplied by the correction coefficient VDAPij for each of the components. Also, the improvement amount calculation unit 151 uses the corrected average value VAPij to find the contrast improvement amount VRPij.

The correction coefficient can be given according to Equation 20 using the average value ave_ed of the edge data ed(i, j) for each pixel of the pre-processed input image.

$$dAr=dAg=dAb=dAcen-dAdev\times(ed(i, j)-ave\_ed)$$

$$Rr(i, j)=r(i, j)/dAr\times Ar(i, j)$$

$$Rg(i, j)=g(i, j)/dAg\times Ag(i, j)$$

$$Rb(i, j)=b(i, j)/dAb\times Ab(i, j) \qquad \text{[Eqs. 20]}$$

Here, dAcen is the standard value of the correction coefficient, and dAdev is amount of change of the correction coefficient, where dAcen=1.0 and dAdev=0.3, for example. Care must be taken that dAr, dAg and dAb do not become negative.

In this embodiment, a correction coefficient is used in this way to control the average value VAPij of the surrounding. That is, near the edges, the correction coefficient becomes less than 1.0, and as a result the average value VAPij is affected by it and is reduced. Therefore, the contrast improvement amount VRPij that is calculated using the ratio of each component of the object pixel with respect to this average value VAPij becomes large near the edges, and by used the edge data other than for the average brightness difference with respect to the surroundings, it is possible to improve the sharpness in the combined image. On the other hand, in flat areas the correction coefficient becomes greater than 1.0, and as a result, the average value VAPij of the surroundings increases so the contrast improvement amount decreases.

In order to simplify the process, it is possible to set the average value ave_ed in Equation 20 to 0.5. Furthermore, the equation used for controlling the average value VAPij is not limited to this. It is not necessary to have a linear relationship as in Equation 20, and it is possible to have a non linear relationship.

Flatness is removed by controlling the average value VAPij, so it is also possible to set the conversion standard value VTc to a uniform center value Cen without being controlled. In the case where the conversion standard value VTc is controlled together with controlling the average value VAPij, there is a possibility of excessive enhancement near the edges, so increases in the correction coefficient of the average value VAPij is suppressed according to increases in the brightness by making dAdev smaller according to the brightness or the like.

In this way, the contrast in dark areas is improved while at the same time the sharpness of the combined image is somewhat preserved.

It is possible to combine the image processing of this embodiment with the image processing of the second embodiment.

Moreover, the image processing of this fourteenth embodiment can also be realized by a software process that uses a CPU and DSP.

Furthermore, the average value VAPij was controlled here by the edge amount, however, it is also possible to multiply the contrast improvement amount VRPij by a correction coefficient ttt that is defined by the edge amount as in Equations 21 below. Here, tcen can be set to 0.5 and tdev can be set to 0.3.

$$ttt=tcen+tdev\times(ed)(i,j)-ave\_ed$$

$$Ri'(i,j)=ttt\times Rr(i,j)$$

$$Rg'(i,j)=ttt\times Rg(i,j)$$

$$Rb'(i,j)=ttt\times Rb(i,j) \qquad \text{[Eqs. 21]}$$

Fifteenth Embodiment

Figure 59:
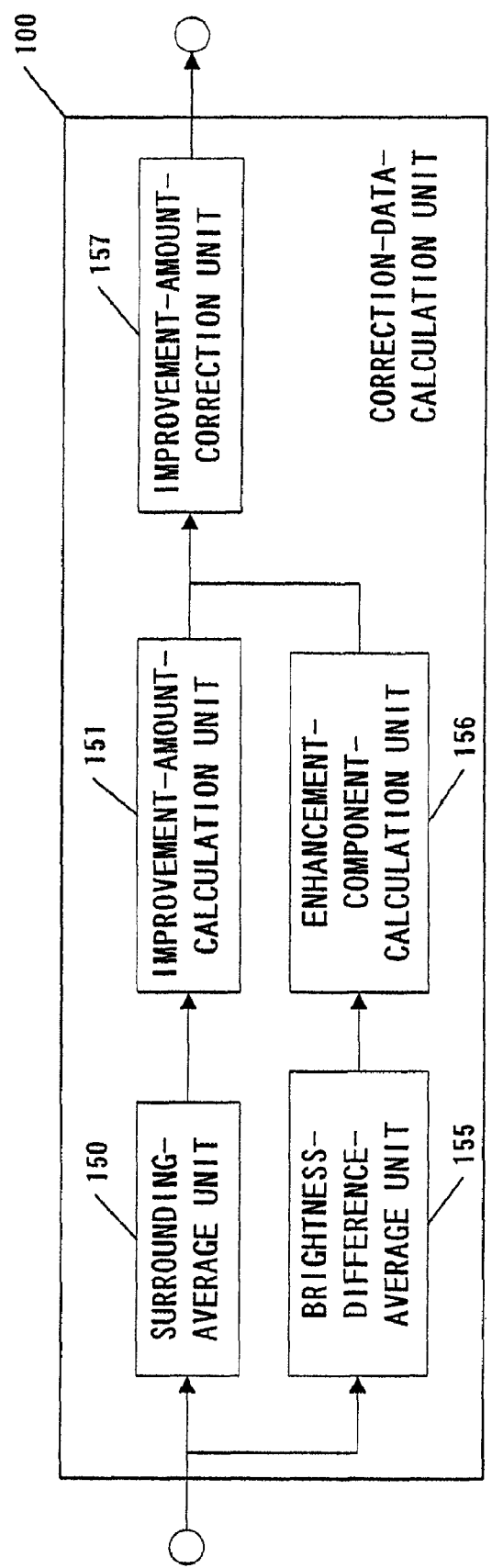
FIG. 59 is a block showing the construction of the correction data calculation unit of a fifteenth embodiment of the invention.

The construction of the correction data calculation unit 100 of the image processing apparatus of a fifteenth embodiment of the invention is partially different than that of the image processing apparatus of the thirteenth embodiment. As shown in FIG. 59, in addition to the surrounding average unit 150 and improvement amount calculation unit 151, the correction data calculation unit 100 comprises a brightness difference average unit 155, enhancement component calculation unit 156 and improvement amount correction unit 157.

Figure 60:
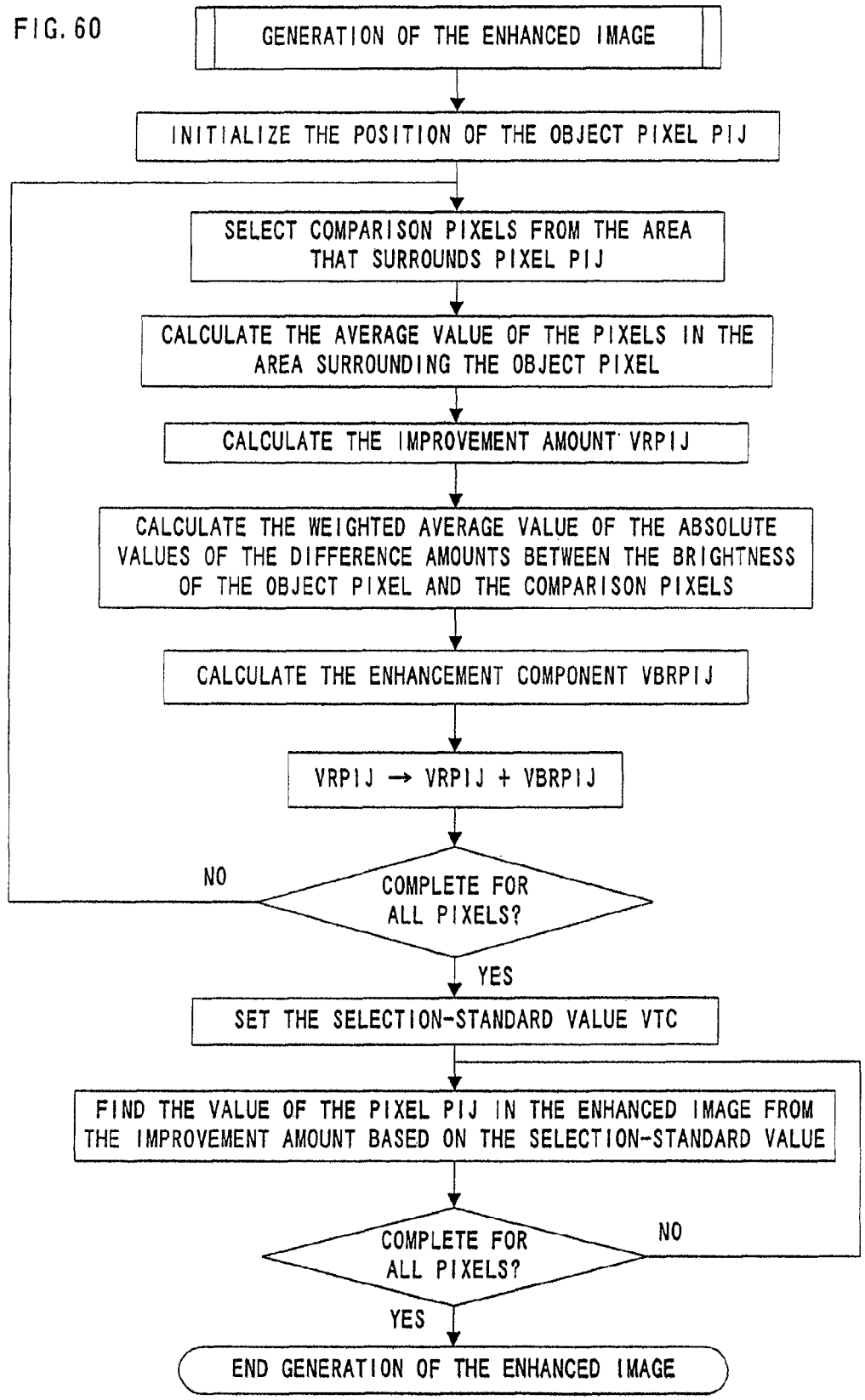
FIG. 60 is a flowchart explaining the contrast improvement process of the fifteenth embodiment.

As shown in FIG. 60, in this image processing image, when the input image before processing is input to the contrast improvement unit 11, the comparison pixel setting unit 115 selects a comparison pixel from among the pixels in the area corresponding to the surround view of the object pixels Pij of the input image that will be used for calculating the contrast improvement amount.

After comparison pixels have been selected by the comparison pixel setting unit 16, the surrounding average unit 150 of the correction data calculation unit 100 calculates the weighted average value VAPij for the value of the comparison pixel in the same way as was done in the thirteenth embodiment, and the improvement amount calculation unit 151 finds the contrast improvement amount VRPij.

Also, the brightness difference average unit 155 finds the weighted Sum Ady (i, j) of the absolute value of the difference between the brightness y(i, j) of the object pixel Pij and the brightness ys(i, j) of the comparison pixel Q(i, j).

The enhancement component calculation unit 156 calculates the enhancement components VBRPij (BRr(i, j), BRg(i, j), BRb(i, j)) for enhancing the contrast improvement amount VRPij based on this value Ady (i, j).

The improvement amount correction unit 157 corrects the contrast improvement amount VRPij based on the calculated enhancement components VBRPij.

The enhancement components VBRPij can be expressed by the following equations 22.

$$Ady(i,j)=\sum_u\sum_v |y(i,j)-ys(u,v)|/1en(u,v)/C^2 \qquad \text{[Eqs. 22]}$$

$$BRr(i,j)=(Rr(i,j)-1.0)\times CVa1 \times Ady(i,j)$$

$$BRg(i,j)=(Rg(i,j)-1.0)\times CVa1 \times Ady(i,j)$$

$$BRb(i,j)=(Rb(i,j)-1.0)\times CVa1 \times Ady(i,j)$$

where, $1en(u,v)=sqrt((u-j)\times(u-j)+(v-j)\times(v-j))$

In equations 22, CVa1 is a positive constant, and controls the amount of edge enhancement.

BRr (i, j), BRg (i, j) and BRb (i, j) can also be defined by the following expressions 23 such that they are further controlled by the brightness of the object pixel. Here, C'val is a positive constant.

$$BRr(i,j)=(Rr(i,j)-1.0)\times kkk \times C'val$$

$$BRg(i,j)=(Rb(i,j)-1.0)\times kkk \times C'val$$

$$BRb(i,j)=(Rb(i,j)-1.0)\times kkk \times C'val$$

$$kkk=y(i,j)\times Ady(i,j) \qquad \text{[Eqs. 23]}$$

In Equations 22 the value Ady(i, j) is taken to be the amount of displacement enhancement of the object pixel Pij, and Equations 22 calculate the component amounts for performing enhancement of the amount of displacement from 1.0 of the contrast improvement amount VRPij (Rr(i, j), Rg(i, j), Rb(i, j)) using the value Ady(i, j) and a preset enhancement coefficient.

For example, there is no enhancement component for places where there is no change in uniform brightness. However, in the case of an object pixel whose contrast improvement amount is greater than 1.0, components are calculated such as to further enhance the pixel values of the enhanced image. On the other hand, in the case of an object pixel whose contrast improvement amount is less than 1.0, a component is obtained that will suppress the pixel value of the object pixel. Therefore, in the enhanced image, the sharpness in areas where the change in the pixel values is large such as near the edges increases, and it is possible to save the sharpness of the finally obtained combined image.

As described above, in the image processing of this embodiment, it is possible to perform contrast improvement in dark areas such that sharpness can be saved in the combined image.

It is possible to combine the image processing of this embodiment with the image processing in the second embodiment.

Moreover, the image processing of this fifteenth embodiment can also be realized by a software process that uses a CPU and DSP.

Sixteenth Embodiment

Figure 61:
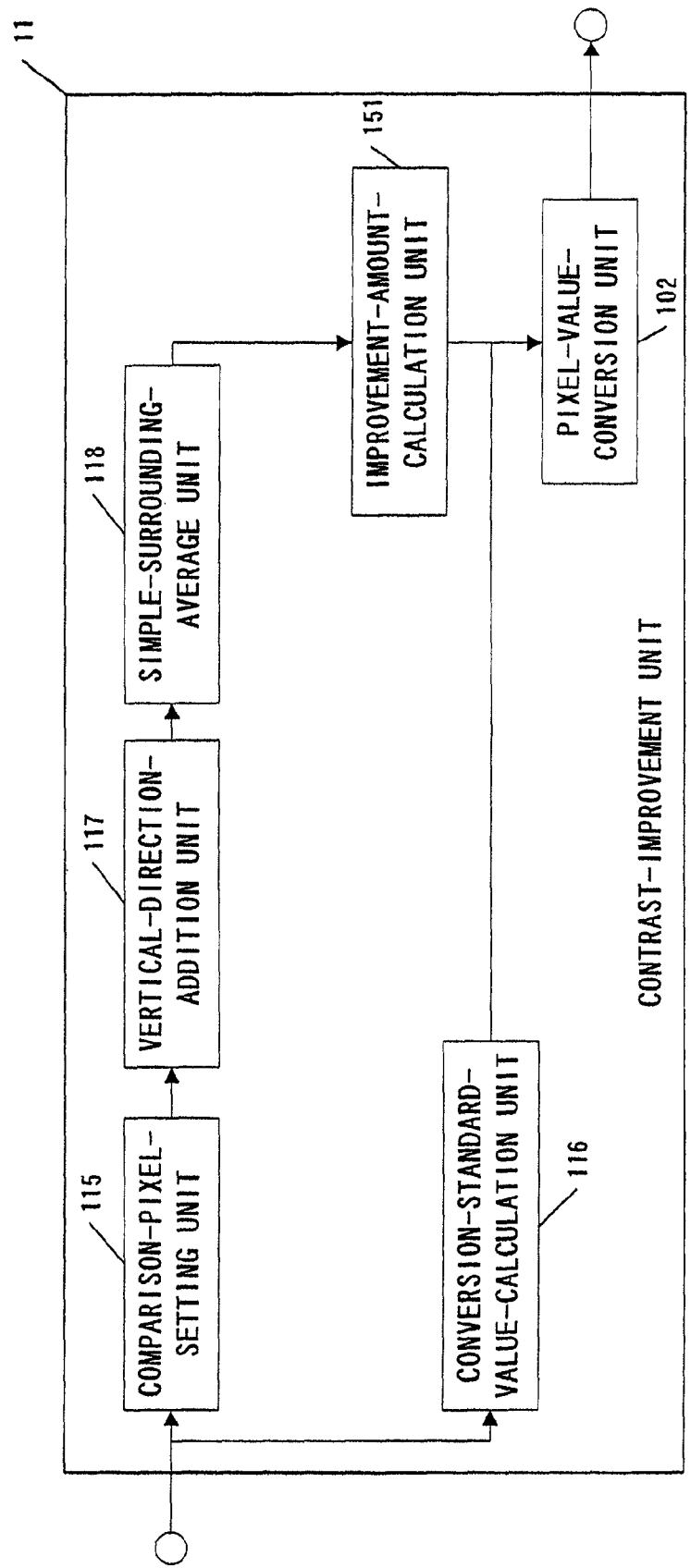
FIG. 61 is a block diagram showing the construction of the contrast improvement unit of a sixteenth embodiment of the invention.

The construction of the correction data calculation unit 100 of the image processing apparatus of a sixteenth embodiment of the invention is partially different than that of the image processing apparatus of the thirteenth embodiment. As shown in FIG. 61, instead of the correction data calculation unit 100, the contrast improvement unit 11 comprises a vertical direction addition unit 117, a simple surrounding average unit 118, a comparison amount correction unit 119 and an improvement amount calculation unit 151.

Figure 62:
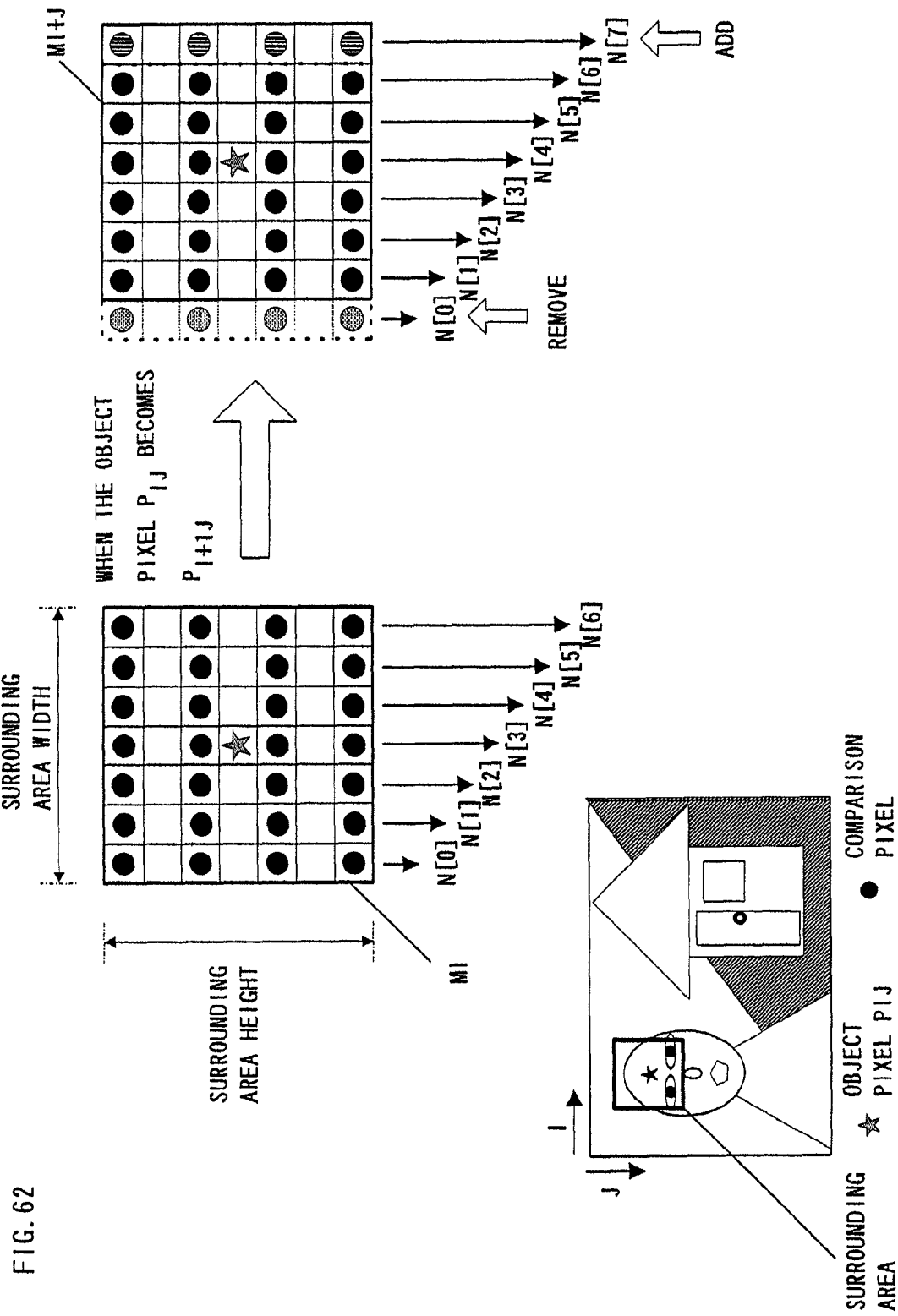
FIG. 62 is a schematic diagram for explaining the calculation of the contrast improvement amount in the sixteenth embodiment.

Furthermore, the comparison pixel setting unit 115 removes pixels in the vertical direction at a certain interval and sets a comparison pixel from among the pixels of a rectangular area corresponding to the surround view of the object pixel Pij. In the example shown in FIG. 62, of the pixels of a 7 pixel×7 pixel rectangular area Mi, the even number pixels in the vertical direction starting from the top are removed, and the other pixels are selected. The number of selected pixels m is 28. The size of the rectangular area and the interval for removing pixels are not limited to those described above.

The vertical direction addition unit 117 finds the addition values N[i] (here, i=0, 1, ..., 6) in the vertical direction of the brightness of the comparison pixel at each horizontal pixel position i of the rectangular area.

The simple surrounding average unit 118 finds the added sum S of the addition values N[k] for each horizontal pixel position of the rectangular area. Also, the average comparison object brightness Asy(i, j) is calculated by dividing the added total S by the number of comparison pixels m.

The improvement amount calculation unit 151 finds the contrast improvement amount VRPij by comparing this average comparison object brightness Asy(i, j) with the values VPij (r(i, j), g(i, j), b(i, j)) of the object pixels Pij.

In this way, the contrast improvement amount VRPij for the object pixel Pij is found, and when the horizontal pixel position of the object pixel Pij moves from position i to position i+1, the surrounding rectangular area also moves from area Mi to area Mi+1.

When the object pixel moves, the vertical direction addition unit 117 finds the addition value N for a comparison pixel at the end in the horizontal direction from among the pixels of the new area Mi+1. In the example shown in FIG. 62, the addition value N[7] is calculated.

The simple surrounding average unit 118 subtracts the addition value N of a comparison pixel, which is at the start in the horizontal direction from among the pixels of the area Mi+1, from the weighted sum S at the previous position. In the example shown in FIG. 62, the addition value N[0] is subtracted from the weighted sum S. Also, by adding the newly calculated addition value N[7] to that result, the sum S of the brightness is obtained for the area Mi+1.

By dividing this value by the number of comparison pixels m in the same way, the average comparison object brightness Asy (i+1, j) is obtained.

By adding and subtracting the pre prepared addition values N[k] in the vertical direction in this way, it is possible to easily obtain the average comparison object brightness.

As described above, in the image processing of this embodiment, by designing and simplifying the calculation of the filtering process, which has the largest amount of processing, it is possible to save the edges and improve the contrast while at the same time reduce the processing time.

It is also possible to combine the image processing of this embodiment with the image processing of the second embodiment. In the case of performing multi-resolution processing as in the second embodiment, the amount of processing becomes very large, however, by designing the calculation and calculation procedure for calculating the weighted sum as in this embodiment, it is possible to greatly improve the problem of a large amount of processing.

Also, in the image processing of this embodiment, it is possible to add the control of the average comparison density VAPij of the fourteenth embodiment, and the control of the enhancement component VBRPij of the fifteenth embodiment.

Moreover, the image processing of this sixteenth embodiment can also be realized by a software process that uses a CPU and DSP.

Seventeenth Embodiment

Figure 63:
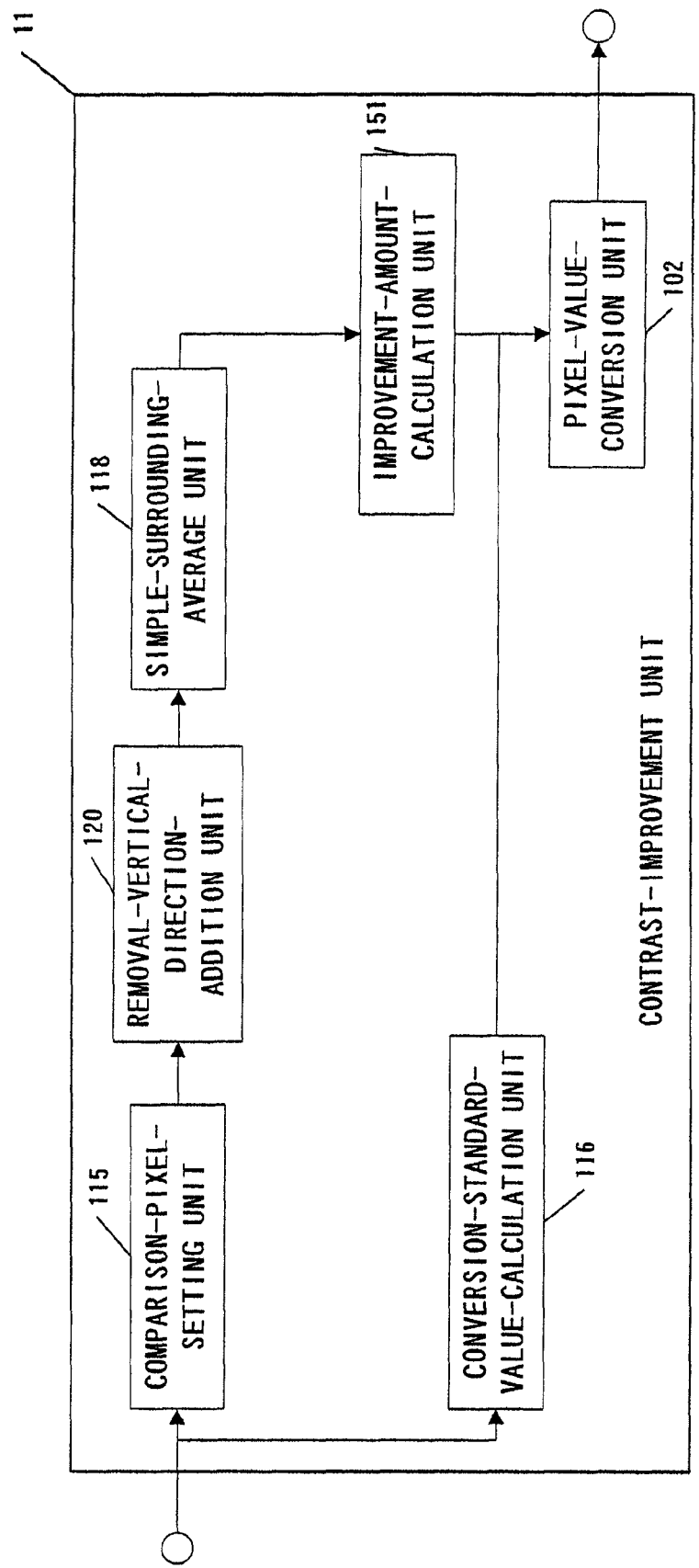
FIG. 63 is a block diagram showing the construction of the contrast improvement unit of a seventeenth embodiment of the invention.

The construction of the contrast improvement unit 11 of the image processing apparatus of a seventeenth embodiment of the invention is partially different than that of the image processing apparatus of the sixteenth embodiment. As shown in FIG. 63, instead of the vertical direction addition unit 117, the contrast improvement unit 11 comprises a removal vertical direction addition unit 120.

Figure 64:
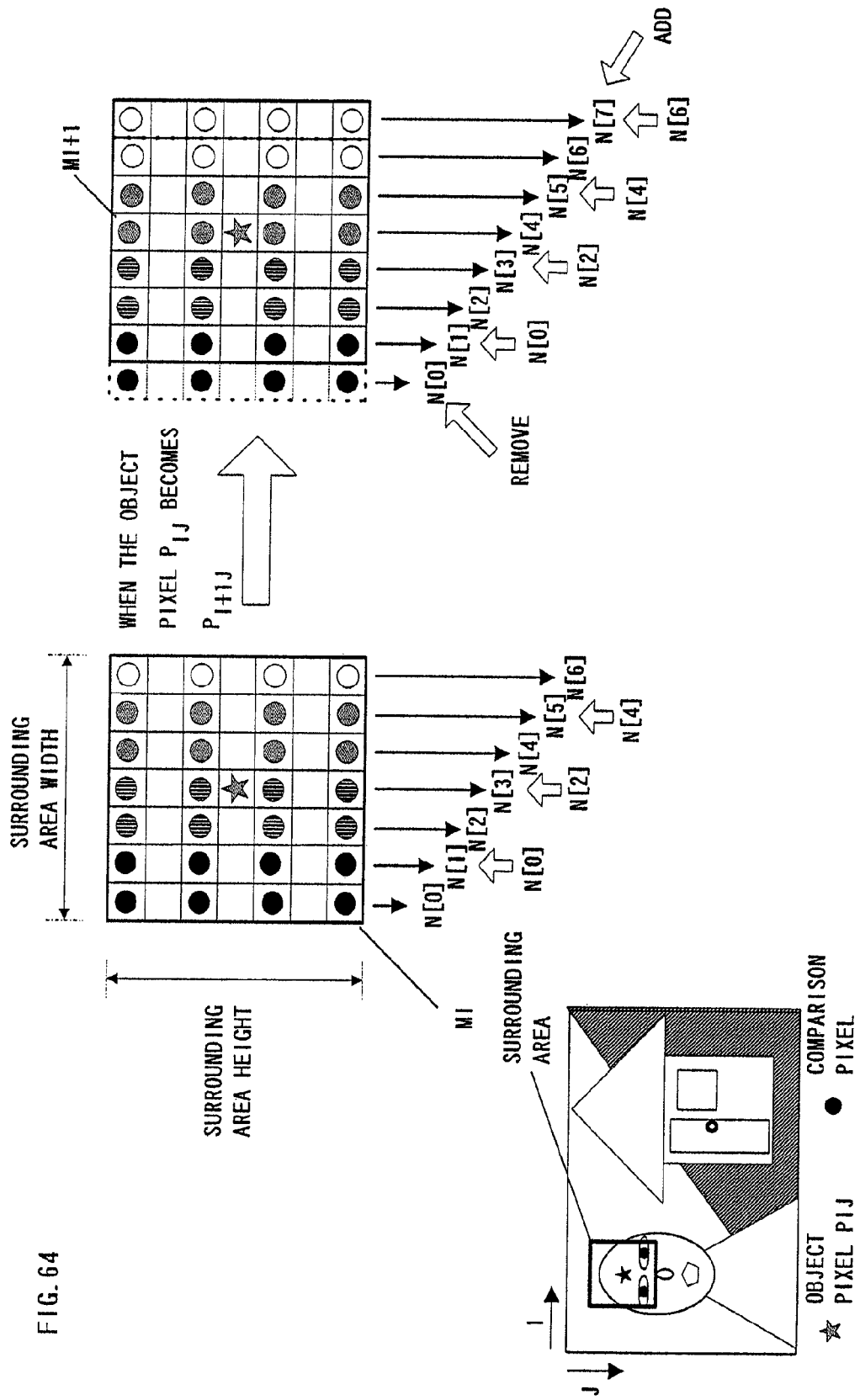
FIG. 64 is a schematic diagram for explaining the calculation of the contrast improvement amount in this seventeenth embodiment.

Furthermore, the comparison pixel setting unit 115 removes pixels in the vertical direction and horizontal direction at a certain interval from the pixels of a rectangular area that corresponds to the surround view of the object pixel Pij, and sets a comparison pixel Qij. In the example shown in FIG. 64, of the pixels of a 7 pixel×7 pixel rectangular area Mi, the even number pixels in the vertical direction and horizontal direction starting from the first are removed, and the other pixels are selected. The size of the rectangular area and the interval for removing pixels in the vertical and horizontal directions are not limited to those described above.

The removal vertical direction addition unit 120 finds addition values N[h] (here, h=0, 2, 4, 6) in the vertical direction of the brightness of the comparison pixels located at odd numbered positions counting from the first from among each of the horizontal pixel positions i in the rectangular area.

The addition values N[h+1] in the vertical direction of the brightness of the comparison pixels at even numbered positions from the start of the horizontal pixel positions i are given by N[h+1]=N[h]. For example, a value that is the same as addition value N[0] is used for addition value N[1], and a value that is the same as addition value N[2] is used for addition value N[3].

The simple surrounding average unit 118 finds the weighted sum S of the addition value N[k] for each horizontal pixel position in the rectangular area. Also, as in the sixteenth embodiment, the average comparison object brightness Asy (i, j) is calculated by dividing the weighted sum S by the number of comparison pixels m.

The improvement amount calculation unit 151 finds the contrast improvement amount VRPij by comparing this average comparison object brightness Asy(i, j) with the values VPij (r(i, j), g(i, j), b(i, j)) of the object pixel Pij.

When the horizontal pixel position of the object pixel Pij moves from position i to position i+1, the removal vertical direction addition unit 120 finds the addition values N for the comparison pixels at the very end in the horizontal direction from among the pixels of the corresponding area Mi+1. However, when that position is in a even numbered position counted from the start, the pixel in that position is a pixel to be removed and is not selected, so the addition values N is not found newly. In the example shown in FIG. 64, addition value N[7] is not calculated, and is interpolated as a value that is the same as addition value N[6].

Of the pixels of the area Mi+1, the simple surrounding average unit 118 subtracts the addition value N for the comparison pixel at the very start in the horizontal direction from the weighted sum S at the previous positions. In the example shown in FIG. 64, the additions value N[0] is subtracted from the weighted sum S. Also, by adding addition value N[7] to that result, the sum S of the brightness for area Mi+1 is obtained.

The average comparison object brightness Asy(i+1, j) is obtained by dividing this value in the same way by the number of comparison pixels m.

As described above, in the image processing of this embodiment, by designing and simplifying the calculation of the filtering process, which has the largest amount of processing, it is possible to save the edges and improve the contrast while at the same time reduce the processing time.

It is also possible to combine the image processing of this embodiment with the image processing of the second embodiment. In the case of performing multi-resolution processing as in the second embodiment, the amount of processing becomes very large, however, by designing the calculation and calculation procedure for calculating the weighted sum as in this embodiment, it is possible to greatly improve the problem of a large amount of processing.

Also, in the image processing of this embodiment, it is possible to add the control of the average comparison density VAPij of the fourteenth embodiment, and the control of the enhancement component VBRPij of the fifteenth embodiment.

Moreover, the image processing of this seventeenth embodiment can also be realized by a software process that uses a CPU and DSP.

Eighteenth Embodiment

Figure 65:
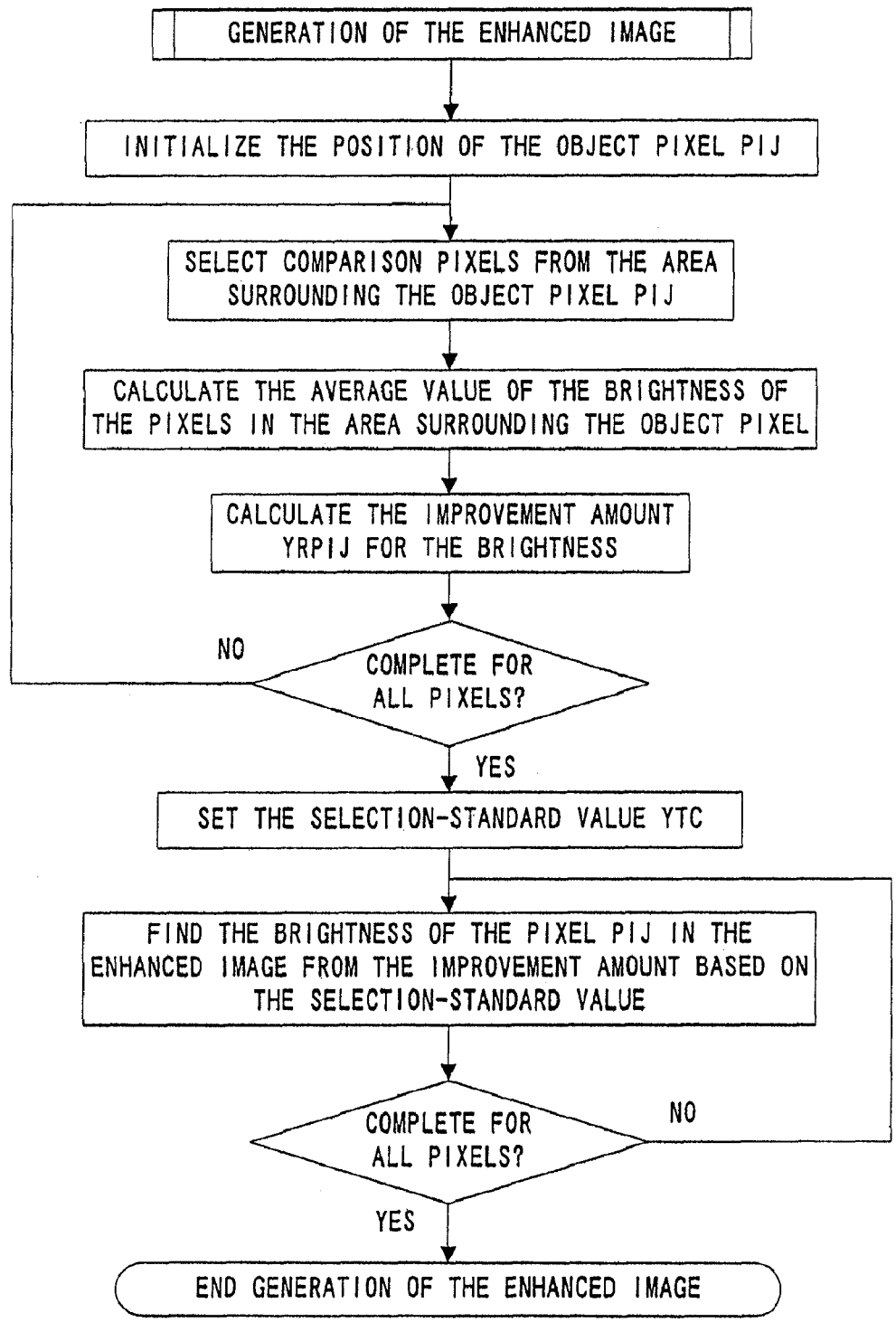
FIG. 65 is a flowchart explaining the contrast improvement process of an eighteenth embodiment of the invention.

In the thirteenth embodiment described above, the contrast improvement amount VRPij (Rr(i, j), Rg(i, j), Rb(i, j)) was calculated for each component by Equations 15 and 16. In this eighteenth embodiment, the contrast improvement amount yRP(i, j) for the brightness is calculated as using Equations 22 instead of Equations 16, and using the same procedure as in the thirteenth embodiment as shown in FIG. 65.

The improved brightness yRP(i, j) is calculated from the ratio of the brightness y(i, j) of the object pixel Pij and the average Ay(i, j) of the brightness of the pixels of the area corresponding to the surround view. Also, here, the conversion standard value calculation unit 116 finds the standard value yTc(i, j) for converting the improved brightness yRP(i, j) to the brightness of the pixel on the enhanced image v. The pixel value conversion unit 102 converts the improved brightness yRP(i, j) to the brightness of the pixel on the enhanced image v based on the found standard value yTc(i, j).

Furthermore, in order to combine the enhanced image v and the input image vi, the image combination unit 12 calculates the brightness of the pixels of both images instead of calculating the values for each component of the pixels of both images.

Figure 66A:
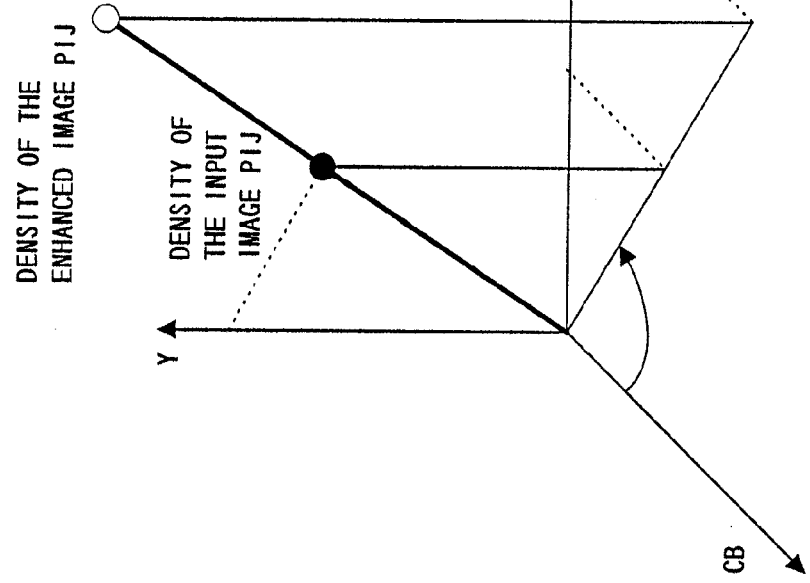
FIGS. 66A and 66B are concept diagrams of the post-processing.
Figure 66B:
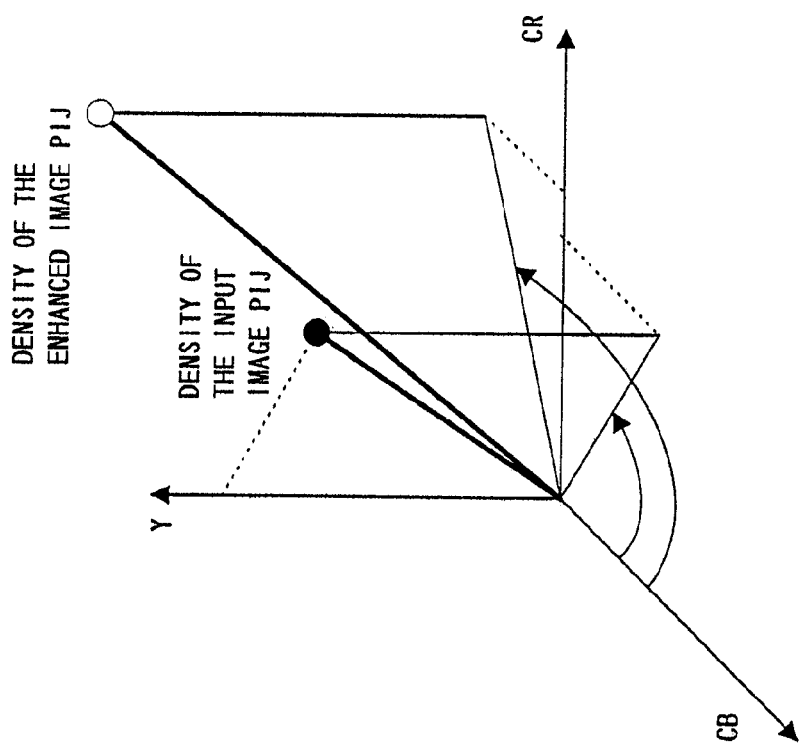

In this embodiment, the process of combining images is performed using just the brightness in this way. The reason for not performing the process for each component as in the case of the thirteenth embodiment is in order to further maintain the color balance of the input image in the enhanced image. As shown in FIG. 66A, when processing is performed for each component as in the thirteenth embodiment, there is a possibility that the color balance is lost in the enhancement process and correction process, so a change in color may occur between the input image and combined image. On the other hand, by finding the improved color differences wcr(i, j) and wcb(i, j) by reflecting the ratio Ratio(i, j) between the brightness wy(i, j) of the combined image and brightness y(i, j) on the color differences cr(i, j) and cb(i, j) of the input image, it is possible to maintain the color balance of the input image in the combined image, as shown in FIG. 66B.

In this embodiment, a post-processing unit 16 finds the improved color differences wcr(i, j) and wcb(i, j) and finds the value of the pixel of the combined image. For doing this, as shown in FIG. 67, in addition to having the same construction as the image processing apparatus of the thirteenth embodiment, the post-processing unit 16 of this image processing apparatus further comprises an input brightness/color difference calculation unit 160, a brightness ratio calculation unit 161, a brightness adjustment unit 162, a color difference component correction unit 163, image regeneration unit 164 and gamma conversion unit 165.

Figure 68:
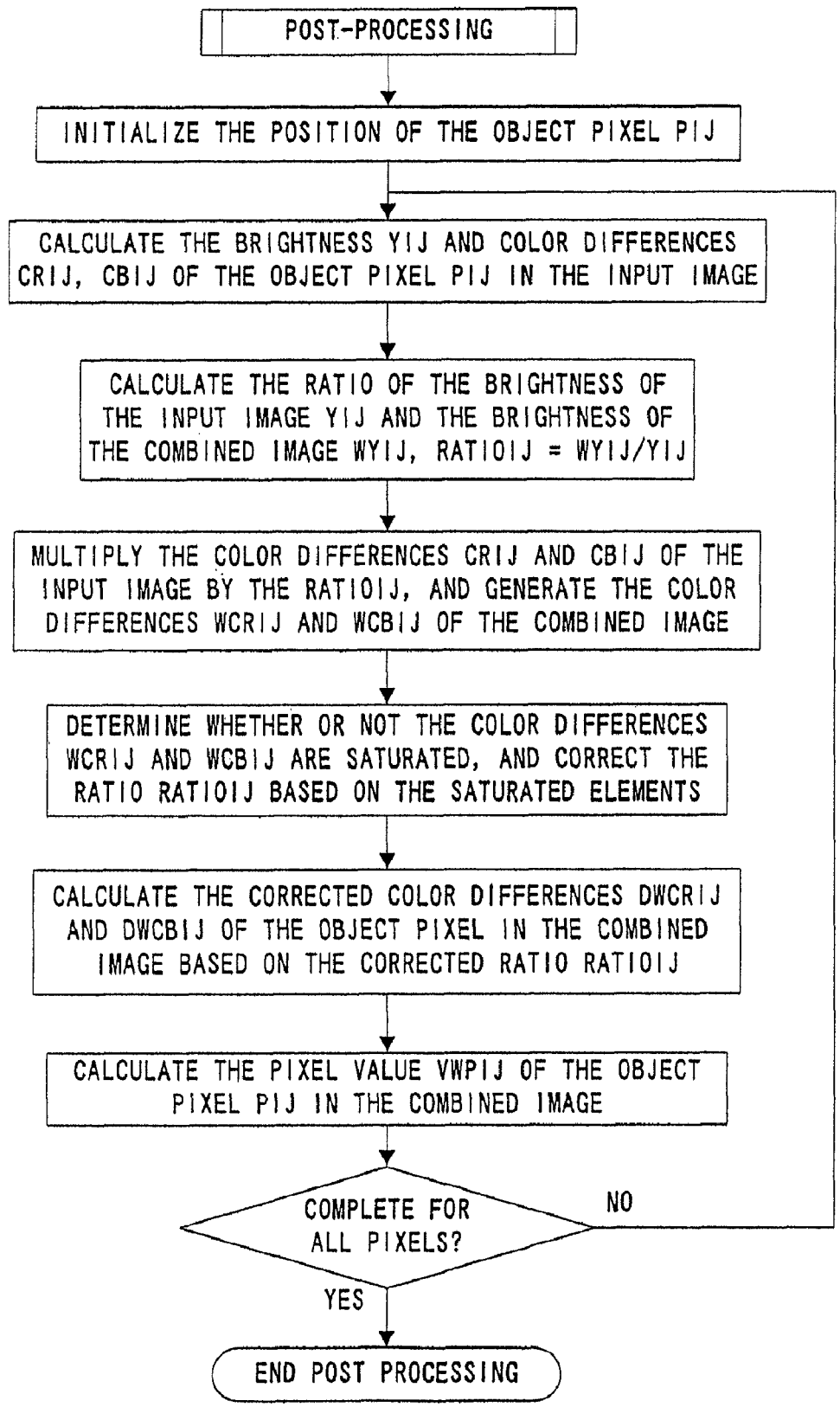

After image combination unit 12 generates a combined image for the brightness, the input brightness/color difference calculation unit 160 of the post-processing unit 16 initializes the position of the object pixel Pij and then calculates the brightness y (i, j) and color differences cr (i, j) and cb(i, j) of the object pixel of the input image, as shown in FIG. 68.

The brightness ratio calculation unit 161 compares the brightness wy(i, j) of the object pixel Pij in the combined image with the brightness y (i, j) of the corresponding pixel in the input image, and calculates the ratio Ratio (i, j) between them.

The brightness adjustment unit 162 adjusts the brightness wy(i, j) of the combined image based on that brightness ratio. By just multiplying the color differences cr (i, j) and cb(i, j) of the input image by the brightness ratio, there is a possibility that the color differences wcr (i, j) and wcb(i, j) of the combined image may be saturated. Therefore, the brightness adjustment unit 162 determines whether or not the color difference wcr(i, j) or wcb(i, j) of the combined image obtained by multiplication became saturated. In the case where the color difference wcr(i, j) becomes saturated, it corrects the brightness ratio Ratio (i, j) by the ratio with that saturated color difference wcr(i, j)/cr(i, j). The improved brightness dwy(i, j) after combination is calculated based on that value.

The color difference component correction unit 163 corrects the color differences cr(i, j) and cb(i, j) of the input image based on the corrected ratio Ratio(i, j) between the brightness wy(i, j) and brightness y(i, j), and generates the color differences after combination dwcr(i, j) and dwcb(i, j)

The image regeneration unit 163 calculates the value VWPij (wr(i, j), wg(i, j), wb(i, j)) of the pixel in the combined image based on the corrected color difference components and brightness.

After the values VWPij of the pixels in the combined image are found, the gamma conversion unit 164 performs gamma conversion processing, which was originally performed on the input image, on the combined image. By doing so, the output image that is output from the image output unit 13 is generated.

In the image processing of this embodiment, in order to keep the color balance of the input image, processing is only performed on the brightness when performing the contrast improvement process. Also, by correcting the color difference of the input image based on the improvement ratio, it is possible to improve the color balance of the combined image. By taking into consideration the saturation state of the color difference after correction, it is possible to perform contrast improvement while maintaining the color balance of the input image. Therefore, it is not necessary to separately have a means or method for improving the color balance.

Moreover, the image processing of this eighteenth embodiment can also be realized by a software process that uses a CPU and DSP.

The invention claimed is:
1. A digital signal processor comprising:
a memory that stores an input image; and
a processor coupled to the memory that executes instructions to:
  detect edge data of an object pixel;
  obtain an average value of pixels surrounding the object pixel;
  obtain an enhanced pixel value by comparing a value of the object pixel of the input image with the average value; and
  adaptively combine the enhanced pixel value with the value of the object pixel based on combination coefficients,
wherein the combination coefficients are determined by a relationship between the edge data of the object pixel and a brightness of the object pixel.

2. The digital signal processor according to claim 1, wherein the combination coefficients are determined to decrease a coefficient for the enhanced pixel value when the brightness of the object pixel is judged to be low and the edge data of the object pixel is judged to be low.

3. The digital signal processor according to claim 2, wherein the combination coefficients are determined to decrease the coefficient for the enhanced pixel value for an area where (i) a brightness of a plurality of pixels is judged to be low and (ii) a change is judged to be smooth, thereby combining the enhanced pixel value with the object pixel value to generate less enhanced image signals for the area as compared to an edge area.

4. The digital signal processor according to claim 1, wherein the combination coefficients are determined to decrease a coefficient for the enhanced pixel data when the brightness of the object pixel is judged to be high and the edge data of the object pixel is judged to be low.

5. The digital signal processor according to claim 4, wherein the combination coefficients are determined to decrease the coefficient for the enhanced pixel value for an area where (i) a brightness of a plurality of pixels is judged to be high and (ii) a change is judged to be smooth, thereby combining the enhanced pixel value with the object pixel value to generate less enhanced image signals for the area as compared to an edge area.

6. The digital signal processor of claim 1, wherein the digital signal processor forms part of an image processing apparatus.

7. A digital signal processing method comprising:
storing, using a processor, an input image in a memory; and
detecting, using the processor, edge data of an object pixel;
obtaining, using the processor, an average value of pixels surrounding the object pixel;
obtaining, using the processor, an enhanced pixel value by comparing a value of the object pixel of the input image with the average value; and
adaptively combining, using the processor, the enhanced pixel value with the value of the object pixel based on combination coefficients,
wherein the combination coefficients are determined by a relationship between the edge data of the object pixel and a brightness of the object pixel.

* * * * *

UNITED STATES PATENT AND TRADEMARK OFFICE
CERTIFICATE OF CORRECTION

| | | |
|---|---|---|
| PATENT NO. | : 8,098,953 B2 | Page 1 of 1 |
| APPLICATION NO. | : 12/827264 | |
| DATED | : January 17, 2012 | |
| INVENTOR(S) | : Tatsumi Watanabe et al. | |

It is certified that error appears in the above-identified patent and that said Letters Patent is hereby corrected as shown below:

In claim 5, from line 23 of col. 47 to line 1 of col. 48:

"a brightness of a plurality of pixels is judged to high" should be --a brightness of a plurality of pixels is judged to be high--

Signed and Sealed this
Tenth Day of April, 2012

David J. Kappos
*Director of the United States Patent and Trademark Office*